(12) United States Patent
Lin et al.

(10) Patent No.: US 11,487,089 B2
(45) Date of Patent: Nov. 1, 2022

(54) IMAGE CAPTURING OPTICAL LENS ASSEMBLY INCLUDING FIVE LENSES OF +−++− OR +−−+− REFRACTIVE POWERS, IMAGING APPARATUS AND ELECTRONIC DEVICE

(71) Applicant: LARGAN PRECISION CO., LTD., Taichung (TW)

(72) Inventors: Cheng-Chen Lin, Taichung (TW); Kuan-Chun Wang, Taichung (TW); Tzu-Chieh Kuo, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 322 days.

(21) Appl. No.: 16/992,304

(22) Filed: Aug. 13, 2020

(65) Prior Publication Data
US 2021/0223516 A1    Jul. 22, 2021

Related U.S. Application Data

(60) Provisional application No. 62/961,873, filed on Jan. 16, 2020.

(51) Int. Cl.
*G02B 13/00* (2006.01)
*G02B 9/60* (2006.01)

(52) U.S. Cl.
CPC ........... *G02B 13/0045* (2013.01); *G02B 9/60* (2013.01)

(58) Field of Classification Search
CPC .............................. G02B 13/0045; G02B 9/60
See application file for complete search history.

(56) References Cited

U.S. PATENT DOCUMENTS

| 8,284,291 | B2 | 10/2012 | Huang et al. |
| 8,363,337 | B2 | 1/2013 | Tang et al. |
| 8,369,029 | B2 | 2/2013 | Tang et al. |
| 8,531,786 | B2 | 9/2013 | Tsai et al. |
| 8,687,293 | B2 | 4/2014 | Chen et al. |
| 8,717,687 | B2 | 5/2014 | Hsu et al. |
| 8,804,253 | B2 | 8/2014 | Tsai et al. |
| 9,606,325 | B2 | 3/2017 | Liao et al. |
| 9,759,895 | B1 | 9/2017 | Teraoka |
| 9,874,720 | B2 | 1/2018 | Hsueh et al. |
| 10,175,458 | B2 | 1/2019 | Tseng et al. |

(Continued)

FOREIGN PATENT DOCUMENTS

| CN | 106680974 A | 5/2017 |
| CN | 106980167 A | 7/2017 |

(Continued)

*Primary Examiner* — Wen Huang
(74) *Attorney, Agent, or Firm* — McClure, Qualey & Rodack, LLP

(57) ABSTRACT

An image capturing optical lens assembly includes five lens elements, in order from an object side to an image side along an optical path, being a first lens element, a second lens element, a third lens element, a fourth lens element and a fifth lens element. The first lens element with positive refractive power has an object-side surface being convex in a paraxial region thereof. The second lens element with negative refractive power has an image-side surface being concave in a paraxial region thereof. The fourth lens element with positive refractive power has an image-side surface being convex in a paraxial region thereof. The fifth lens element with negative refractive power has an image-side surface being concave in a paraxial region thereof. At least one of surfaces of the fifth lens element includes at least one critical point in an off-axis region thereof.

12 Claims, 25 Drawing Sheets

(56) References Cited

U.S. PATENT DOCUMENTS

| | | |
|---|---|---|
| 10,185,128 B2 | 1/2019 | Hsueh et al. |
| 10,222,516 B2 | 3/2019 | Chou et al. |
| 10,288,845 B2 | 5/2019 | Chen et al. |
| 10,310,230 B2 | 6/2019 | Chen et al. |
| 10,379,322 B2 | 8/2019 | Wu et al. |
| 10,422,931 B2 | 9/2019 | Hsieh et al. |
| 2011/0228409 A1 | 9/2011 | Uchida |
| 2012/0293704 A1 | 11/2012 | Sano et al. |
| 2013/0010181 A1 | 1/2013 | Baba |
| 2013/0063828 A1 | 3/2013 | Hirao et al. |
| 2014/0293452 A1 | 10/2014 | Kanda et al. |
| 2014/0293453 A1 | 10/2014 | Ogino et al. |
| 2015/0085381 A1 | 3/2015 | Ota et al. |
| 2015/0085386 A1 | 3/2015 | Tanaka et al. |
| 2016/0161718 A1 | 6/2016 | Koreeda |
| 2017/0023773 A1 | 1/2017 | Chen et al. |
| 2017/0184816 A1 | 6/2017 | Tsai et al. |
| 2018/0059376 A1 | 3/2018 | Lin et al. |
| 2018/0113281 A1 | 4/2018 | Tsai et al. |
| 2018/0188491 A1 | 7/2018 | Chang et al. |
| 2018/0188492 A1 | 7/2018 | Chang et al. |
| 2019/0056570 A1 | 2/2019 | Yeh et al. |
| 2019/0064484 A1 | 2/2019 | Yeh et al. |
| 2019/0086636 A1 | 3/2019 | Fukaya |
| 2019/0154958 A1 | 5/2019 | Wang |
| 2019/0154987 A1 | 5/2019 | Wang |
| 2019/0154988 A1 | 5/2019 | Wang |
| 2019/0154989 A1 | 5/2019 | Wang |
| 2019/0154990 A1 | 5/2019 | Wang |
| 2019/0196142 A1 | 6/2019 | Shi |
| 2019/0227280 A1 | 7/2019 | Zhao et al. |
| 2019/0227283 A1 | 7/2019 | Zhao et al. |
| 2019/0346661 A1 | 11/2019 | Yeh et al. |
| 2020/0041763 A1 | 2/2020 | Lin |
| 2020/0096745 A1 | 3/2020 | Chang et al. |
| 2020/0124827 A1 | 4/2020 | Tseng et al. |
| 2020/0150406 A1 | 5/2020 | Chen et al. |
| 2020/0209527 A1 | 7/2020 | Zhao et al. |
| 2020/0209591 A1 | 7/2020 | Sun et al. |
| 2020/0233179 A1 | 7/2020 | Yunbai |
| 2021/0141195 A1 | 5/2021 | Hu et al. |
| 2021/0191076 A1 | 6/2021 | Lou et al. |
| 2021/0208369 A1 | 7/2021 | Huang et al. |

FOREIGN PATENT DOCUMENTS

| | | |
|---|---|---|
| CN | 107121755 A | 9/2017 |
| CN | 107422457 A | 12/2017 |
| CN | 107870407 A | 4/2018 |
| CN | 108398766 A | 8/2018 |
| CN | 108761741 A | 11/2018 |
| CN | 108802967 A | 11/2018 |
| CN | 208156286 U | 11/2018 |
| CN | 109031594 A | 12/2018 |
| CN | 109358414 A | 2/2019 |
| CN | 208654421 U | 3/2019 |
| CN | 109839726 A | 6/2019 |
| CN | 209044158 U | 6/2019 |
| CN | 110007442 A | 7/2019 |
| CN | 110161652 A | 8/2019 |
| CN | 110161654 A | 8/2019 |
| CN | 110297313 A | 10/2019 |
| CN | 110361852 A | 10/2019 |
| CN | 110412736 A | 11/2019 |
| CN | 110412750 A | 11/2019 |
| CN | 110426813 A | 11/2019 |
| CN | 110488463 A | 11/2019 |
| CN | 110488464 A | 11/2019 |
| CN | 110515178 A | 11/2019 |
| CN | 110531485 A | 12/2019 |
| CN | 110531491 A | 12/2019 |
| CN | 110531492 A | 12/2019 |
| CN | 110618519 A | 12/2019 |
| CN | 110646924 A | 1/2020 |
| CN | 110955020 A | 4/2020 |
| CN | 111025557 A | 4/2020 |
| CN | 111025595 A | 4/2020 |
| CN | 111025596 A | 4/2020 |
| CN | 111123476 A | 5/2020 |
| CN | 111142219 A | 5/2020 |
| CN | 111435189 A | 7/2020 |
| CN | 211348831 U | 8/2020 |
| JP | 2013156389 A | 8/2013 |
| KR | 100407422 B1 | 11/2003 |
| KR | 100835108 B1 | 6/2008 |
| TW | 201704799 A | 2/2017 |
| TW | I576632 B | 4/2017 |
| TW | 201723568 A | 7/2017 |
| TW | 201812375 A | 4/2018 |
| TW | I659239 B | 5/2019 |
| TW | I668480 B | 8/2019 |
| TW | I674450 B | 10/2019 |
| TW | I683149 B | 1/2020 |
| WO | 2018126587 A1 | 7/2018 |
| WO | 2018154421 A1 | 8/2018 |
| WO | 2018214396 A1 | 11/2018 |
| WO | 2019037466 A1 | 2/2019 |
| WO | 2019220255 A1 | 11/2019 |
| WO | 2020164236 A1 | 8/2020 |
| WO | 2021097925 A1 | 5/2021 |
| WO | 2021097929 A1 | 5/2021 |

…

IMAGE CAPTURING OPTICAL LENS ASSEMBLY INCLUDING FIVE LENSES OF +−++− OR +−−+− REFRACTIVE POWERS, IMAGING APPARATUS AND ELECTRONIC DEVICE

RELATED APPLICATIONS

This application claims priority to Provisional Application Ser. No. 62/961,873, filed Jan. 16, 2020, which is herein incorporated by reference.

BACKGROUND

Technical Field

The present disclosure relates to an image capturing optical lens assembly and an imaging apparatus. More particularly, the present disclosure relates to an image capturing optical lens assembly and an imaging apparatus with compact size applicable to electronic devices.

Description of Related Art

With recent technology of semiconductor process advances, performances of image sensors are enhanced, so that the smaller pixel size can be achieved. Therefore, optical lens assemblies with high image quality have become an indispensable part of many modern electronics. With rapid developments of technology, applications of electronic devices equipped with optical lens assemblies increase and there is a wide variety of requirements for optical lens assemblies. However, in a conventional optical lens assembly, it is hard to balance among image quality, sensitivity, aperture size, volume or field of view. Thus, there is a demand for an optical lens assembly that meets the aforementioned needs.

SUMMARY

According to one aspect of the present disclosure, an image capturing optical lens assembly includes five lens elements, which are, in order from an object side to an image side along an optical path, a first lens element, a second lens element, a third lens element, a fourth lens element and a fifth lens element. Each of the five lens elements has an object-side surface towards the object side and an image-side surface towards the image side. The first lens element with positive refractive power has the object-side surface being convex in a paraxial region thereof. The second lens element with negative refractive power has the image-side surface being concave in a paraxial region thereof. The fourth lens element with positive refractive power has the image-side surface being convex in a paraxial region thereof. The fifth lens element with negative refractive power has the image-side surface being concave in a paraxial region thereof, at least one of the object-side surface and the image-side surface of the fifth lens element includes at least one critical point in an off-axis region thereof. When an Abbe number of the second lens element is V2, an Abbe number of the third lens element is V3, an Abbe number of the fourth lens element is V4, a focal length of the image capturing optical lens assembly is f, an axial distance between the object-side surface of the first lens element and an image surface is TL, a central thickness of the fourth lens element is CT4, a central thickness of the fifth lens element is CT5, and a refractive index of the second lens element is N2, the following conditions are satisfied:

$30.0 < V2+V3+V4 < 90.0;$ $1.10 \leq TL/f < 1.50;$ $0.70 < CT4/CT5;$ and $7.0 < V2/N2 < 12.5.$ According to another aspect of the present disclosure, an imaging apparatus includes the image capturing optical lens assembly of the aforementioned aspect and an image sensor, wherein the image sensor is disposed on the image surface of the image capturing optical lens assembly.

According to another aspect of the present disclosure, an electronic device includes the imaging apparatus of the aforementioned aspect.

According to another aspect of the present disclosure, an image capturing optical lens assembly includes five lens elements, which are, in order from an object side to an image side along an optical path: a first lens element, a second lens element, a third lens element, a fourth lens element and a fifth lens element. Each of the five lens elements has an object-side surface towards the object side and an image-side surface towards the image side. The first lens element with positive refractive power has the object-side surface being convex in a paraxial region thereof. The second lens element with negative refractive power has the image-side surface being concave in a paraxial region thereof. The fourth lens element with positive refractive power has the image-side surface being convex in a paraxial region thereof. The fifth lens element with negative refractive power has the image-side surface being concave in a paraxial region thereof, at least one of the object-side surface and the image-side surface of the fifth lens element comprises at least one critical point in an off-axis region thereof. When an Abbe number of the second lens element is V2, an Abbe number of the third lens element is V3, an Abbe number of the fourth lens element is V4, a focal length of the image capturing optical lens assembly is f, an axial distance between the object-side surface of the first lens element and an image surface is TL, an axial distance between the third lens element and the fourth lens element is T34, an axial distance between the fourth lens element and the fifth lens element is T45, a central thickness of the fifth lens element is CT5, a half of a maximum field of view of the image capturing optical lens assembly is HFOV, and a curvature radius of the image-side surface of the fifth lens element is R10, the following conditions are satisfied:

$30.0 < V2+V3+V4 < 90.0;$ $1.10 \leq TL/f;$ $0 < T34/T45 < 3.7;$ $0.65 < T34/CT5 < 1.45;$ $35.0 \text{ degrees} < HFOV;$ and $0 < R10/f < 3.0.$ According to another aspect of the present disclosure, an image capturing optical lens assembly includes five lens elements, the five lens elements being, in order from an object side to an image side along an optical path: a first lens element, a second lens element, a third lens element, a fourth lens element and a fifth lens element. Each of the five lens elements has an object-side surface towards the object side and an image-side surface towards the image side. The first lens element with positive refractive power has the object-side surface being convex in a paraxial region thereof. The second lens element with negative refractive power has the image-side surface being concave in a paraxial region thereof. The fourth lens element with positive refractive power has the image-side surface being convex in a paraxial region thereof. The fifth lens element with negative refractive power has the image-side surface being concave in a paraxial region thereof, at least one of the object-side surface and the image-side surface of the fifth lens element comprises at least one critical point in an off-axis region thereof. When an Abbe number of the second lens element is V2, an Abbe number of the third lens element is V3, an Abbe number of the fourth lens element is V4, a focal length of the image capturing optical lens assembly is f, an axial distance between the object-side surface of the first lens element and an image surface is TL, a central thickness of the first lens element is CT1, a central thickness of the second lens element is CT2, a central thickness of the fifth lens element is CT5, an axial distance between the second lens element and the third lens element is T23, an axial distance between the third lens element and the fourth lens element is T34, and an axial distance between the fourth lens element and the fifth lens element is T45, the following conditions are satisfied:

$30.0 < V2+V3+V4 < 90.0;$ $1.10 \leq TL/f;$ $0 < CT1/T45 < 3.2;$ $0.42 < T23/CT5 < 1.6;$ and $0 < T34/CT2 < 13.0.$

BRIEF DESCRIPTION OF THE DRAWINGS

The present disclosure can be more fully understood by reading the following detailed description of the embodiment, with reference made to the accompanying drawings as follows.

DETAILED DESCRIPTION

Figure 1:
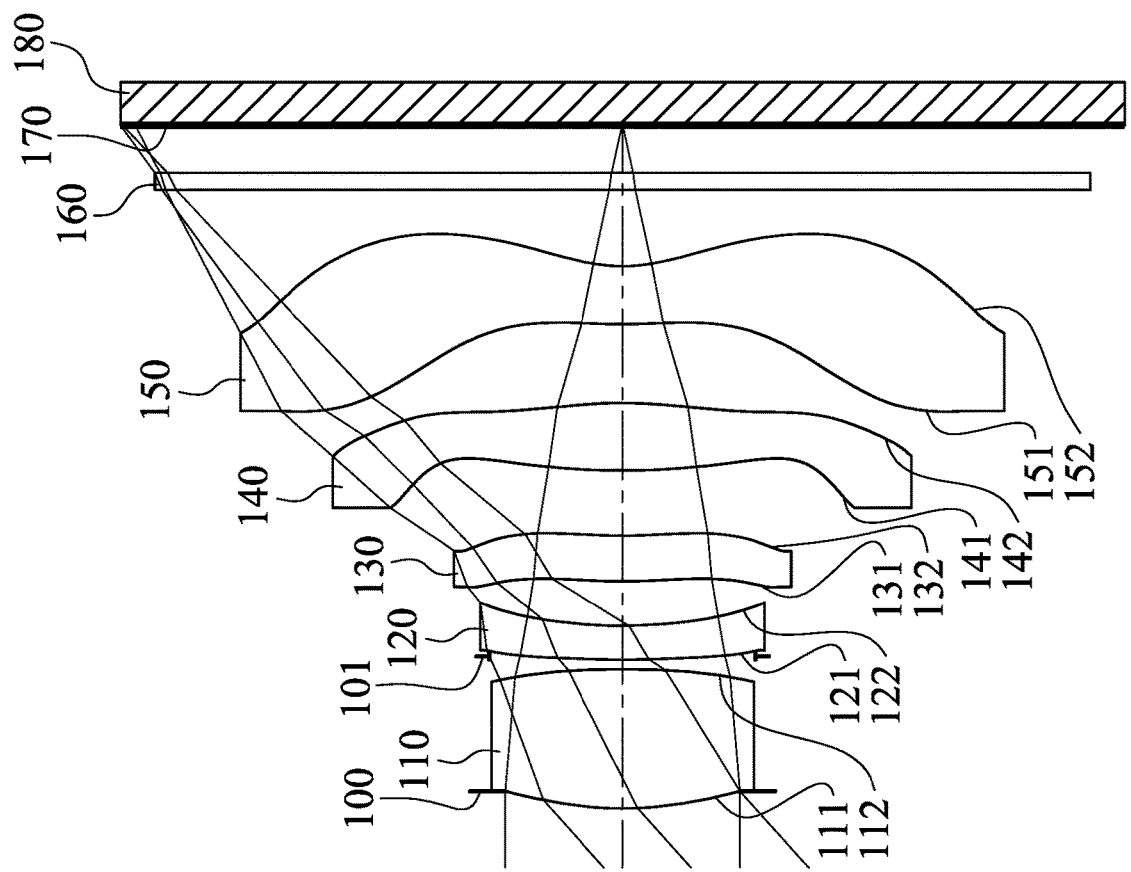
FIG. 1 is a schematic view of an imaging apparatus according to the 1st embodiment of the present disclosure.

An image capturing optical lens assembly includes five lens elements, which are, in order from an object side to an image side along an optical path: a first lens element, a second lens element, a third lens element, a fourth lens element and a fifth lens element. Each of the five lens elements has an object-side surface towards the object side and an image-side surface towards the image side.

The first lens element has positive refractive power, which is favorable for reducing the total track length of the image capturing optical lens assembly. The first lens element has the object-side surface being convex in a paraxial region thereof, so that the light from each field of view can enter the image capturing optical lens assembly evenly so as to enhance the relative illumination of the off-axis region of an image surface.

The second lens element has negative refractive power, which is favorable for balancing aberrations generated from the reduction of the total track length of the image capturing optical lens assembly. The second lens element has the image-side surface being concave in a paraxial region thereof, which is favorable for reducing aberrations, such as coma aberration.

The fourth lens element has positive refractive power, which is favorable for dispersing positive refractive power of the image capturing optical lens assembly so as to reduce sensitivity of single lens element. The fourth lens element has the image-side surface being convex in a paraxial region thereof, so that the traveling direction of light can be adjusted for enlarging the area of the image surface.

The fifth lens element has negative refractive power, which is favorable for correcting aberrations by balancing refractive power on the image side of the image capturing optical lens assembly. The fifth lens element has the image-side surface being concave in a paraxial region thereof, so that the back focal length of the image capturing optical lens assembly can be adjusted. At least one of the object-side surface and the image-side surface of the fifth lens element includes at least one critical point in an off-axis region thereof, so that it is favorable for correcting off-axis aberration and enhancing illumination of the peripheral region of the image surface by enhancing the variation of the lens surface. Further, the image-side surface of the fifth lens element includes at least one critical point in an off-axis region thereof, so that it is favorable for decreasing off-axis aberration and adjusting the incident angle of light on the image surface so as to enhance the response efficiency of the image sensor.

When an Abbe number of the second lens element is V2, an Abbe number of the third lens element is V3, and an Abbe number of the fourth lens element is V4, the following condition is satisfied: $30.0<V2+V3+V4<90.0$. Therefore, it is favorable for reducing chromatic aberration by adjusting the arrangement of the material of lens elements. Further, the following condition can be satisfied: $45.0<V2+V3+V4<85.0$. Moreover, the following condition can be satisfied: $70.0<V2+V3+V4<85.0$.

When a focal length of the image capturing optical lens assembly is f, and an axial distance between the object-side surface of the first lens element and the image surface is TL, the following condition is satisfied: $1.10 \leq TL/f$. Therefore, it is favorable for obtaining the balance between the total track length and field of view of the image capturing optical lens assembly. Further, the following condition can be satisfied: $1.10 \leq TL/f<1.50$. Moreover, the following condition can be satisfied: $1.10 \leq TL/f<1.40$. Furthermore, the following condition can be satisfied: $1.10 \leq TL/f<1.30$.

When a central thickness of the fourth lens element is CT4, and a central thickness of the fifth lens element is CT5, the following condition is satisfied: $0.70<CT4/CT5$. Therefore, it is favorable for adjusting the volume of the image capturing optical lens assembly on the image side by the cooperation of the fourth lens element and the fifth lens element. Further, the following condition can be satisfied: $0.80<CT4/CT5<2.0$. Moreover, the following condition can be satisfied: $0.90<CT4/CT5<1.6$.

When the Abbe number of the second lens element is V2, and a refractive index of the second lens element is N2, the following condition is satisfied: $7.0<V2/N2<12.5$. Therefore, it is favorable for compressing the volume and correcting aberrations of the image capturing optical lens assembly by adjusting the material of the second lens element. Further, the following condition can be satisfied: $8.0<V2/N2<12.0$.

When an axial distance between the third lens element and the fourth lens element is T34, and an axial distance between the fourth lens element and the fifth lens element is T45, the following condition is satisfied: $0<T34/T45<3.7$. Therefore, it is favorable for obtaining the balance among the volume, field of view and the size of the image surface by adjusting the arrangement of the lens elements. Further, the following condition can be satisfied: $0<T34/T45<3.0$. Moreover, the following condition can be satisfied: $0.15<T34/T45<2.4$. Furthermore, the following condition can be satisfied: $0.30<T34/T45<1.8$. Moreover, the following condition can be satisfied: $0.45<T34/T45<1.0$.

When the axial distance between the third lens element and the fourth lens element is T34, and the central thickness of the fifth lens element is CT5, the following condition is satisfied: $0.65<T34/CT5<1.45$. Therefore, it is favorable for compressing the volume of the image capturing optical lens assembly on the image side by adjusting the arrangement of the lens elements. Further, the following condition can be satisfied: $0.75<T34/CT5 \leq 1.30$.

When a half of a maximum field of view of the image capturing optical lens assembly is HFOV, the following condition is satisfied: $30.0$ degrees$<HFOV$. Therefore, it is favorable for obtaining the characteristic of wide field of view of the image capturing optical lens assembly. Further, the following condition can be satisfied: $35.0$ degrees$<HFOV$. Moreover, the following condition can be satisfied: $35.0$ degrees$<HFOV<50.0$ degrees. Hence, it is favorable for avoiding aberrations, such as distortion, due to excessive field of view. Furthermore, the following condition can be satisfied: $40.0$ degrees$\leq HFOV<45.0$ degrees.

When a curvature radius of the image-side surface of the fifth lens element is R10, and the focal length of the image capturing optical lens assembly is f, the following condition is satisfied: $0<R10/f<3.0$. Therefore, it is favorable for correcting aberrations and adjusting the back focal length of the image capturing optical lens assembly by adjusting the surface shape and refractive power of the fifth lens element. Further, the following condition can be satisfied: $0<R10/f<2.0$. Moreover, the following condition can be satisfied: $0<R10/f<1.0$. Furthermore, the following condition can be satisfied: $0<R10/f<0.60$. Furthermore, the following condition can be satisfied: $0.20<R10/f<0.60$.

When a central thickness of the first lens element is CT1, and the axial distance between the fourth lens element and the fifth lens element is T45, the following condition is satisfied: $0<CT1/T45<3.2$. Therefore, it is favorable for obtaining the balance among the volume, field of view and the size of the image surface by adjusting the arrangement of the lens elements. Further, the following condition can be satisfied: $0.50<CT1/T45<2.5$. Moreover, the following condition can be satisfied: $1.0<CT1/T45<1.9$.

When an axial distance between the second lens element and the third lens element is T23, and the central thickness of the fifth lens element is CT5, the following condition is satisfied: $0.42<T23/CT5<1.6$. Therefore, it is favorable for balancing the volume arrangement of the object side and the image side of the image capturing optical lens assembly. Further, the following condition can be satisfied: $0.55<T23/CT5<1.3$. Moreover, the following condition can be satisfied: $0.70<T23/CT5<1.0$.

When the axial distance between the third lens element and the fourth lens element is T34, and a central thickness of the second lens element is CT2, the following condition is satisfied: $0<T34/CT2<13.0$. Therefore, it is favorable for adjusting the traveling direction of light so as to compress the volume of the object side of the image capturing optical lens assembly. Further, the following condition can be satisfied: $1.0<T34/CT2<9.0$. Moreover, the following condition can be satisfied: $1.3<T34/CT2<6.0$. Furthermore, the following condition can be satisfied: $1.3<T34/CT2<2.5$.

When the Abbe number of the second lens element is V2, and the Abbe number of the fourth lens element is V4, the following condition is satisfied: $0.70<V4/V2<2.55$. Therefore, it is favorable for correcting chromatic aberration by coordinating the second lens element and the fourth lens element. Further, the following condition can be satisfied:

$1.25 < V4/V2 \leq 2.51$. Moreover, the following condition can be satisfied: $1.65 < V4/V2 \leq 2.51$.

When the focal length of the image capturing optical lens assembly is f, and the central thickness of the first lens element is CT1, the following condition is satisfied: $2.5 < f/CT1 < 5.0$. Therefore, it is favorable for compressing the volume of the image capturing optical lens assembly on the object side by adjusting the surface shape of the first lens element and the refractive power thereof. Further, the following condition can be satisfied: $3.1 < f/CT1 < 4.5$.

When the central thickness of the first lens element is CT1, and a distance in parallel with an optical axis between a maximum effective radius position on the object-side surface of the first lens element and a maximum effective radius position on the image-side surface of the first lens element is ET1, the following condition is satisfied: $1.0 < CT1/ET1 < 1.6$. Therefore, it is favorable for compressing the outer diameter of the first lens element by adjusting the surface shape of the first lens element. Further, the following condition can be satisfied: $1.1 < CT1/ET1 < 1.5$.

When the axial distance between the third lens element and the fourth lens element is T34, and the central thickness of the fourth lens element is CT4, the following condition is satisfied: $0.70 < T34/CT4 < 1.3$. Therefore, it is favorable for adjusting the traveling direction of the light by coordinating the third lens element and the fourth lens element so as to enlarge the field of view and the area of the image surface.

When an axial distance between the first lens element and the second lens element is T12, and the axial distance between the third lens element and the fourth lens element is T34, the following condition is satisfied: $5.3 < T34/T12 < 16$. Therefore, it is favorable for balancing the volume arrangement of the object side and the image side of the image capturing optical lens assembly by adjusting the arrangement of the lens elements.

When the focal length of the image capturing optical lens assembly is f, and a maximum distance between an optical effective region of the image-side surface of the fifth lens element and the optical axis is Y52, the following condition is satisfied: $1.0 < f/Y52 < 2.0$. Therefore, it is favorable for obtaining the balance between the field of view and the size of the image surface.

When an f-number of the image capturing optical lens assembly is Fno, the following condition is satisfied: $1.60 < Fno < 2.80$. Therefore, it is favorable for obtaining the balance between the depth of field and the illumination. Further, the following condition can be satisfied: $2.00 \leq Fno < 2.45$.

When an axial distance between the object-side surface of the first lens element and the image-side surface of the fifth lens element is TD, and the focal length of the image capturing optical lens assembly is f, the following condition is satisfied: $0.80 < TD/f < 1.1$. Therefore, it is favorable for obtaining the balance between the volume and field of view of the image capturing optical lens assembly. Further, the following condition can be satisfied: $0.90 < TD/f < 1.0$.

When the axial distance between the object-side surface of the first lens element and the image surface is TL, and a maximum image height of the image capturing optical lens assembly is ImgH, the following condition is satisfied: $0.80 < TL/ImgH < 1.8$. Therefore, it is favorable for obtaining the balance among the volume, the size of the image surface and the field of view of the image capturing optical lens assembly. Further, the following condition can be satisfied: $1.0 < TL/ImgH < 1.6$.

When a curvature radius of the object-side surface of the fifth lens element is R9, and the curvature radius of the image-side surface of the fifth lens element is R10, the following condition is satisfied: $0.10 < (R9+R10)/(R9-R10) < 2.7$. Therefore, it is favorable for correcting aberrations by adjusting the surface shape of the fifth lens element.

When a focal length of the first lens element is f1, and a focal length of the fifth lens element is f5, the following condition is satisfied: $-2.0 < f1/f5 < -0.5$. Therefore, it is favorable for balancing the arrangement of the refractive power of the image capturing optical lens assembly.

When a distance between the critical point of the image-side surface of the fifth lens element and the optical axis is Yc52, and the maximum distance between the optical effective region of the image-side surface of the fifth lens element and the optical axis is Y52, the image-side surface of the fifth lens element includes at least one critical point in the off-axis region thereof satisfying the following condition: $0.40 < Yc52/Y52 < 0.50$. Therefore, it is favorable for enhancing the image quality of the image surface in an off-axis region thereof by further adjusting the surface shape of the fifth lens element.

When an Abbe number of the first lens element is V1, the Abbe number of the second lens element is V2, the Abbe number of the third lens element is V3, the Abbe number of the fourth lens element is V4, and an Abbe number of the fifth lens element is V5, the following condition is satisfied: $1.25 < (V1+V5)/(V2+V3+V4) < 2.50$. Therefore, it is favorable for correcting aberration by coordinating the material of each lens element. Further, the following condition can be satisfied: $1.30 < (V1+V5)/(V2+V3+V4) < 2.10$.

When a sum of central thicknesses of all lens elements of the image capturing optical lens assembly is $\Sigma CT$, and a sum of all axial distances between adjacent lens elements of the image capturing optical lens assembly is $\Sigma AT$, the following condition is satisfied: $1.2 < \Sigma CT/\Sigma AT < 2.0$. Therefore, it is favorable for compressing the size of the image capturing optical lens assembly by adjusting the lens elements arrangement.

When the axial distance between the object-side surface of the first lens element and the image-side surface of the fifth lens element is TD, and the central thickness of the first lens element is CT1, the following condition is satisfied: $2.0 < TD/CT1 < 4.8$. Therefore, it is favorable for compressing the size of the image capturing optical lens assembly on the object side by adjusting the lens elements arrangement. Further, the following condition can be satisfied: $3.1 < TD/CT1 < 4.4$.

When an entrance pupil diameter of the image capturing optical lens assembly is EPD, and the distance in parallel with the optical axis between the maximum effective radius position on the object-side surface of the first lens element and the maximum effective radius position on the image-side surface of the first lens element is ET1, the following condition is satisfied: $1.2 < EPD/ET1 < 3.3$. Therefore, it is favorable for obtaining the balance between the size of aperture and the outer diameter of lens element. Further, the following condition can be satisfied: $1.7 < EPD/ET1 < 2.7$.

When the focal length of the image capturing optical lens assembly is f, the focal length of the first lens element is f1, a focal length of the second lens element is f2, a focal length of the third lens element is f3, a focal length of the fourth lens element is f4, and the focal length of the fifth lens element is f5, at least one of the following conditions is satisfied: $0.90 < f/f1 < 1.5$; $-0.80 < f/f2 < -0.20$; $-0.45 < f/f3 < 0.40$; $0.50 < f/f4 < 1.6$; and $-2.0 < f/f5 < -0.70$. Therefore, the refractive power of the lens elements can be adjusted, which is favorable for correcting aberrations, reducing the sensitivity of single lens element and adjusting the field of view.

When the Abbe number of the second lens element is V2, the Abbe number of the third lens element is V3, and the Abbe number of the fourth lens element is V4, the following condition is satisfied: $0.30<V4/(V2+V3)<1.30$. Therefore, it is favorable for correcting aberrations, such as chromatic aberration, by arranging the material of the second lens element, the third lens element and the fourth lens element. Further, the following condition can be satisfied: $0.50<V4/(V2+V3)<1.25$.

When the focal length of the first lens element is f1, and the central thickness of the first lens element is CT1, the following condition is satisfied: $2.0<f1/CT1<5.0$. Therefore, it is favorable for compressing the size of the image capturing optical lens assembly on the object side by adjusting the refractive power of the first lens element. Further, the following condition can be satisfied: $2.5<f1/CT1<4.5$.

When the distance in parallel with the optical axis between the maximum effective radius position on the object-side surface of the first lens element and the maximum effective radius position on the image-side surface of the first lens element is ET1, and a distance in parallel with the optical axis between a maximum effective radius position on the object-side surface of the second lens element and a maximum effective radius position on the image-side surface of the second lens element is ET2, the following condition is satisfied: $1.6<ET1/ET2<5.0$. Therefore, it is favorable for compressing the volume of the image capturing optical lens assembly on the object side by coordinating the first lens element and the second lens element. Further, the following condition can be satisfied: $1.8<ET1/ET2<4.0$.

When a maximum among central thicknesses of all the lens elements of the image capturing optical lens assembly is CTmax, and a minimum among central thicknesses of all the lens elements of the image capturing optical lens assembly is CTmin, the following condition is satisfied: $3.8<CTmax/CTmin<5.5$. Therefore, it is favorable for compressing the volume and correcting aberration of the image capturing optical lens assembly by adjusting the arrangement of the lens elements.

At least one of the object-side surface and the image-side surface of each of at least two of the five lens elements includes at least one inflection point. Therefore, it is favorable for correcting aberrations and compressing the volume of the image capturing optical lens assembly by enhancing the variation of the surfaces of the lens elements. Further, at least one of the object-side surface and the image-side surface of each of at least three of the five lens elements includes at least one inflection point. Moreover, each of the object-side surface and the image-side surface of the lens element of the five lens elements can include at least one inflection point. Therefore, it is favorable for further correcting aberrations and compressing the volume of the image capturing optical lens assembly by enhancing the variation of the surfaces of the lens elements.

When the focal length of the image capturing optical lens assembly is f, and the maximum image height of the image capturing optical lens assembly is ImgH, the following condition is satisfied: $0.80<f/ImgH<1.4$. Therefore, it is favorable for obtaining the balance between the field of view and the size of the image surface.

When a maximum distance between an optical effective region of the object-side surface of the first lens element and the optical axis is Y11, and the maximum distance between the optical effective region of the image-side surface of the fifth lens element and the optical axis is Y52, the following condition is satisfied: $2.0<Y52/Y11<5.0$. Therefore, it is favorable for obtaining the balance among field of view, volume and size of the image surface by adjusting the ratio of the outer diameters of the lens elements. Further, the following condition can be satisfied: $2.4<Y52/Y11<4.0$.

Each of the aforementioned features of the image capturing optical lens assembly can be utilized in various combinations for achieving the corresponding effects.

According to the image capturing optical lens assembly of the present disclosure, the lens elements thereof can be made of glass or plastic materials. When the lens elements are made of glass materials, the distribution of the refractive power of the image capturing optical lens assembly may be more flexible to design. The glass lens element can either be made by grinding or molding. When the lens elements are made of plastic materials, manufacturing costs can be effectively reduced. Furthermore, surfaces of each lens element can be arranged to be aspheric (ASP), since the aspheric surface of the lens element is easy to form a shape other than a spherical surface so as to have more controllable variables for eliminating aberrations thereof, and to further decrease the required amount of lens elements in the image capturing optical lens assembly. Therefore, the total track length of the image capturing optical lens assembly can also be reduced. The aspheric surfaces may be formed by a plastic injection molding method, a glass molding method or other manufacturing methods.

According to the image capturing optical lens assembly of the present disclosure, additives can be selectively added into any one (or more) material of the lens elements so as to change the transmittance of the lens element in a particular wavelength range. Therefore, the stray light and chromatic aberration can be reduced. For example, the additives can have the absorption ability for lights in a wavelength range of 600 nm-800 nm in the image capturing optical lens assembly so as to reduce extra red light or infrared lights, or the additives can have the absorption ability for lights in a wavelength range of 350 nm-450 nm in the image capturing optical lens assembly so as to reduce blue light or ultraviolet lights. Therefore, additives can prevent the image from interfering by lights in a particular wavelength range. Furthermore, the additives can be homogeneously mixed with the plastic material, and the lens elements can be made by the injection molding method.

According to the image capturing optical lens assembly of the present disclosure, when a surface of the lens element is aspheric, it indicates that entire optical effective region of the surface of the lens element or a part thereof is aspheric.

According to the image capturing optical lens assembly of the present disclosure, when the lens elements have surfaces being convex and the convex surface position is not defined, it indicates that the aforementioned surfaces of the lens elements can be convex in the paraxial region thereof. When the lens elements have surfaces being concave and the concave surface position is not been defined, it indicates that the aforementioned surfaces of the lens elements can be concave in the paraxial region thereof. In the image capturing optical lens assembly of the present disclosure, if the lens element has positive refractive power or negative refractive power, or the focal length of the lens element, all can be referred to the refractive power, or the focal length, in the paraxial region of the lens element.

According to the image capturing optical lens assembly of the present disclosure, a critical point is a non-axial point of the lens surface where its tangent is perpendicular to the optical axis.

According to the image capturing optical lens assembly of the present disclosure, the definition of the inflection point is a point on a lens surface with a curvature changing from positive to negative or from negative to positive.

According to the image capturing optical lens assembly of the present disclosure, the image surface thereof, based on the corresponding image sensor, can be flat or curved. In particular, the image surface can be a concave curved surface facing towards the object side. Furthermore, the image capturing optical lens assembly of the present disclosure can selectively include at least one image correcting element (such as a field flattener) inserted between the lens element closest to the image surface and the image surface, thus the effect of correcting image aberrations (such as field curvature) can be achieved. The optical properties of the aforementioned image correcting element, such as curvature, thickness, refractive index, position, surface shape (convex or concave, spherical or aspheric, diffraction surface and Fresnel surface, etc.) can be adjusted corresponding to the demands of the imaging apparatus. Generally, a preferred configuration of the image correcting element is to dispose a thin plano-concave element having a concave surface toward the object side on the position closed to the image surface.

Figure 21A:
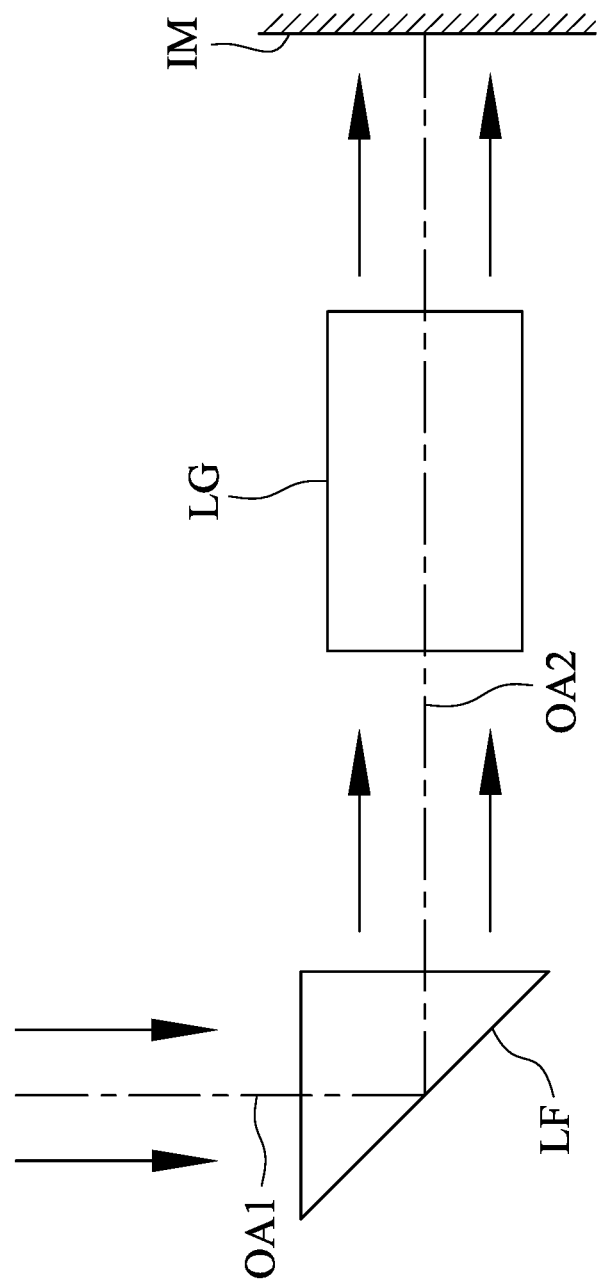
FIG. 21A is a schematic view of an arrangement of a light path folding element in the image capturing optical lens assembly of the present disclosure.
Figure 21B:
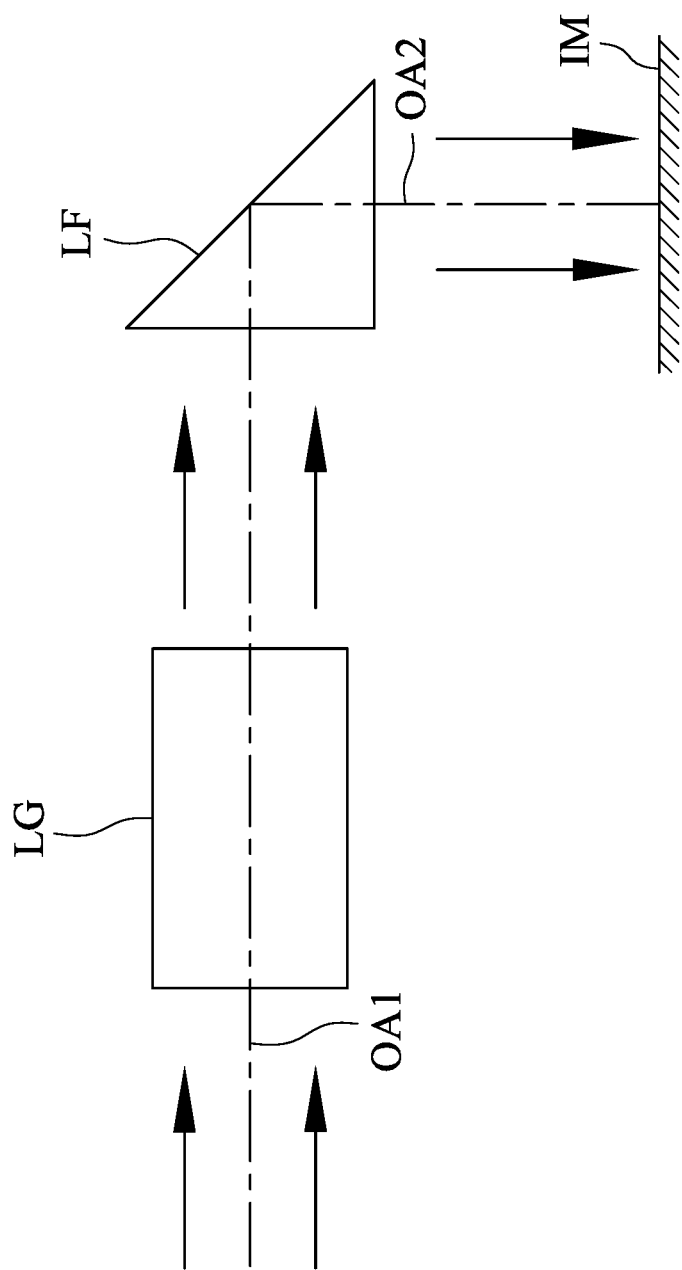
FIG. 21B is a schematic view of another arrangement of the light path folding element in the image capturing optical lens assembly of the present disclosure.
Figure 21C:
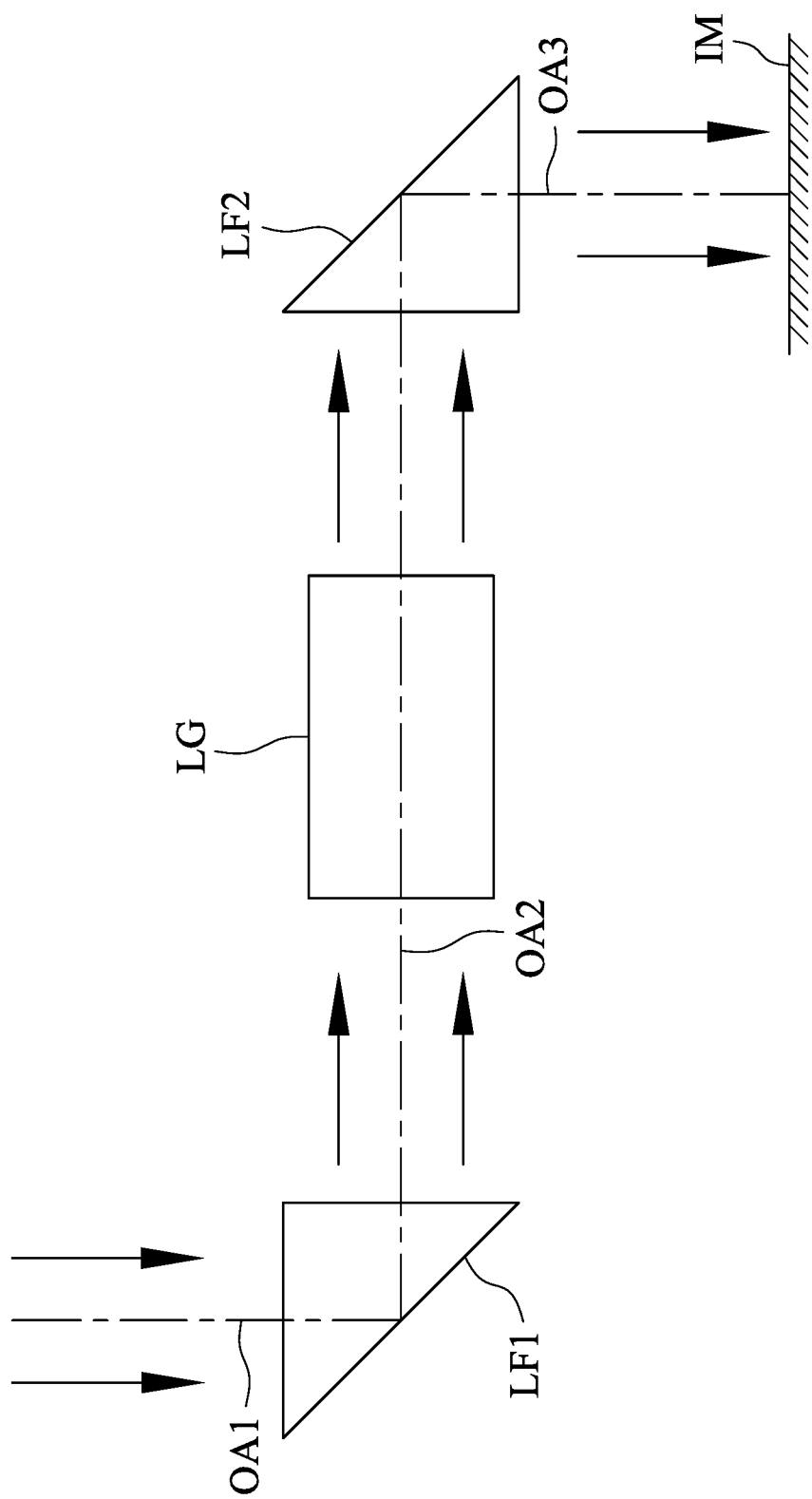
FIG. 21C is a schematic view of an arrangement of two light path folding elements in the image capturing optical lens assembly of the present disclosure.

According to the image capturing optical lens assembly of the present disclosure, at least one element with light path folding function can be selectively disposed between the imaged object and the image surface, such as a prism or a mirror, etc. Therefore it is favorable for providing high flexible space arrangement of the image capturing optical lens assembly, so that the compactness of the electronic device would not be restricted by the optical total track length of the image capturing optical lens assembly. FIG. 21A is a schematic view of an arrangement of a light path folding element LF in the image capturing optical lens assembly of the present disclosure. FIG. 21B is a schematic view of another arrangement of the light path folding element LF in the image capturing optical lens assembly of the present disclosure. As shown in FIGS. 21A and 21B, the image capturing optical lens assembly includes, in order from an imaged object (not shown in drawings) to an image surface IM, a first optical axis OA1, the light path folding element LF and a second optical axis OA2, wherein the light path folding element LF can be disposed between the imaged object and a lens group LG of the image capturing optical lens assembly as shown in FIG. 21A, or can be disposed between the lens group LG of the image capturing optical lens assembly and the image surface IM as shown in FIG. 21B. Moreover, FIG. 21C is a schematic view of an arrangement of two light path folding elements LF1, LF2 in the image capturing optical lens assembly of the present disclosure. As shown in FIG. 21C, the image capturing optical lens assembly includes, in order from an imaged object (not shown in drawings) to an image surface IM, a first optical axis OA1, the light path folding element LF1, a second optical axis OA2, the light path folding element LF2 and a third optical axis OA3, wherein the light path folding element LF1 is disposed between the imaged object and a lens group LG of the image capturing optical lens assembly, and the light path folding element LF2 is disposed between the lens group LG of the image capturing optical lens assembly and the image surface IM. The image capturing optical lens assembly can also be selectively disposed with three or more light path folding element, the type, amount and location of the light path folding element will not be limited to the present disclosure.

Furthermore, according to the image capturing optical lens assembly of the present disclosure, the image capturing optical lens assembly can include at least one stop, such as an aperture stop, a glare stop or a field stop, for eliminating stray light and thereby improving image resolution thereof.

According to the image capturing optical lens assembly of the present disclosure, the aperture stop can be configured as a front stop or a middle stop, wherein the front stop indicates that the aperture stop is disposed between an object and the first lens element, and the middle stop indicates that the aperture stop is disposed between the first lens element and the image surface. When the aperture stop is a front stop, a longer distance between an exit pupil of the image capturing optical lens assembly and the image surface can be obtained, and thereby obtains a telecentric effect and improves the image-sensing efficiency of the image sensor, such as CCD or CMOS. The middle stop is favorable for enlarging the field of view of the image capturing optical lens assembly and thereby provides a wider field of view for the same.

According to the image capturing optical lens assembly of the present disclosure, an aperture control unit can be properly configured. The aperture control unit can be a mechanical element or a light controlling element, and the dimension and the shape of the aperture control unit can be electrically controlled. The mechanical element can include a moveable component such a blade group or a shielding plate. The light controlling element can include a screen component such as a light filter, an electrochromic material, a liquid crystal layer or the like. The amount of incoming light or the exposure time of the image can be controlled by the aperture control unit to enhance the image moderation ability. In addition, the aperture control unit can be the aperture stop of the image capturing optical lens assembly according to the present disclosure, so as to moderate the image quality by changing f-number such as changing the depth of field or the exposure speed.

According to the image capturing optical lens assembly of the present disclosure, the image capturing optical lens assembly of the present disclosure can be applied to 3D (three-dimensional) image capturing applications, in products such as digital cameras, mobile devices, digital tablets, smart TVs, surveillance systems, motion sensing input devices, driving recording systems, rearview camera systems, wearable devices, unmanned aerial vehicles, and other electronic imaging products.

According to the present disclosure, an imaging apparatus including the aforementioned image capturing optical lens assembly and an image sensor is provided, wherein the image sensor is disposed on the image surface of the image capturing optical lens assembly. By adjusting the arrangement of the material of the lens elements and properly arranging the relationship between the total track length and the focal length, chromatic aberration can be reduced and the balance between the total track length and the field of view can be obtained. Moreover, the imaging apparatus can further include a barrel member, a holder member or a combination thereof.

According to the present disclosure, an electronic device including the aforementioned imaging apparatus is provided. Therefore, the image quality can be increased. Moreover, the electronic device can further include a control unit, a display, a storage unit, a random-access memory unit (RAM) or a combination thereof.

According to the above description of the present disclosure, the following specific 1st-11th embodiments are provided for further explanation.

1st Embodiment

Figure 2:
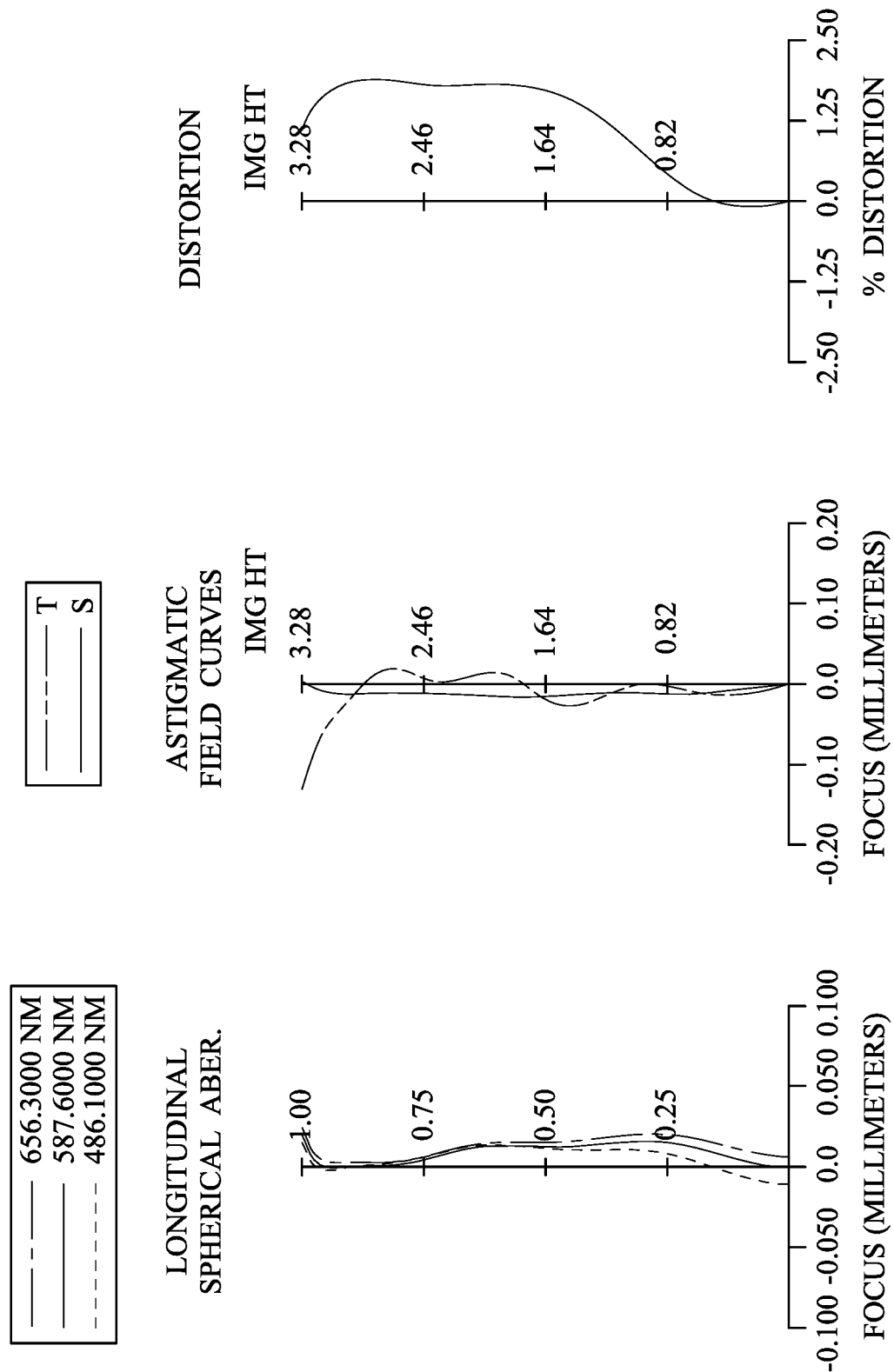
FIG. 2 shows spherical aberration curves, astigmatic field curves and a distortion curve of the imaging apparatus according to the 1st embodiment.

FIG. 1 is a schematic view of an imaging apparatus according to the 1st embodiment of the present disclosure. FIG. 2 shows spherical aberration curves, astigmatic field curves and a distortion curve of the imaging apparatus according to the 1st embodiment. In FIG. 1, the imaging apparatus includes an image capturing optical lens assembly (its reference numeral is omitted) and an image sensor 180. The image capturing optical lens assembly includes, in order from an object side to an image side along an optical path, an aperture stop 100, a first lens element 110, a stop 101, a second lens element 120, a third lens element 130, a fourth lens element 140, a fifth lens element 150, a filter 160 and an image surface 170, wherein the image sensor 180 is disposed on the image surface 170 of the image capturing optical lens assembly. The image capturing optical lens assembly includes five lens elements (110, 120, 130, 140, 150) without additional one or more lens elements inserted between the first lens element 110 and the fifth lens element 150.

Figure 17:
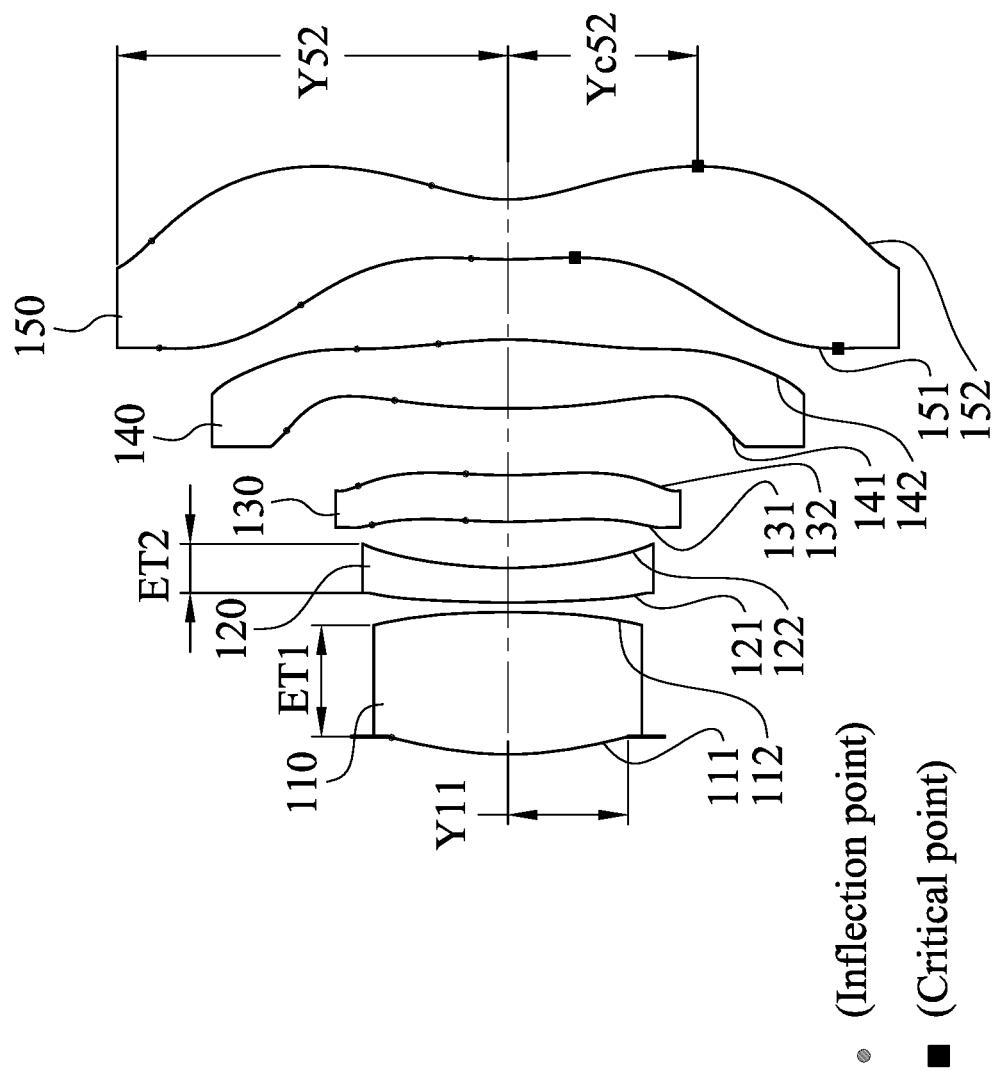
FIG. 17 is a schematic view of partial parameters, inflection points and critical points according to the 1st embodiment of FIG. 1.

The first lens element 110 with positive refractive power has an object-side surface 111 being convex in a paraxial region thereof and an image-side surface 112 being convex in a paraxial region thereof. The first lens element 110 is made of a glass material, and has the object-side surface 111 and the image-side surface 112 being both aspheric. Furthermore, FIG. 17 is a schematic view of partial parameters, inflection points and critical points according to the 1st embodiment of FIG. 1, wherein the symbol "●" represents the inflection point, the symbol "■" represents the critical point. In FIG. 17, the object-side surface 111 of the first lens element 110 includes one inflection point in an off-axis region thereof.

The second lens element 120 with negative refractive power has an object-side surface 121 being convex in a paraxial region thereof and an image-side surface 122 being concave in a paraxial region thereof. The second lens element 120 is made of a plastic material, and has the object-side surface 121 and the image-side surface 122 being both aspheric.

The third lens element 130 with positive refractive power has an object-side surface 131 being convex in a paraxial region thereof and an image-side surface 132 being concave in a paraxial region thereof. The third lens element 130 is made of a plastic material, and has the object-side surface 131 and the image-side surface 132 being both aspheric. Furthermore, the object-side surface 131 of the third lens element 130 includes two inflection points in an off-axis region thereof, and the image-side surface 132 of the third lens element 130 includes two inflection points in an off-axis region thereof.

The fourth lens element 140 with positive refractive power has an object-side surface 141 being convex in a paraxial region thereof and an image-side surface 142 being convex in a paraxial region thereof. The fourth lens element 140 is made of a plastic material, and has the object-side surface 141 and the image-side surface 142 being both aspheric. Furthermore, the object-side surface 141 of the fourth lens element 140 includes two inflection points in an off-axis region thereof, and the image-side surface 142 of the fourth lens element 140 includes two inflection points in an off-axis region thereof.

The fifth lens element 150 with negative refractive power has an object-side surface 151 being convex in a paraxial region thereof and an image-side surface 152 being concave in a paraxial region thereof. The fifth lens element 150 is made of a plastic material, and has the object-side surface 151 and the image-side surface 152 being both aspheric. Furthermore, the object-side surface 151 of the fifth lens element 150 includes three inflection points and two critical points in an off-axis region thereof, and the image-side surface 152 of the fifth lens element 150 includes two inflection points and one critical point in an off-axis region thereof.

The filter 160 is made of a glass material, which is located between the fifth lens element 150 and the image surface 170 in order, and will not affect the focal length of the image capturing optical lens assembly.

The equation of the aspheric surface profiles of the aforementioned lens elements of the 1st embodiment is expressed as follows:

$$X(Y) = (Y^2/R)/(1 + sqrt(1 - (1+k) \times (Y/R)^2)) + \sum_{i}(Ai) \times (Y^i),$$

where,
X is the displacement in parallel with an optical axis from the intersection point of the aspheric surface and the optical axis to a point at a distance of Y from the optical axis on the aspheric surface;
Y is the vertical distance from the point on the aspheric surface to the optical axis;
R is the curvature radius;
k is the conic coefficient; and
Ai is the i-th aspheric coefficient.

In the image capturing optical lens assembly according to the 1st embodiment, when a focal length of the image capturing optical lens assembly is f, an f-number of the image capturing optical lens assembly is Fno, and a half of a maximum field of view of the image capturing optical lens assembly is HFOV, these parameters have the following values: f=3.61 mm; Fno=2.35; and HFOV=41.9 degrees.

In the image capturing optical lens assembly according to the 1st embodiment, when an Abbe number of the first lens element 110 is V1, an Abbe number of the second lens element 120 is V2, an Abbe number of the third lens element 130 is V3, an Abbe number of the fourth lens element 140 is V4, an Abbe number of the fifth lens element 150 is V5, and a refractive index of the second lens element 120 is N2, the following conditions are satisfied: (V1+V5)/(V2+V3+V4)=1.52; V2+V3+V4=78.3; V2/N2=8.76; V4/V2=2.51; and V4/(V2+V3)=0.92.

In the image capturing optical lens assembly according to the 1st embodiment, when a central thickness of the first lens element 110 is CT1, a central thickness of the second lens element 120 is CT2, a central thickness of the third lens element 130 is CT3, a central thickness of the fourth lens element 140 is CT4, a central thickness of the fifth lens element 150 is CT5, a sum of central thicknesses of all lens elements of the image capturing optical lens assembly is ΣCT, an axial distance between the first lens element 110 and the second lens element 120 is T12, an axial distance between the second lens element 120 and the third lens element 130 is T23, an axial distance between the third lens element 130 and the fourth lens element 140 is T34, an axial distance between the fourth lens element 140 and the fifth lens element 150 is T45, a sum of all axial distances between adjacent lens elements of the image capturing optical lens assembly is ΣAT, a maximum among central thicknesses of all the lens elements of the image capturing optical lens assembly is CTmax, a minimum among central thicknesses of all the lens elements of the image capturing optical lens assembly is CTmin, a distance in parallel with the optical axis between a maximum effective radius position on the object-side surface 111 of the first lens element 110 and a maximum effective radius position on the image-side surface 112 of the first lens element 110 is ET1 (labelled in FIG. 17), and a distance in parallel with the optical axis between a maximum effective radius position on the object-side surface 121 of the second lens element 120 and a maximum effective radius position on the image-side surface 122 of the second lens element 120 is ET2 (labelled in FIG. 17), the following conditions are satisfied: ΣCT/ΣAT=1.74; CT1/ET1=1.28; CT1/T45=1.77; CT4/CT5=1.15; CTmax/CTmin=4.09; ET1/ET2=2.27; T23/CT5=0.77; T34/CT2=1.92; T34/CT4=0.97; T34/CT5=1.11; T34/T12=6.89; and T34/T45=0.83. According to the 1st embodiment, the axial distance between adjacent lens elements is the distance along the optical axis between two adjacent lens surfaces of the two adjacent lens elements; ΣCT=CT1+CT2+CT3+CT4+CT5; ΣAT=T12+T23+T34+T45; CTmax=CT1; and CTmin=CT2.

In the image capturing optical lens assembly according to the 1st embodiment, when an axial distance between the object-side surface 111 of the first lens element 110 and the image-side surface 152 of the fifth lens element 150 is TD, the central thickness of the first lens element 110 is CT1, the focal length of the image capturing optical lens assembly is f, an axial distance between the object-side surface 111 of the first lens element 110 and the image surface 170 is TL, and a maximum image height of the image capturing optical lens assembly is ImgH, the following conditions are satisfied: TD/CT1=3.91; TD/f=0.98; TL/f=1.24; and TL/ImgH=1.36.

In the image capturing optical lens assembly according to the 1st embodiment, when a curvature radius of the object-side surface 151 of the fifth lens element 150 is R9, a curvature radius of the image-side surface 152 of the fifth lens element 150 is R10, and the focal length of the image capturing optical lens assembly is f, the following conditions are satisfied: (R9+R10)/(R9−R10)=1.72; and R10/f=0.28.

In the image capturing optical lens assembly according to the 1st embodiment, when the focal length of the image capturing optical lens assembly is f, the central thickness of the first lens element 110 is CT1, a focal length of the first lens element 110 is f1, a focal length of the second lens element 120 is f2, a focal length of the third lens element 130 is f3, a focal length of the fourth lens element 140 is f4, a focal length of the fifth lens element 150 is f5, the maximum image height of the image capturing optical lens assembly is ImgH, and a maximum distance between an optical effective region of the image-side surface 152 of the fifth lens element 150 and the optical axis is Y52 (labelled in FIG. 17), the following conditions are satisfied: f/CT1=3.97; f/f1=0.97; f/f2=−0.41; f/f3=0.03; f/f4=1.05; f/f5=−1.36; f/ImgH=1.10; f/Y52=1.44; f1/CT1=4.08; and f1/f5=−1.40.

In the image capturing optical lens assembly according to the 1st embodiment, when an entrance pupil diameter of the image capturing optical lens assembly is EPD, the distance in parallel with the optical axis between the maximum effective radius position on the object-side surface 111 of the first lens element 110 and the maximum effective radius position on the image-side surface 112 of the first lens element 110 is ET1, a maximum distance between an optical effective region of the object-side surface 111 of the first lens element 110 and the optical axis is Y11 (labelled in FIG. 17), the maximum distance between the optical effective region of the image-side surface 152 of the fifth lens element 150 and the optical axis is Y52, and a distance between the critical point of the image-side surface 152 of the fifth lens element 150 and the optical axis is Yc52 (labelled in FIG. 17), the following conditions are satisfied: EPD/ET1=2.15; Y52/Y11=3.25; and Yc52/Y52=0.49.

The detailed optical data of the 1st embodiment are shown in Table 1 and the aspheric surface data are shown in Table 2 below.

TABLE 1

1st Embodiment
f = 3.61 mm, Fno = 2.35, HFOV = 41.9 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.113 | | | | |
| 2 | Lens 1 | 2.326 | ASP | 0.909 | Glass | 1.542 | 62.9 | 3.71 |
| 3 | | −12.854 | ASP | 0.084 | | | | |
| 4 | Stop | Plano | | −0.022 | | | | |
| 5 | Lens 2 | 5.024 | ASP | 0.222 | Plastic | 1.701 | 14.9 | −8.86 |
| 6 | | 2.727 | ASP | 0.295 | | | | |
| 7 | Lens 3 | 3.382 | ASP | 0.298 | Plastic | 1.614 | 26.0 | 121.20 |
| 8 | | 3.424 | ASP | 0.427 | | | | |
| 9 | Lens 4 | 6.129 | ASP | 0.441 | Plastic | 1.566 | 37.4 | 3.43 |
| 10 | | −2.763 | ASP | 0.513 | | | | |
| 11 | Lens 5 | 3.781 | ASP | 0.383 | Plastic | 1.544 | 56.0 | −2.65 |
| 12 | | 1.005 | ASP | 0.500 | | | | |
| 13 | Filter | Plano | | 0.110 | Glass | 1.517 | 64.2 | — |
| 14 | | Plano | | 0.311 | | | | |
| 15 | Image | Plano | | — | | | | |

Reference wavelength is 587.6 nm (d-line).
Effective radius of Surface 4 (stop 101) is 0.870 mm.

TABLE 2

Aspheric Coefficients

| Surface # | 2 | 3 | 5 | 6 | 7 |
|---|---|---|---|---|---|
| k = | −8.5802E+00 | 6.0162E+01 | 7.4022E+00 | −1.2710E+01 | −1.0750E+01 |
| A4 = | 1.9464E−02 | −3.0576E−01 | −3.4349E−01 | −1.6190E−01 | −3.8971E−01 |
| A6 = | 3.3557E−01 | 1.0606E+00 | 1.3992E+00 | 9.3551E−01 | 4.7039E−01 |
| A8 = | −2.5056E+00 | −3.1928E+00 | −3.6989E+00 | −2.3029E+00 | 3.5867E−02 |
| A10 = | 8.7890E+00 | 6.1359E+00 | 5.9511E+00 | 3.1579E+00 | −2.7951E+00 |
| A12 = | −1.7197E+01 | −6.6175E+00 | −4.9145E+00 | −2.1658E+00 | 8.6126E+00 |
| A14 = | 1.7692E+01 | 3.5621E+00 | 1.5977E+00 | 5.8602E−01 | −1.4018E+01 |
| A16 = | −7.4628E+00 | −7.2080E−01 | | | 1.2692E+01 |
| A18 = | | | | | −5.7438E+00 |
| A20 = | | | | | 9.7234E−01 |

| Surface # | 8 | 9 | 10 | 11 | 12 |
|---|---|---|---|---|---|
| k = | −1.7856E+01 | −7.2806E+00 | −3.7024E−01 | −3.8329E+00 | −5.2893E+00 |
| A4 = | −3.3521E−01 | 1.3585E−01 | 2.2864E−01 | −4.4141E−01 | −1.9315E−01 |
| A6 = | 3.1233E−01 | −3.9368E−01 | −2.1366E−01 | 3.8035E−01 | 1.5566E−01 |
| A8 = | −8.1134E−01 | 7.2044E−01 | 2.4935E−01 | −2.8354E−01 | −9.8917E−02 |
| A10 = | 2.9346E+00 | −9.4139E−01 | −2.3775E−01 | 1.5837E−01 | 4.4403E−02 |
| A12 = | −7.1546E+00 | 7.8306E−01 | 1.3400E−01 | −5.7637E−02 | −1.3840E−02 |
| A14 = | 1.0449E+01 | −4.1390E−01 | −4.4345E−02 | 1.3266E−02 | 2.9045E−03 |
| A16 = | −8.9965E+00 | 1.2951E−01 | 8.6250E−03 | −1.8757E−03 | −3.8881E−04 |
| A18 = | 4.2319E+00 | −2.0807E−02 | −9.2089E−04 | 1.4950E−04 | 2.9808E−05 |
| A20 = | −8.2982E−01 | 1.2415E−03 | 4.1720E−05 | −5.1624E−06 | −9.8943E−07 |

In Table 1, the curvature radius, the thickness and the focal length are shown in millimeters (mm). Surface numbers 0-15 represent the surfaces sequentially arranged from the object side to the image side along the optical axis. In Table 2, k represents the conic coefficient of the equation of the aspheric surface profiles. A4-A20 represent the aspheric coefficients ranging from the 4th order to the 20th order. The tables presented below for each embodiment correspond to schematic parameter and aberration curves of each embodiment, and term definitions of the tables are the same as those in Table 1 and Table 2 of the 1st embodiment. Therefore, an explanation in this regard will not be provided again.

2nd Embodiment

Figure 3:
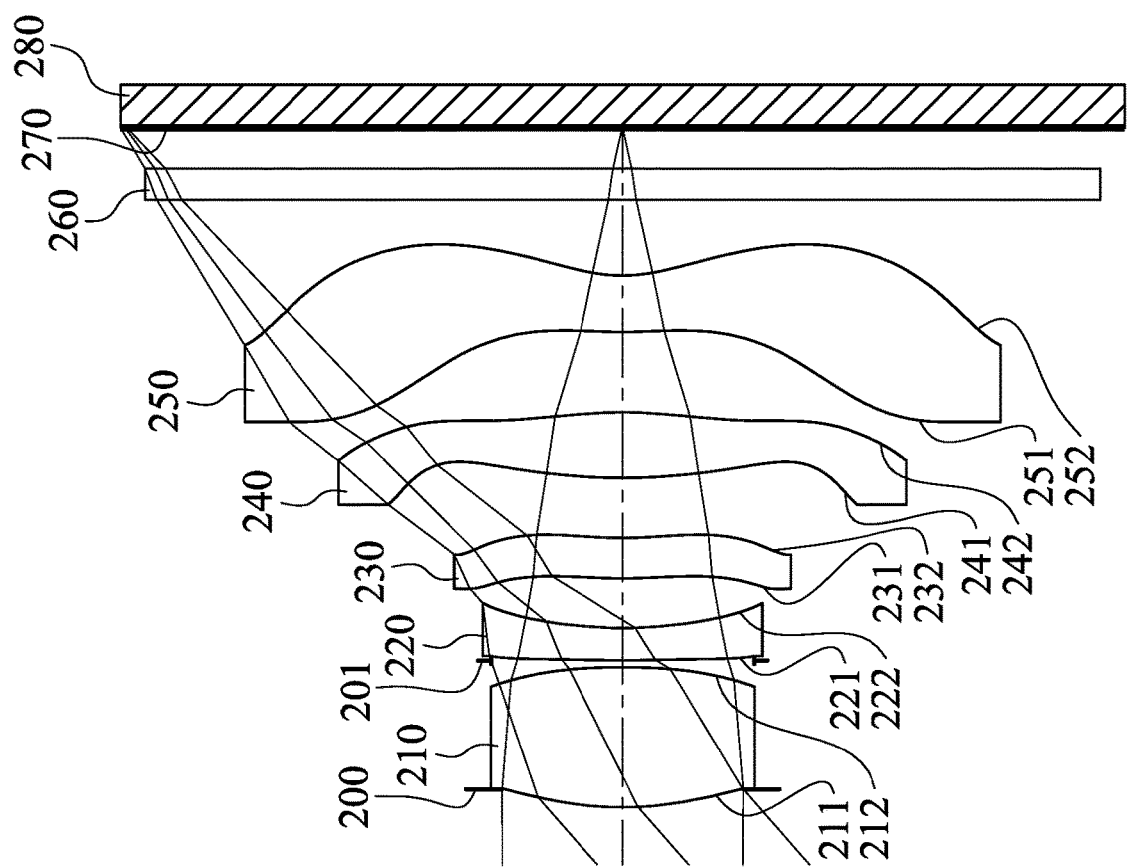
FIG. 3 is a schematic view of an imaging apparatus according to the 2nd embodiment of the present disclosure.
Figure 4:
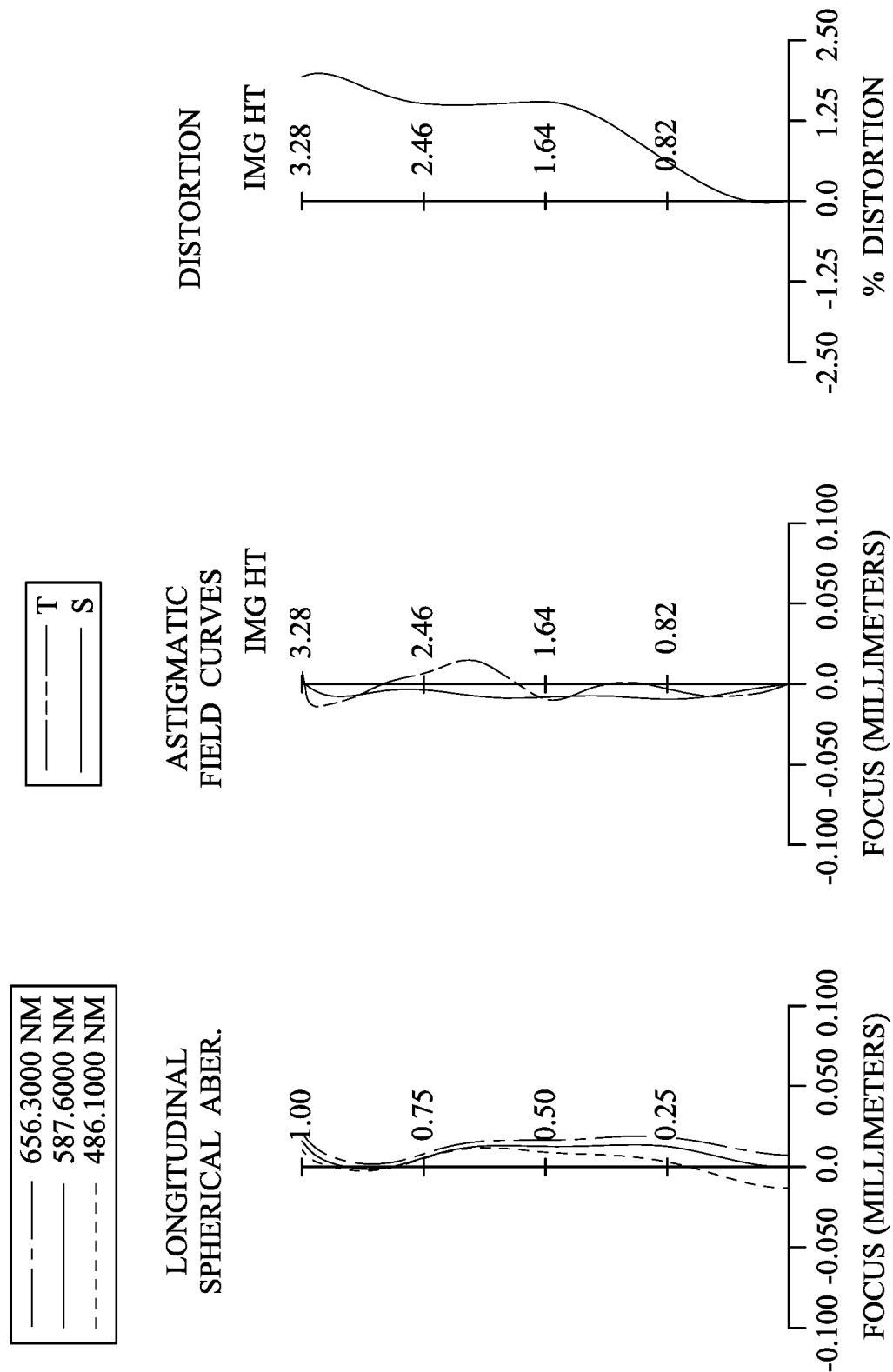
FIG. 4 shows spherical aberration curves, astigmatic field curves and a distortion curve of the imaging apparatus according to the 2nd embodiment.

FIG. 3 is a schematic view of an imaging apparatus according to the 2nd embodiment of the present disclosure. FIG. 4 shows spherical aberration curves, astigmatic field curves and a distortion curve of the imaging apparatus according to the 2nd embodiment. In FIG. 3, the imaging apparatus includes an image capturing optical lens assembly (its reference numeral is omitted) and an image sensor 280. The image capturing optical lens assembly includes, in order from an object side to an image side along an optical path, an aperture stop 200, a first lens element 210, a stop 201, a second lens element 220, a third lens element 230, a fourth lens element 240, a fifth lens element 250, a filter 260 and an image surface 270, wherein the image sensor 280 is disposed on the image surface 270 of the image capturing optical lens assembly. The image capturing optical lens assembly includes five lens elements (210, 220, 230, 240, 250) without additional one or more lens elements inserted between the first lens element 210 and the fifth lens element 250.

The first lens element 210 with positive refractive power has an object-side surface 211 being convex in a paraxial region thereof and an image-side surface 212 being convex in a paraxial region thereof. The first lens element 210 is made of a plastic material, and has the object-side surface 211 and the image-side surface 212 being both aspheric. Furthermore, the object-side surface 211 of the first lens element 210 includes one inflection point in an off-axis region thereof.

The second lens element 220 with negative refractive power has an object-side surface 221 being convex in a paraxial region thereof and an image-side surface 222 being concave in a paraxial region thereof. The second lens element 220 is made of a plastic material, and has the object-side surface 221 and the image-side surface 222 being both aspheric. Furthermore, the object-side surface 221 of the second lens element 220 includes two inflection points in an off-axis region thereof.

The third lens element 230 with negative refractive power has an object-side surface 231 being convex in a paraxial region thereof and an image-side surface 232 being concave in a paraxial region thereof. The third lens element 230 is made of a plastic material, and has the object-side surface 231 and the image-side surface 232 being both aspheric. Furthermore, the object-side surface 231 of the third lens element 230 includes two inflection points in an off-axis region thereof, and the image-side surface 232 of the third lens element 230 includes two inflection points in an off-axis region thereof.

The fourth lens element 240 with positive refractive power has an object-side surface 241 being convex in a paraxial region thereof and an image-side surface 242 being convex in a paraxial region thereof. The fourth lens element 240 is made of a plastic material, and has the object-side surface 241 and the image-side surface 242 being both aspheric. Furthermore, the object-side surface 241 of the fourth lens element 240 includes two inflection points in an off-axis region thereof, and the image-side surface 242 of the fourth lens element 240 includes two inflection points in an off-axis region thereof.

The fifth lens element 250 with negative refractive power has an object-side surface 251 being convex in a paraxial region thereof and an image-side surface 252 being concave in a paraxial region thereof. The fifth lens element 250 is made of a plastic material, and has the object-side surface 251 and the image-side surface 252 being both aspheric. Furthermore, the object-side surface 251 of the fifth lens element 250 includes three inflection points and two critical points in an off-axis region thereof, and the image-side surface 252 of the fifth lens element 250 includes two inflection points and one critical point in an off-axis region thereof.

The filter 260 is made of a glass material, which is located between the fifth lens element 250 and the image surface 270 in order, and will not affect the focal length of the image capturing optical lens assembly.

The detailed optical data of the 2nd embodiment are shown in Table 3 and the aspheric surface data are shown in Table 4 below.

In the 2nd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 2nd embodiment, so an explanation in this regard will not be provided again.

Moreover, these parameters can be calculated from Table 3 and Table 4 as the following values and satisfy the following conditions:

TABLE 3

2nd Embodiment
f = 3.60 mm, Fno = 2.30, HFOV = 41.3 deg.

| Surface # |           | Curvature Radius |     | Thickness | Material | Index | Abbe # | Focal Length |
|-----------|-----------|------------------|-----|-----------|----------|-------|--------|--------------|
| 0         | Object    | Plano            |     | 350.000   |          |       |        |              |
| 1         | Ape. Stop | Plano            |     | −0.120    |          |       |        |              |
| 2         | Lens 1    | 2.213            | ASP | 0.927     | Plastic  | 1.545 | 56.1   | 3.13         |
| 3         |           | −6.325           | ASP | 0.043     |          |       |        |              |
| 4         | Stop      | Plano            |     | 0.002     |          |       |        |              |
| 5         | Lens 2    | 7.062            | ASP | 0.213     | Plastic  | 1.669 | 19.4   | −6.53        |
| 6         |           | 2.667            | ASP | 0.329     |          |       |        |              |
| 7         | Lens 3    | 3.427            | ASP | 0.265     | Plastic  | 1.624 | 22.9   | −22.70       |
| 8         |           | 2.677            | ASP | 0.397     |          |       |        |              |
| 9         | Lens 4    | 4.452            | ASP | 0.436     | Plastic  | 1.566 | 37.4   | 3.16         |
| 10        |           | −2.890           | ASP | 0.530     |          |       |        |              |
| 11        | Lens 5    | 3.970            | ASP | 0.372     | Plastic  | 1.534 | 55.9   | −2.72        |
| 12        |           | 1.029            | ASP | 0.500     |          |       |        |              |
| 13        | Filter    | Plano            |     | 0.210     | Glass    | 1.517 | 64.2   | —            |
| 14        |           | Plano            |     | 0.267     |          |       |        |              |
| 15        | Image     | Plano            |     | —         |          |       |        |              |

Reference wavelength is 587.6 nm (d-line).
Effective radius of Surface 4 (stop 201) is 0.868 mm

TABLE 4

Aspheric Coefficients

| Surface # | 2 | 3 | 5 | 6 | 7 |
|-----------|---|---|---|---|---|
| k =  | −8.3411E+00 | 3.4001E+01 | −1.1292E+01 | −8.3493E+00 | −2.7087E+01 |
| A4 = | 4.1350E−02  | −3.5538E−01 | −3.8498E−01 | −1.4501E−01 | −4.0005E−01 |
| A6 = | 1.4363E−01  | 1.3288E+00  | 1.6934E−01  | 8.9531E−01  | 3.6965E−01  |
| A8 = | −1.2221E+00 | −3.9122E+00 | −4.7823E+00 | −2.3168E+00 | 9.1291E−01  |
| A10 = | 3.8048E+00 | 6.9802E+00  | 7.9582E+00  | 3.3073E+00  | −6.1272E+00 |
| A12 = | −6.6163E+00 | −6.6404E+00 | −6.7112E+00 | −2.3510E+00 | 1.5805E+01 |
| A14 = | 6.0701E+00 | 2.8378E+00  | 2.2314E+00  | 6.6802E−01  | −2.3199E+01 |
| A16 = | −2.3027E+00 | −2.9414E−01 |            |             | 1.9406E+01  |
| A18 = |            |             |            |             | −8.2951E+00 |
| A20 = |            |             |            |             | 1.3544E+00  |

| Surface # | 8 | 9 | 10 | 11 | 12 |
|-----------|---|---|----|----|----|
| k =  | −2.3482E+01 | −7.8382E+00 | −1.4152E−01 | −3.7794E+00 | −5.2950E+00 |
| A4 = | −3.7175E−01 | 6.8358E−02  | 1.7732E−01  | −4.6912E−01 | −2.0045E−01 |
| A6 = | 3.9635E−01  | −1.1897E−01 | −5.5958E−02 | 4.4737E−01  | 1.6765E−01  |
| A8 = | −7.1517E−01 | 1.0114E−01  | 1.9406E−02  | −3.6259E−01 | −1.0897E−01 |
| A10 = | 1.7378E+00 | −4.7243E−02 | −4.3098E−02 | 2.1168E−01  | 4.8969E−02 |
| A12 = | −3.7952E+00 | −4.3750E−02 | 3.4891E−02 | −7.9589E−02 | −1.4982E−02 |
| A14 = | 5.5932E+00 | 7.2006E−02  | −1.3762E−02 | 1.8906E−02  | 3.0539E−03 |
| A16 = | −5.0540E+00 | −4.2214E−02 | 3.0236E−03 | −2.7609E−03 | −3.9710E−04 |
| A18 = | 2.5237E+00  | 1.1768E−02  | −3.5961E−04 | 2.2734E−04 | 2.9799E−05  |
| A20 = | −5.2341E−01 | −1.2678E−03 | 1.7998E−05  | −8.1088E−06 | −9.7859E−07 |

| 2nd Embodiment | | | |
|---|---|---|---|
| f [mm] | 3.60 | TD/CT1 | 3.79 |
| Fno | 2.30 | TD/f | 0.98 |
| HFOV [deg.] | 41.3 | TL/f | 1.25 |
| (V1 + V5)/(V2 + V3 + V4) | 1.40 | TL/ImgH | 1.37 |
| V2 + V3 + V4 | 79.8 | (R9 + R10)/(R9 − R10) | 1.70 |
| V2/N2 | 11.65 | R10/f | 0.29 |
| V4/V2 | 1.93 | f/CT1 | 3.89 |
| V4/(V2 + V3) | 0.88 | f/f1 | 1.15 |
| ΣCT/ΣAT | 1.70 | f/f2 | −0.55 |
| CT1/ET1 | 1.38 | f/f3 | −0.16 |
| CT1/T45 | 1.75 | f/f4 | 1.14 |
| CT4/CT5 | 1.17 | f/f5 | −1.32 |
| CTmax/CTmin | 4.35 | f/ImgH | 1.10 |
| ET1/ET2 | 1.93 | f/Y52 | 1.44 |
| T23/CT5 | 0.88 | f1/CT1 | 3.37 |
| T34/CT2 | 1.86 | f1/f5 | −1.15 |
| T34/CT4 | 0.91 | EPD/ET1 | 2.37 |
| T34/CT5 | 1.07 | Y52/Y11 | 3.13 |
| T34/T12 | 8.82 | Yc52/Y52 | 0.48 |
| T34/T45 | 0.75 | | |

3rd Embodiment

Figure 5:
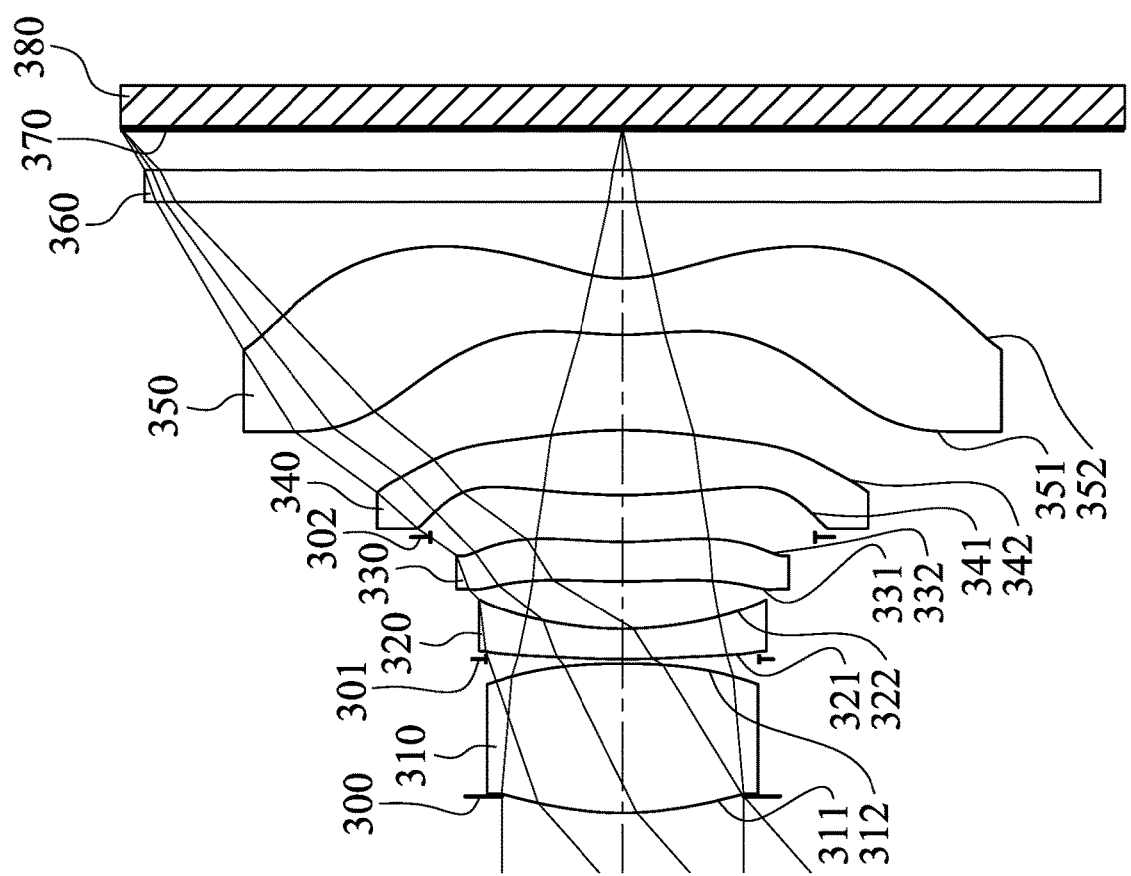
FIG. 5 is a schematic view of an imaging apparatus according to the 3rd embodiment of the present disclosure.
Figure 6:
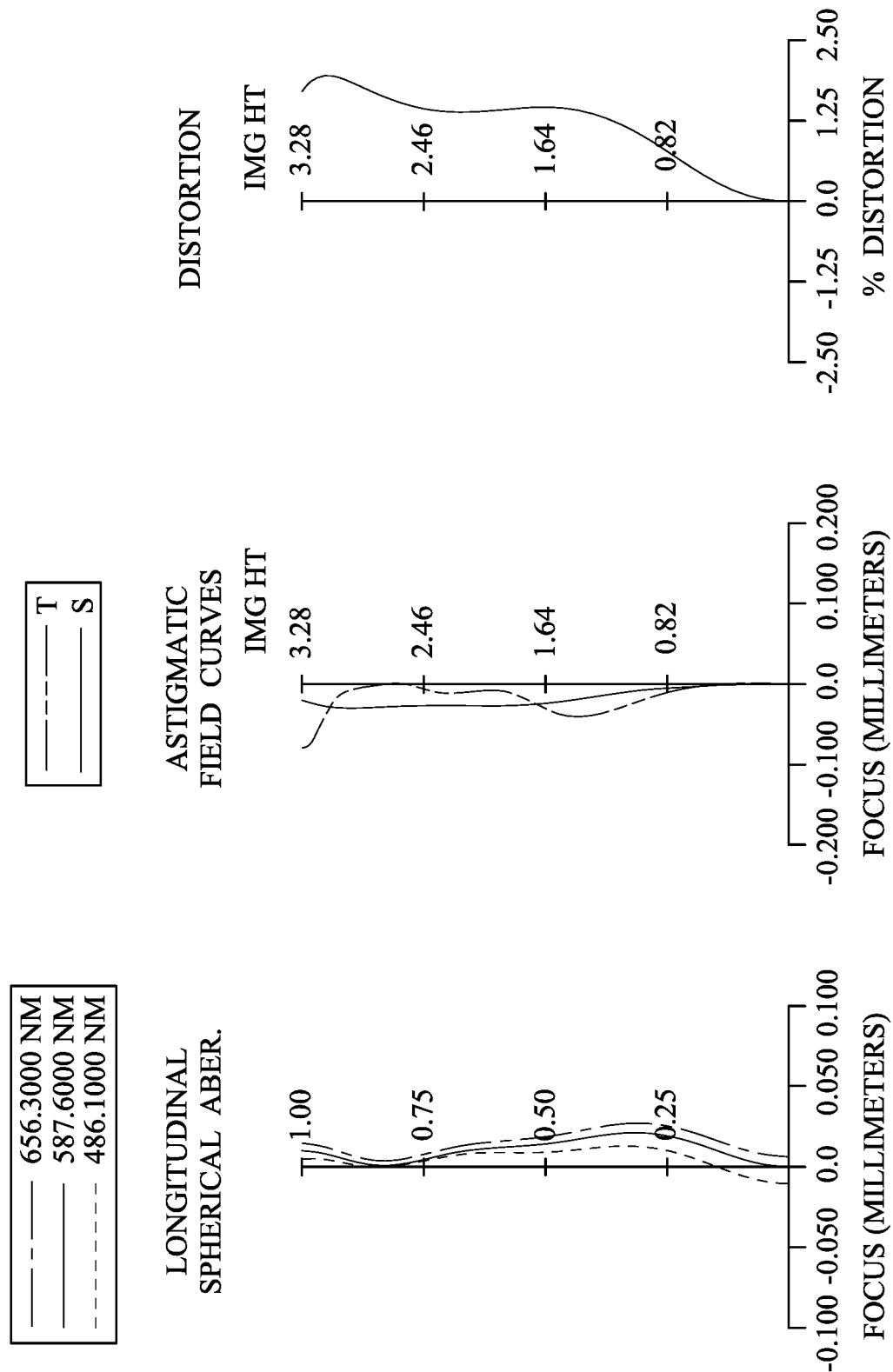
FIG. 6 shows spherical aberration curves, astigmatic field curves and a distortion curve of the imaging apparatus according to the 3rd embodiment.

FIG. 5 is a schematic view of an imaging apparatus according to the 3rd embodiment of the present disclosure. FIG. 6 shows spherical aberration curves, astigmatic field curves and a distortion curve of the imaging apparatus according to the 3rd embodiment. In FIG. 5, the imaging apparatus includes an image capturing optical lens assembly (its reference numeral is omitted) and an image sensor 380. The image capturing optical lens assembly includes, in order from an object side to an image side along an optical path, an aperture stop 300, a first lens element 310, a stop 301, a second lens element 320, a third lens element 330, a stop 302, a fourth lens element 340, a fifth lens element 350, a filter 360 and an image surface 370, wherein the image sensor 380 is disposed on the image surface 370 of the image capturing optical lens assembly. The image capturing optical lens assembly includes five lens elements (310, 320, 330, 340, 350) without additional one or more lens elements inserted between the first lens element 310 and the fifth lens element 350.

The first lens element 310 with positive refractive power has an object-side surface 311 being convex in a paraxial region thereof and an image-side surface 312 being convex in a paraxial region thereof. The first lens element 310 is made of a plastic material, and has the object-side surface 311 and the image-side surface 312 being both aspheric. Furthermore, the object-side surface 311 of the first lens element 310 includes one inflection point in an off-axis region thereof.

The second lens element 320 with negative refractive power has an object-side surface 321 being convex in a paraxial region thereof and an image-side surface 322 being concave in a paraxial region thereof. The second lens element 320 is made of a plastic material, and has the object-side surface 321 and the image-side surface 322 being both aspheric. Furthermore, the object-side surface 321 of the second lens element 320 includes two inflection points in an off-axis region thereof.

The third lens element 330 with negative refractive power has an object-side surface 331 being convex in a paraxial region thereof and an image-side surface 332 being concave in a paraxial region thereof. The third lens element 330 is made of a plastic material, and has the object-side surface 331 and the image-side surface 332 being both aspheric. Furthermore, the object-side surface 331 of the third lens element 330 includes two inflection points in an off-axis region thereof, and the image-side surface 332 of the third lens element 330 includes two inflection points in an off-axis region thereof.

The fourth lens element 340 with positive refractive power has an object-side surface 341 being convex in a paraxial region thereof and an image-side surface 342 being convex in a paraxial region thereof. The fourth lens element 340 is made of a plastic material, and has the object-side surface 341 and the image-side surface 342 being both aspheric. Furthermore, the object-side surface 341 of the fourth lens element 340 includes two inflection points in an off-axis region thereof, and the image-side surface 342 of the fourth lens element 340 includes two inflection points in an off-axis region thereof.

The fifth lens element 350 with negative refractive power has an object-side surface 351 being convex in a paraxial region thereof and an image-side surface 352 being concave in a paraxial region thereof. The fifth lens element 350 is made of a plastic material, and has the object-side surface 351 and the image-side surface 352 being both aspheric. Furthermore, the object-side surface 351 of the fifth lens element 350 includes two inflection points and one critical point in an off-axis region thereof, and the image-side surface 352 of the fifth lens element 350 includes two inflection points and one critical point in an off-axis region thereof.

The filter 360 is made of a glass material, which is located between the fifth lens element 350 and the image surface 370 in order, and will not affect the focal length of the image capturing optical lens assembly.

The detailed optical data of the 3rd embodiment are shown in Table 5 and the aspheric surface data are shown in Table 6 below.

TABLE 5

3rd Embodiment
f = 3.59 mm, Fno = 2.30, HFOV = 41.4 deg.

| Surface # | | Curvature Radius | Thickness | | Material | Index | Abbe # | Focal Length |
|---|---|---|---|---|---|---|---|---|
| 0 | Object | Plano | 350.000 | | | | | |
| 1 | Ape. Stop | Plano | −0.110 | | | | | |
| 2 | Lens 1 | 2.234 | 0.977 | ASP | Plastic | 1.545 | 56.1 | 3.02 |
| 3 | | −5.287 | 0.030 | ASP | | | | |
| 4 | Stop | Plano | 0.000 | | | | | |
| 5 | Lens 2 | 5.109 | 0.200 | ASP | Plastic | 1.669 | 19.4 | −6.48 |
| 6 | | 2.308 | 0.313 | ASP | | | | |
| 7 | Lens 3 | 4.566 | 0.259 | ASP | Plastic | 1.614 | 26.0 | −11.42 |
| 8 | | 2.705 | 0.031 | ASP | | | | |

TABLE 5-continued

3rd Embodiment
f = 3.59 mm, Fno = 2.30, HFOV = 41.4 deg.

| Surface # | | Curvature Radius | | Thickness | Material | Index | Abbe # | Focal Length |
|---|---|---|---|---|---|---|---|---|
| 9 | Stop | Plano | | 0.277 | | | | |
| 10 | Lens 4 | 4.200 | ASP | 0.424 | Plastic | 1.566 | 37.4 | 3.33 |
| 11 | | −3.303 | ASP | 0.625 | | | | |
| 12 | Lens 5 | 2.301 | ASP | 0.374 | Plastic | 1.534 | 55.9 | −3.25 |
| 13 | | 0.934 | ASP | 0.500 | | | | |
| 14 | Filter | Plano | | 0.210 | Glass | 1.517 | 64.2 | — |
| 15 | | Plano | | 0.269 | | | | |
| 16 | Image | Plano | | — | | | | |

Reference wavelength is 587.6 nm (d-line).
Effective radius of Surface 4 (stop 301) is 0.896 mm.
Effective radius of Surface 9 (stop 302) is 1.260 mm.

TABLE 6

Aspheric Coefficients

| Surface # | 2 | 3 | 5 | 6 | 7 |
|---|---|---|---|---|---|
| k = | 1.9692E−01 | 2.6629E+00 | −1.3990E+01 | −5.9536E+00 | −1.7305E+01 |
| A4 = | −6.8476E−02 | −1.5187E−01 | −8.3491E−02 | 5.7799E−03 | −4.5717E−01 |
| A6 = | 3.1280E−01 | −5.8257E−03 | −1.4791E−01 | 1.4582E−01 | 1.1686E+00 |
| A8 = | −1.6575E+00 | 8.4239E−02 | 3.4869E−01 | −7.2255E−01 | −3.3686E+00 |
| A10 = | 4.5331E+00 | 6.7335E−01 | 3.4596E−01 | 1.5504E+00 | 7.5001E+00 |
| A12 = | −7.0591E+00 | −1.5669E+00 | −9.3732E−01 | −1.4149E+00 | −1.1052E+01 |
| A14 = | 5.8053E+00 | 1.1105E+00 | 4.6142E−01 | 4.8153E−01 | 9.4349E+00 |
| A16 = | −1.9710E+00 | −2.1792E−01 | | | −3.9725E+00 |
| A18 = | | | | | 6.0176E−01 |

| Surface # | 8 | 10 | 11 | 12 | 13 |
|---|---|---|---|---|---|
| k = | −1.6728E+01 | −5.0276E+01 | −2.3615E+00 | −2.7505E+01 | −5.1408E+00 |
| A4 = | −4.6832E−01 | 2.4841E−02 | 2.8774E−02 | −4.0137E−01 | −2.1731E−01 |
| A6 = | 1.0264E+00 | −9.8449E−03 | 1.6748E−01 | 2.9458E−01 | 1.7307E−01 |
| A8 = | −3.1032E+00 | −1.6521E−01 | −3.6262E−01 | −1.4991E−01 | −1.0377E−01 |
| A10 = | 7.6692E+00 | 2.5755E−01 | 4.1700E−01 | 4.2582E−02 | 4.3422E−02 |
| A12 = | −1.3711E+01 | −2.8303E−01 | −3.6473E−01 | −1.0704E−03 | −1.2642E−02 |
| A14 = | 1.6563E+01 | 1.9377E−01 | 2.1425E−01 | −2.9176E−03 | 2.5116E−03 |
| A16 = | −1.2753E+01 | −9.0249E−02 | −7.4030E−02 | 8.2870E−04 | −3.2465E−04 |
| A18 = | 5.6370E+00 | 2.9319E−02 | 1.3453E−02 | −9.5759E−05 | 2.4534E−05 |
| A20 = | −1.0730E+00 | −4.4908E−03 | −9.9286E−04 | 4.1803E−06 | −8.1674E−07 |

In the 3rd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 3rd embodiment, so an explanation in this regard will not be provided again.

Moreover, these parameters can be calculated from Table 5 and Table 6 as the following values and satisfy the following conditions:

3rd Embodiment

| f [mm] | 3.59 | TD/CT1 | 3.59 |
|---|---|---|---|
| Fno | 2.30 | TD/f | 0.98 |
| HFOV [deg.] | 41.4 | TL/f | 1.25 |
| (V1 + V5)/(V2 + V3 + V4) | 1.35 | TL/ImgH | 1.37 |
| V2 + V3 + V4 | 82.9 | (R9 + R10)/(R9 − R10) | 2.37 |
| V2/N2 | 11.65 | R10/f | 0.26 |
| V4/V2 | 1.93 | f/CT1 | 3.68 |
| V4/(V2 + V3) | 0.82 | f/f1 | 1.19 |
| ΣCT/ΣAT | 1.75 | f/f2 | −0.55 |
| CT1/ET1 | 1.36 | f/f3 | −0.31 |
| CT1/T45 | 1.56 | f/f4 | 1.08 |
| CT4/CT5 | 1.13 | f/f5 | −1.10 |
| CTmax/CTmin | 4.89 | f/ImgH | 1.09 |
| ET1/ET2 | 2.11 | f/Y52 | 1.45 |
| T23/CT5 | 0.84 | f1/CT1 | 3.09 |
| T34/CT2 | 1.54 | f1/f5 | −0.93 |
| T34/CT4 | 0.73 | EPD/ET1 | 2.22 |
| T34/CT5 | 0.82 | Y52/Y11 | 3.11 |
| T34/T12 | 10.27 | Yc52/Y52 | 0.47 |
| T34/T45 | 0.49 | | |

4th Embodiment

Figure 7:
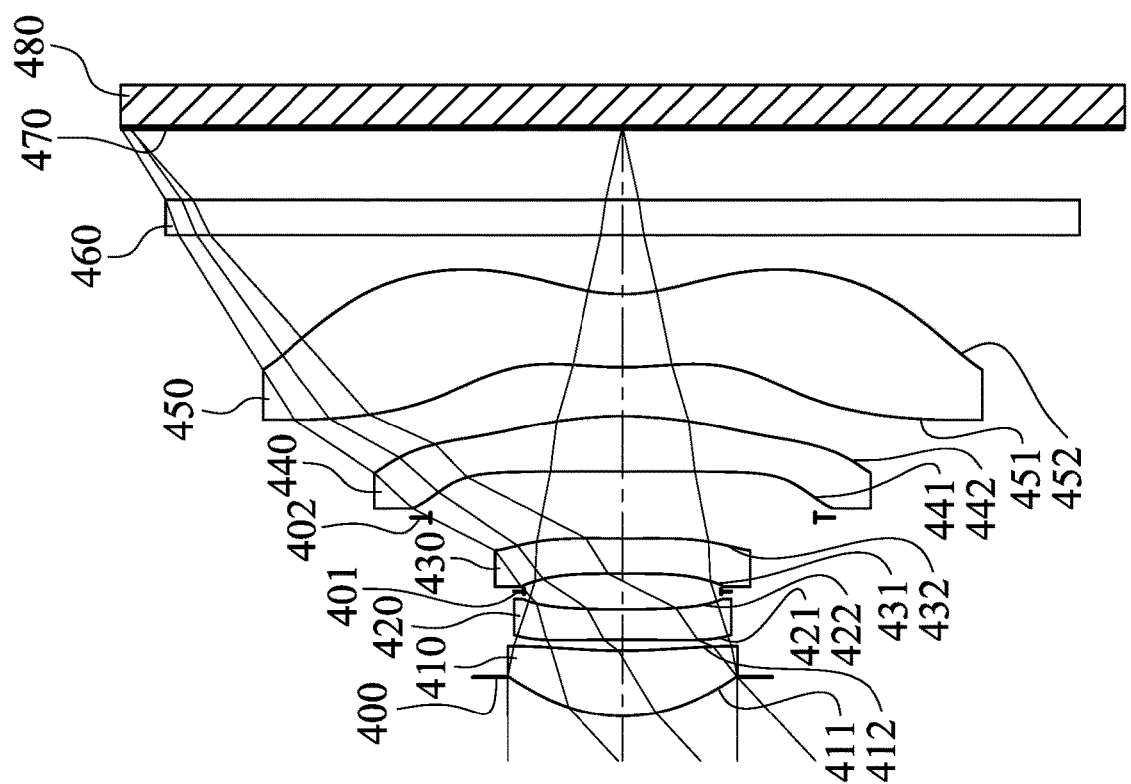
FIG. 7 is a schematic view of an imaging apparatus according to the 4th embodiment of the present disclosure.
Figure 8:
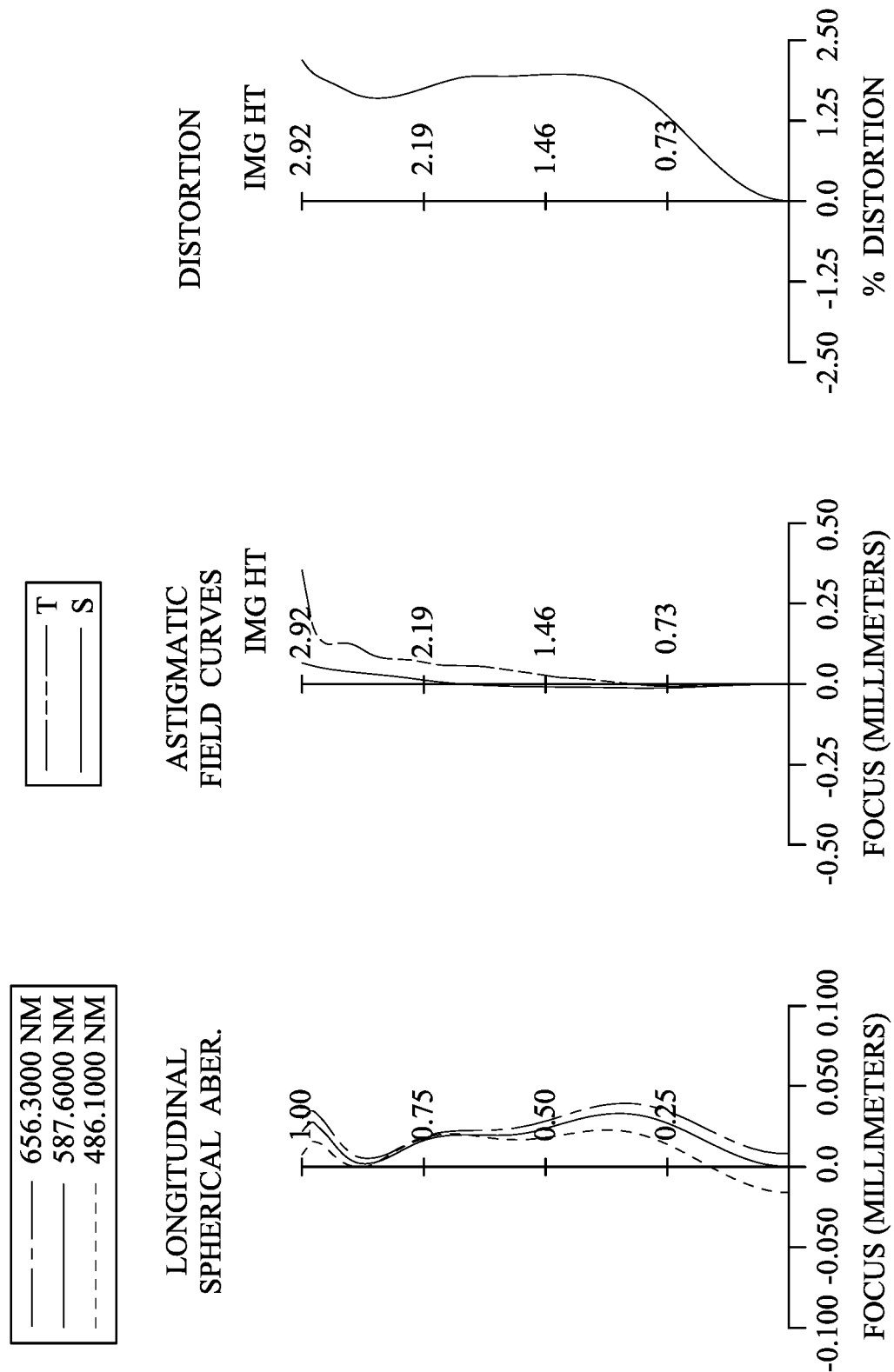
FIG. 8 shows spherical aberration curves, astigmatic field curves and a distortion curve of the imaging apparatus according to the 4th embodiment.

FIG. 7 is a schematic view of an imaging apparatus according to the 4th embodiment of the present disclosure. FIG. 8 shows spherical aberration curves, astigmatic field curves and a distortion curve of the imaging apparatus according to the 4th embodiment. In FIG. 7, the imaging apparatus includes an image capturing optical lens assembly (its reference numeral is omitted) and an image sensor 480.

The image capturing optical lens assembly includes, in order from an object side to an image side along an optical path, an aperture stop 400, a first lens element 410, a second lens element 420, a stop 401, a third lens element 430, a stop 402, a fourth lens element 440, a fifth lens element 450, a filter 460 and an image surface 470, wherein the image sensor 480 is disposed on the image surface 470 of the image capturing optical lens assembly. The image capturing optical lens assembly includes five lens elements (410, 420, 430, 440, 450) without additional one or more lens elements inserted between the first lens element 410 and the fifth lens element 450.

The first lens element 410 with positive refractive power has an object-side surface 411 being convex in a paraxial region thereof and an image-side surface 412 being concave in a paraxial region thereof. The first lens element 410 is made of a plastic material, and has the object-side surface 411 and the image-side surface 412 being both aspheric. Furthermore, the object-side surface 411 of the first lens element 410 includes one inflection point in an off-axis region thereof, and the image-side surface 412 of the first lens element 410 includes one inflection point in an off-axis region thereof.

The second lens element 420 with negative refractive power has an object-side surface 421 being convex in a paraxial region thereof and an image-side surface 422 being concave in a paraxial region thereof. The second lens element 420 is made of a plastic material, and has the object-side surface 421 and the image-side surface 422 being both aspheric. Furthermore, the object-side surface 421 of the second lens element 420 includes two inflection points in an off-axis region thereof.

The third lens element 430 with negative refractive power has an object-side surface 431 being concave in a paraxial region thereof and an image-side surface 432 being concave in a paraxial region thereof. The third lens element 430 is made of a plastic material, and has the object-side surface 431 and the image-side surface 432 being both aspheric. Furthermore, the image-side surface 432 of the third lens element 430 includes two inflection points in an off-axis region thereof.

The fourth lens element 440 with positive refractive power has an object-side surface 441 being concave in a paraxial region thereof and an image-side surface 442 being convex in a paraxial region thereof. The fourth lens element 440 is made of a plastic material, and has the object-side surface 441 and the image-side surface 442 being both aspheric. Furthermore, the object-side surface 441 of the fourth lens element 440 includes three inflection points in an off-axis region thereof, and the image-side surface 442 of the fourth lens element 440 includes three inflection points in an off-axis region thereof.

The fifth lens element 450 with negative refractive power has an object-side surface 451 being convex in a paraxial region thereof and an image-side surface 452 being concave in a paraxial region thereof. The fifth lens element 450 is made of a plastic material, and has the object-side surface 451 and the image-side surface 452 being both aspheric. Furthermore, the object-side surface 451 of the fifth lens element 450 includes two inflection points and one critical point in an off-axis region thereof, and the image-side surface 452 of the fifth lens element 450 includes two inflection points and one critical point in an off-axis region thereof.

The filter 460 is made of a glass material, which is located between the fifth lens element 450 and the image surface 470 in order, and will not affect the focal length of the image capturing optical lens assembly.

The detailed optical data of the 4th embodiment are shown in Table 7 and the aspheric surface data are shown in Table 8 below.

TABLE 7

4th Embodiment
f = 3.04 mm, Fno = 2.25, HFOV = 42.8 deg.

| Surface # | | Curvature Radius | | Thickness | Material | Index | Abbe # | Focal Length |
|---|---|---|---|---|---|---|---|---|
| 0 | Object | Plano | | 400.000 | | | | |
| 1 | Ape. Stop | Plano | | −0.232 | | | | |
| 2 | Lens 1 | 1.036 | ASP | 0.389 | Plastic | 1.545 | 56.1 | 2.57 |
| 3 | | 3.435 | ASP | 0.063 | | | | |
| 4 | Lens 2 | 100.000 | ASP | 0.180 | Plastic | 1.669 | 19.5 | −9.82 |
| 5 | | 6.158 | ASP | 0.108 | | | | |
| 6 | Stop | Plano | | 0.104 | | | | |
| 7 | Lens 3 | −43.745 | ASP | 0.209 | Plastic | 1.669 | 19.5 | −19.68 |
| 8 | | 18.869 | ASP | 0.124 | | | | |
| 9 | Stop | Plano | | 0.273 | | | | |
| 10 | Lens 4 | −21.542 | ASP | 0.330 | Plastic | 1.566 | 37.4 | 4.58 |
| 11 | | −2.327 | ASP | 0.291 | | | | |
| 12 | Lens 5 | 2.324 | ASP | 0.433 | Plastic | 1.544 | 56.0 | −3.67 |
| 13 | | 1.003 | ASP | 0.350 | | | | |
| 14 | Filter | Plano | | 0.210 | Glass | 1.517 | 64.2 | — |
| 15 | | Plano | | 0.427 | | | | |
| 16 | Image | Plano | | — | | | | |

Reference wavelength is 587.6 nm (d-line).

Effective radius of Surface 6 (stop 401) is 0.585 mm.

Effective radius of Surface 9 (stop 402) is 1.140 mm.

TABLE 8

| Aspheric Coefficients | | | | | |
|---|---|---|---|---|---|
| Surface # | 2 | 3 | 5 | 6 | 7 |
| k = | 0.0000E+00 | 0.0000E+00 | 0.0000E+00 | 0.0000E+00 | 0.0000E+00 |
| A4 = | −4.4063E−02 | −2.9807E−01 | −3.0534E−01 | −1.8745E−02 | −5.0056E−01 |
| A6 = | 3.8654E−01 | 4.8199E−01 | 1.9019E+00 | −2.6435E−01 | −2.2613E+00 |
| A8 = | −2.2720E+00 | −2.1058E+00 | −5.0828E+00 | 1.3682E+01 | 3.0058E+01 |
| A10 = | 5.8305E+00 | 9.9108E+00 | 1.5343E+01 | −7.0996E+01 | −2.2930E+02 |
| A12 = | −8.1395E+00 | −2.0086E+01 | −2.3449E+01 | 1.7509E+02 | 1.1181E+03 |
| A14 = | 2.6950E+00 | 1.2081E+01 | 1.2272E+01 | −1.6796E+02 | −3.3507E+03 |
| A16 = | | | | | 5.5928E+03 |
| A18 = | | | | | −3.9796E+03 |
| Surface # | 8 | 10 | 11 | 12 | 13 |
| k = | 0.0000E+00 | 0.0000E+00 | −1.0000E+00 | 0.0000E+00 | −1.0000E+00 |
| A4 = | −3.8355E−01 | 2.3857E−01 | 1.4510E−01 | −6.4856E−01 | −7.1795E−01 |
| A6 = | −6.7025E−01 | −1.0954E+00 | −4.7849E−01 | 1.1689E−01 | 6.7732E−01 |
| A8 = | 5.5376E+00 | 3.0486E+00 | 1.0923E+00 | 5.0036E−01 | −5.1246E−01 |
| A10 = | −2.0097E+01 | −6.1475E+00 | −1.1051E+00 | −5.3231E−01 | 2.8566E−01 |
| A12 = | 4.2933E+01 | 8.4725E+00 | 4.4758E−01 | 2.6544E−01 | −1.1164E−01 |
| A14 = | −4.5221E+01 | −7.7718E+00 | 4.3222E−02 | −7.6977E−02 | 2.9156E−02 |
| A16 = | 9.8354E+00 | 4.3926E+00 | −1.0465E−01 | 1.3296E−02 | −4.8032E−03 |
| A18 = | 2.2467E+01 | −1.3500E+00 | 3.4802E−02 | −1.2722E−03 | 4.5022E−04 |
| A20 = | −1.4772E+01 | 1.7061E−01 | −3.8542E−03 | 5.1965E−05 | −1.8292E−05 |

In the 4th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 4th embodiment, so an explanation in this regard will not be provided again.

Moreover, these parameters can be calculated from Table 7 and Table 8 as the following values and satisfy the following conditions:

| 4th Embodiment | | | |
|---|---|---|---|
| f [mm] | 3.04 | TD/CT1 | 6.44 |
| Fno | 2.25 | TD/f | 0.82 |
| HFOV [deg.] | 42.8 | TL/f | 1.15 |
| (V1 + V5)/(V2 + V3 + V4) | 1.47 | TL/ImgH | 1.20 |
| V2 + V3 + V4 | 76.3 | (R9 + R10)/(R9 − R10) | 2.52 |
| V2/N2 | 11.65 | R10/f | 0.33 |
| V4/V2 | 1.92 | f/CT1 | 7.81 |
| V4/(V2 + V3) | 0.96 | f/f1 | 1.18 |
| ΣCT/ΣAT | 1.60 | f/f2 | −0.31 |
| CT1/ET1 | 2.18 | f/f3 | −0.15 |
| CT1/T45 | 1.34 | f/f4 | 0.66 |
| CT4/CT5 | 0.76 | f/f5 | −0.83 |
| CTmax/CTmin | 2.41 | f/ImgH | 1.04 |
| ET1/ET2 | 0.85 | f/Y52 | 1.42 |
| T23/CT5 | 0.49 | f1/CT1 | 6.62 |
| T34/CT2 | 2.21 | f1/f5 | −0.70 |
| T34/CT4 | 1.20 | EPD/ET1 | 7.63 |
| T34/CT5 | 0.92 | Y52/Y11 | 3.13 |
| T34/T12 | 6.30 | Yc52/Y52 | 0.43 |
| T34/T45 | 1.36 | | |

5th Embodiment

Figure 9:
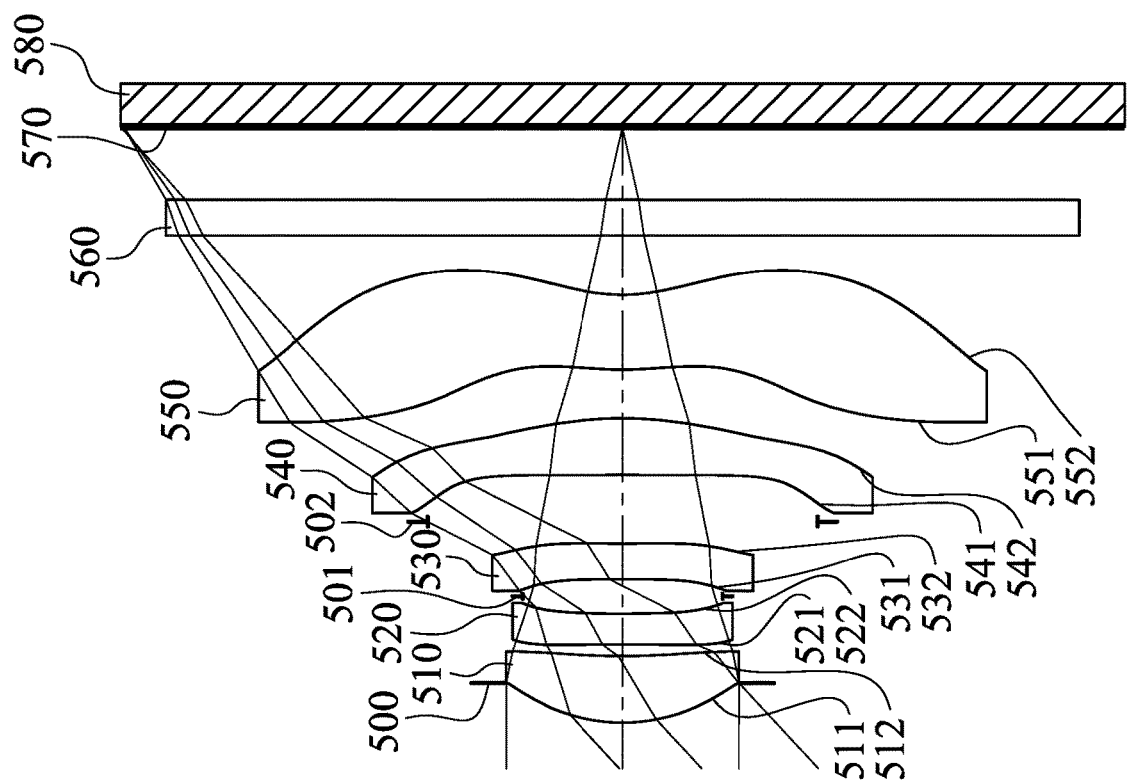
FIG. 9 is a schematic view of an imaging apparatus according to the 5th embodiment of the present disclosure.
Figure 10:
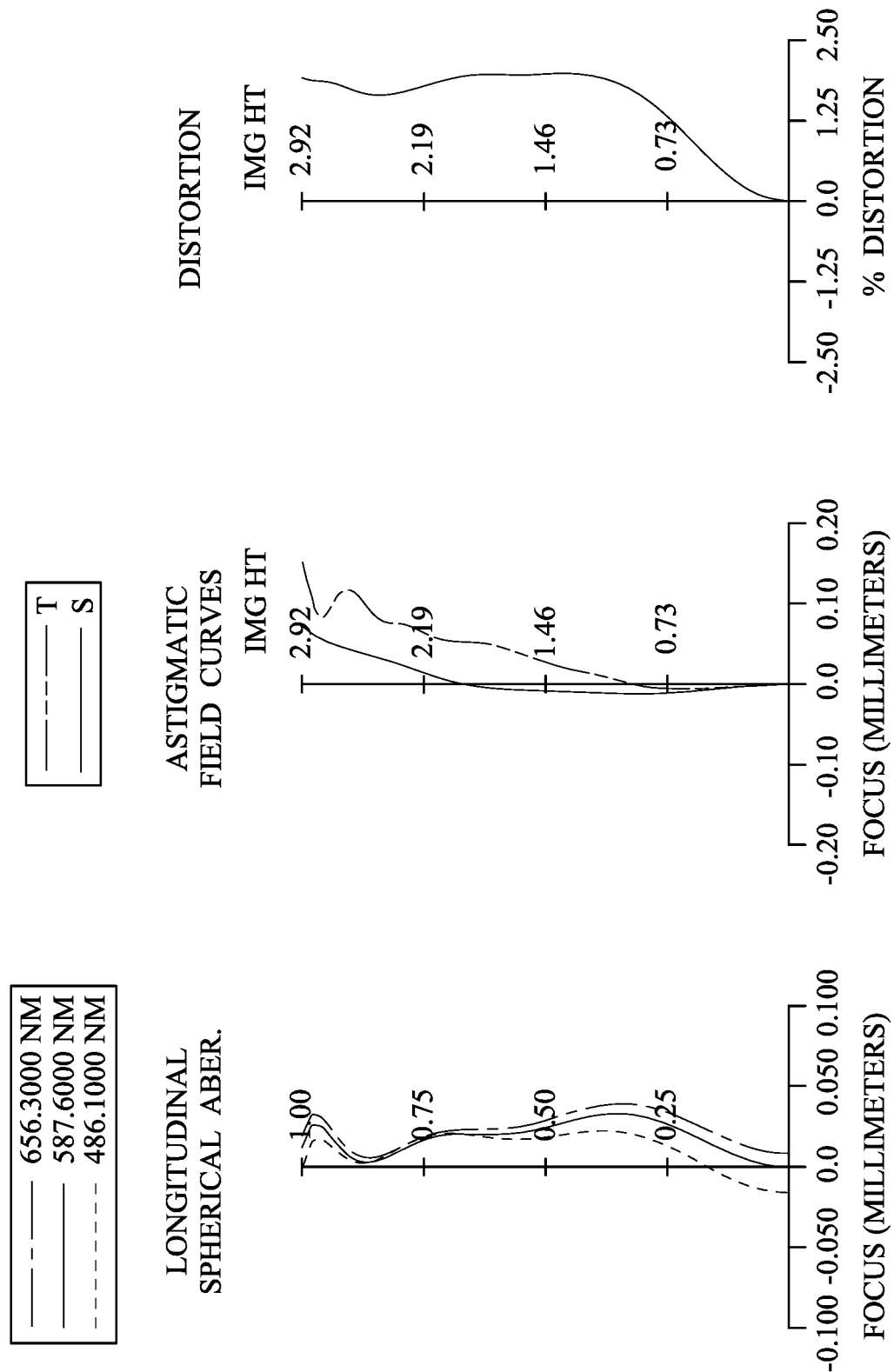
FIG. 10 shows spherical aberration curves, astigmatic field curves and a distortion curve of the imaging apparatus according to the 5th embodiment.

FIG. 9 is a schematic view of an imaging apparatus according to the 5th embodiment of the present disclosure. FIG. 10 shows spherical aberration curves, astigmatic field curves and a distortion curve of the imaging apparatus according to the 5th embodiment. In FIG. 9, the imaging apparatus includes an image capturing optical lens assembly (its reference numeral is omitted) and an image sensor 580. The image capturing optical lens assembly includes, in order from an object side to an image side along an optical path, an aperture stop 500, a first lens element 510, a second lens element 520, a stop 501, a third lens element 530, a stop 502, a fourth lens element 540, a fifth lens element 550, a filter 560 and an image surface 570, wherein the image sensor 580 is disposed on the image surface 570 of the image capturing optical lens assembly. The image capturing optical lens assembly includes five lens elements (510, 520, 530, 540, 550) without additional one or more lens elements inserted between the first lens element 510 and the fifth lens element 550.

The first lens element 510 with positive refractive power has an object-side surface 511 being convex in a paraxial region thereof and an image-side surface 512 being concave in a paraxial region thereof. The first lens element 510 is made of a plastic material, and has the object-side surface 511 and the image-side surface 512 being both aspheric. Furthermore, the object-side surface 511 of the first lens element 510 includes one inflection point in an off-axis region thereof, and the image-side surface 512 of the first lens element 510 includes one inflection point in an off-axis region thereof.

The second lens element 520 with negative refractive power has an object-side surface 521 being convex in a paraxial region thereof and an image-side surface 522 being concave in a paraxial region thereof. The second lens element 520 is made of a plastic material, and has the object-side surface 521 and the image-side surface 522 being both aspheric. Furthermore, the object-side surface 521 of the second lens element 520 includes two inflection points in an off-axis region thereof.

The third lens element 530 with negative refractive power has an object-side surface 531 being convex in a paraxial region thereof and an image-side surface 532 being concave in a paraxial region thereof. The third lens element 530 is made of a plastic material, and has the object-side surface 531 and the image-side surface 532 being both aspheric. Furthermore, the object-side surface 531 of the third lens element 530 includes one inflection point in an off-axis region thereof, and the image-side surface 532 of the third lens element 530 includes two inflection points in an off-axis region thereof.

The fourth lens element 540 with positive refractive power has an object-side surface 541 being concave in a paraxial region thereof and an image-side surface 542 being convex in a paraxial region thereof. The fourth lens element 540 is made of a plastic material, and has the object-side surface 541 and the image-side surface 542 being both aspheric. Furthermore, the object-side surface 541 of the fourth lens element 540 includes three inflection points in an off-axis region thereof, and the image-side surface 542 of the fourth lens element 540 includes three inflection points in an off-axis region thereof.

The fifth lens element 550 with negative refractive power has an object-side surface 551 being convex in a paraxial region thereof and an image-side surface 552 being concave in a paraxial region thereof. The fifth lens element 550 is made of a plastic material, and has the object-side surface 551 and the image-side surface 552 being both aspheric. Furthermore, the object-side surface 551 of the fifth lens element 550 includes two inflection points and two critical points in an off-axis region thereof, and the image-side surface 552 of the fifth lens element 550 includes two inflection points and one critical point in an off-axis region thereof.

The filter 560 is made of a glass material, which is located between the fifth lens element 550 and the image surface 570 in order, and will not affect the focal length of the image capturing optical lens assembly.

The detailed optical data of the 5th embodiment are shown in Table 9 and the aspheric surface data are shown in Table 10 below.

TABLE 9

5th Embodiment
f = 3.04 mm, Fno = 2.25, HFOV = 42.9 deg.

| Surface # | | Curvature Radius | | Thickness | Material | Index | Abbe # | Focal Length |
|---|---|---|---|---|---|---|---|---|
| 0 | Object | Plano | | 400.000 | | | | |
| 1 | Ape. Stop | Plano | | −0.233 | | | | |
| 2 | Lens 1 | 1.033 | ASP | 0.390 | Plastic | 1.545 | 56.1 | 2.58 |
| 3 | | 3.369 | ASP | 0.068 | | | | |
| 4 | Lens 2 | 100.000 | ASP | 0.180 | Plastic | 1.669 | 19.5 | −9.14 |
| 5 | | 5.761 | ASP | 0.102 | | | | |
| 6 | Stop | Plano | | 0.099 | | | | |
| 7 | Lens 3 | 41.424 | ASP | 0.212 | Plastic | 1.669 | 19.5 | −25.11 |
| 8 | | 11.930 | ASP | 0.129 | | | | |
| 9 | Stop | Plano | | 0.273 | | | | |
| 10 | Lens 4 | −17.060 | ASP | 0.330 | Plastic | 1.566 | 37.4 | 4.64 |
| 11 | | −2.293 | ASP | 0.286 | | | | |
| 12 | Lens 5 | 2.320 | ASP | 0.436 | Plastic | 1.544 | 56.0 | −3.69 |
| 13 | | 1.006 | ASP | 0.350 | | | | |
| 14 | Filter | Plano | | 0.210 | Glass | 1.517 | 64.2 | — |
| 15 | | Plano | | 0.426 | | | | |
| 16 | Image | Plano | | — | | | | |

Reference wavelength is 587.6 nm (d-line).
Effective radius of Surface 6 (stop 501) is 0.585 mm.
Effective radius of Surface 9 (stop 502) is 1.140 mm.

TABLE 10

Aspheric Coefficients

| Surface # | 2 | 3 | 4 | 5 | 7 |
|---|---|---|---|---|---|
| k = | 0.0000E+00 | 0.0000E+00 | 0.0000E+00 | 0.0000E+00 | 0.0000E+00 |
| A4 = | −4.7614E−02 | −2.9034E−01 | −3.2187E−01 | −6.1645E−02 | −4.8179E−01 |
| A6 = | 4.4401E−01 | 3.4979E−01 | 1.9450E+00 | 4.1319E−02 | −2.8760E+00 |
| A8 = | −2.6969E+00 | −1.0510E+00 | −4.9909E+00 | 1.1957E+01 | 3.9170E+01 |
| A10 = | 7.3597E+00 | 5.2993E+00 | 1.4794E+01 | −6.2940E+01 | −3.0149E+02 |
| A12 = | −1.0776E+01 | −1.0793E+01 | −2.3354E+01 | 1.5533E+02 | 1.4542E+03 |
| A14 = | 4.5511E+00 | 5.4081E+00 | 1.3503E+01 | −1.4862E+02 | −4.2590E+03 |
| A16 = | | | | | 6.9045E+03 |
| A18 = | | | | | −4.7587E+03 |

| Surface # | 8 | 10 | 11 | 12 | 13 |
|---|---|---|---|---|---|
| k = | 0.0000E+00 | 0.0000E+00 | −1.0000E+00 | 0.0000E+00 | −1.0000E+00 |
| A4 = | −3.5773E−01 | 2.4148E−01 | 1.4280E−01 | −6.4541E−01 | −7.1599E−01 |
| A6 = | −9.7849E−01 | −1.0819E+00 | −4.8410E−01 | 1.0550E−01 | 6.7686E−01 |
| A8 = | 8.1152E+00 | 2.9794E+00 | 1.1076E+00 | 5.1678E−01 | −5.1406E−01 |
| A10 = | −3.3335E+01 | −6.0105E+00 | −1.1134E+00 | −5.4523E−01 | 2.8755E−01 |
| A12 = | 8.5109E+01 | 8.3455E+00 | 4.3573E−01 | 2.7153E−01 | −1.1263E−01 |
| A14 = | −1.2942E+02 | −7.7530E+00 | 6.2756E−02 | −7.8738E−02 | 2.9450E−02 |
| A16 = | 1.1147E+02 | 4.4435E+00 | −1.1597E−01 | 1.3601E−02 | −4.8541E−03 |
| A18 = | −4.5848E+01 | −1.3832E+00 | 3.7838E−02 | −1.3010E−03 | 4.5486E−04 |
| A20 = | 5.0001E+00 | 1.7675E−01 | −4.1690E−03 | 5.3103E−05 | −1.8462E−05 |

In the 5th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 5th embodiment, so an explanation in this regard will not be provided again.

Moreover, these parameters can be calculated from Table 9 and Table 10 as the following values and satisfy the following conditions:

| 5th Embodiment | | | |
|---|---|---|---|
| f [mm] | 3.04 | TD/CT1 | 6.42 |
| Fno | 2.25 | TD/f | 0.82 |
| HFOV [deg.] | 42.9 | TL/f | 1.15 |
| (V1 + V5)/(V2 + V3 + V4) | 1.47 | TL/ImgH | 1.20 |
| V2 + V3 + V4 | 76.3 | (R9 + R10)/(R9 − R10) | 2.53 |
| V2/N2 | 11.65 | R10/f | 0.33 |
| V4/V2 | 1.92 | f/CT1 | 7.79 |
| V4/(V2 + V3) | 0.96 | f/f1 | 1.18 |
| ΣCT/ΣAT | 1.62 | f/f2 | −0.33 |
| CT1/ET1 | 2.17 | f/f3 | −0.12 |
| CT1/T45 | 1.36 | f/f4 | 0.65 |
| CT4/CT5 | 0.76 | f/f5 | −0.82 |
| CTmax/CTmin | 2.42 | f/ImgH | 1.04 |
| ET1/ET2 | 0.84 | f/Y52 | 1.42 |
| T23/CT5 | 0.46 | f1/CT1 | 6.62 |
| T34/CT2 | 2.23 | f1/f5 | −0.70 |
| T34/CT4 | 1.22 | EPD/ET1 | 7.59 |
| T34/CT5 | 0.92 | Y52/Y11 | 3.13 |
| T34/T12 | 5.91 | Yc52/Y52 | 0.43 |
| T34/T45 | 1.41 | | |

6th Embodiment

Figure 11:
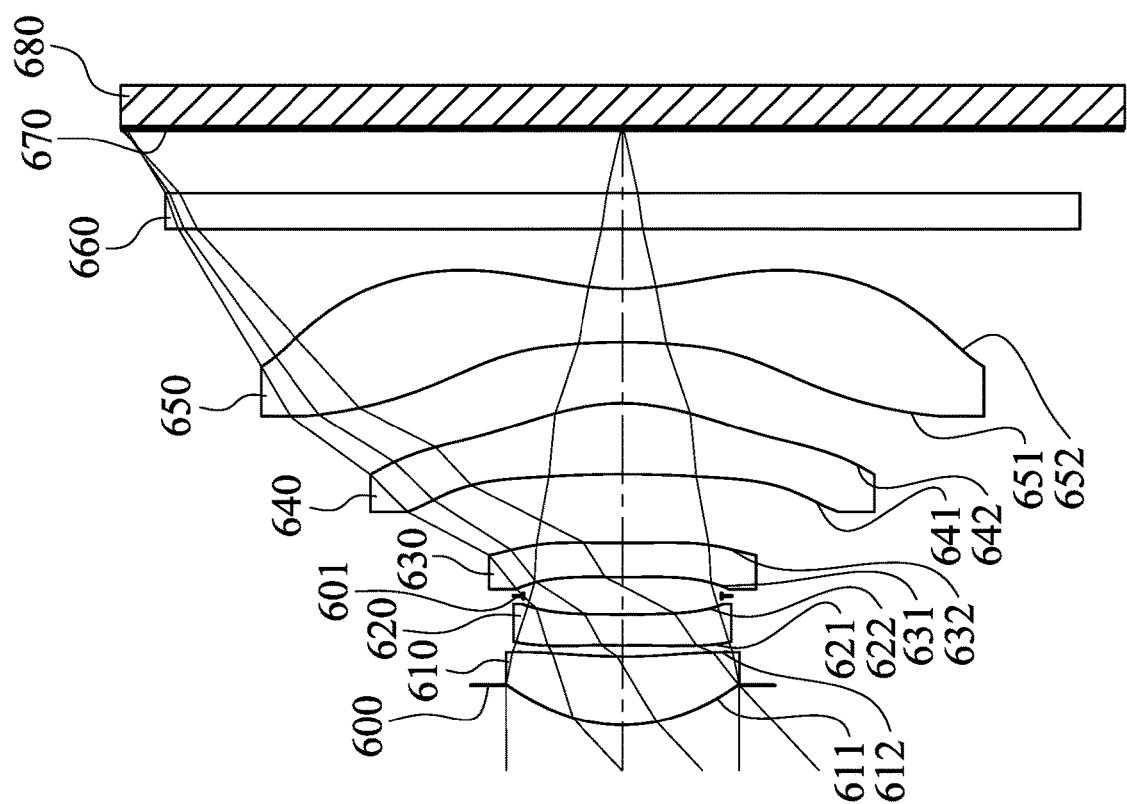
FIG. 11 is a schematic view of an imaging apparatus according to the 6th embodiment of the present disclosure.
Figure 12:
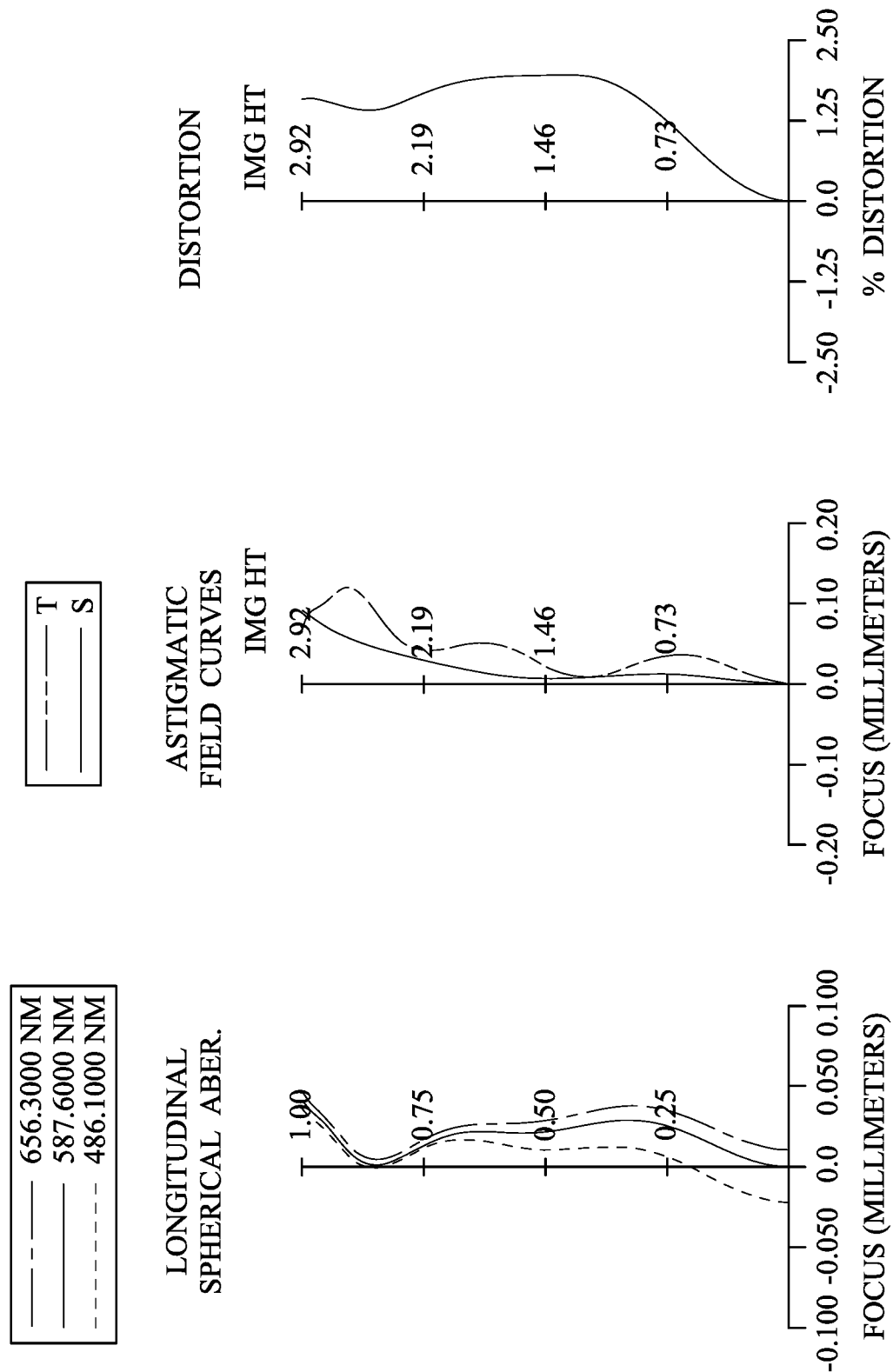
FIG. 12 shows spherical aberration curves, astigmatic field curves and a distortion curve of the imaging apparatus according to the 6th embodiment.

FIG. 11 is a schematic view of an imaging apparatus according to the 6th embodiment of the present disclosure. FIG. 12 shows spherical aberration curves, astigmatic field curves and a distortion curve of the imaging apparatus according to the 6th embodiment. In FIG. 11, the imaging apparatus includes an image capturing optical lens assembly (its reference numeral is omitted) and an image sensor 680. The image capturing optical lens assembly includes, in order from an object side to an image side along an optical path, an aperture stop 600, a first lens element 610, a second lens element 620, a stop 601, a third lens element 630, a fourth lens element 640, a fifth lens element 650, a filter 660 and an image surface 670, wherein the image sensor 680 is disposed on the image surface 670 of the image capturing optical lens assembly. The image capturing optical lens assembly includes five lens elements (610, 620, 630, 640, 650) without additional one or more lens elements inserted between the first lens element 610 and the fifth lens element 650.

The first lens element 610 with positive refractive power has an object-side surface 611 being convex in a paraxial region thereof and an image-side surface 612 being concave in a paraxial region thereof. The first lens element 610 is made of a plastic material, and has the object-side surface 611 and the image-side surface 612 being both aspheric. Furthermore, the object-side surface 611 of the first lens element 610 includes one inflection point in an off-axis region thereof, and the image-side surface 612 of the first lens element 610 includes one inflection point in an off-axis region thereof.

The second lens element 620 with negative refractive power has an object-side surface 621 being convex in a paraxial region thereof and an image-side surface 622 being concave in a paraxial region thereof. The second lens element 620 is made of a plastic material, and has the object-side surface 621 and the image-side surface 622 being both aspheric. Furthermore, the object-side surface 621 of the second lens element 620 includes two inflection points in an off-axis region thereof.

The third lens element 630 with negative refractive power has an object-side surface 631 being convex in a paraxial region thereof and an image-side surface 632 being concave in a paraxial region thereof. The third lens element 630 is made of a plastic material, and has the object-side surface 631 and the image-side surface 632 being both aspheric. Furthermore, the object-side surface 631 of the third lens element 630 includes one inflection point in an off-axis region thereof, and the image-side surface 632 of the third lens element 630 includes two inflection points in an off-axis region thereof.

The fourth lens element 640 with positive refractive power has an object-side surface 641 being concave in a paraxial region thereof and an image-side surface 642 being convex in a paraxial region thereof. The fourth lens element 640 is made of a plastic material, and has the object-side surface 641 and the image-side surface 642 being both aspheric. Furthermore, the object-side surface 641 of the fourth lens element 640 includes one inflection point in an off-axis region thereof, and the image-side surface 642 of the fourth lens element 640 includes three inflection points in an off-axis region thereof.

The fifth lens element 650 with negative refractive power has an object-side surface 651 being concave in a paraxial region thereof and an image-side surface 652 being concave in a paraxial region thereof. The fifth lens element 650 is made of a plastic material, and has the object-side surface 651 and the image-side surface 652 being both aspheric. Furthermore, the object-side surface 651 of the fifth lens element 650 includes one inflection point and one critical point in an off-axis region thereof, and the image-side surface 652 of the fifth lens element 650 includes two inflection points and one critical point in an off-axis region thereof.

The filter 660 is made of a glass material, which is located between the fifth lens element 650 and the image surface 670 in order, and will not affect the focal length of the image capturing optical lens assembly.

The detailed optical data of the 6th embodiment are shown in Table 11 and the aspheric surface data are shown in Table 12 below.

TABLE 11

6th Embodiment
f = 3.04 mm, Fno = 2.25, HFOV = 43.0 deg.

| Surface # | | Curvature Radius | Thickness | Material Index | Abbe # | Focal Length |
|---|---|---|---|---|---|---|
| 0 | Object | Plano | 400.000 | | | |
| 1 | Ape. Stop | Plano | −0.233 | | | |

TABLE 11-continued

6th Embodiment
f = 3.04 mm, Fno = 2.25, HFOV = 43.0 deg.

| Surface # | | Curvature Radius | | Thickness | Material | Index | Abbe # | Focal Length |
|---|---|---|---|---|---|---|---|---|
| 2 | Lens 1 | 1.038 | ASP | 0.401 | Plastic | 1.545 | 56.1 | 2.64 |
| 3 | | 3.220 | ASP | 0.066 | | | | |
| 4 | Lens 2 | 100.000 | ASP | 0.180 | Plastic | 1.669 | 19.5 | −9.41 |
| 5 | | 5.919 | ASP | 0.108 | | | | |
| 6 | Stop | Plano | | 0.111 | | | | |
| 7 | Lens 3 | 13.956 | ASP | 0.198 | Plastic | 1.669 | 19.5 | −27.77 |
| 8 | | 7.924 | ASP | 0.402 | | | | |
| 9 | Lens 4 | −5.330 | ASP | 0.419 | Plastic | 1.566 | 37.4 | 2.40 |
| 10 | | −1.113 | ASP | 0.356 | | | | |
| 11 | Lens 5 | −3.952 | ASP | 0.310 | Plastic | 1.544 | 56.0 | −1.96 |
| 12 | | 1.496 | ASP | 0.350 | | | | |
| 13 | Filter | Plano | | 0.210 | Glass | 1.517 | 64.2 | — |
| 14 | | Plano | | 0.380 | | | | |
| 15 | Image | Plano | | — | | | | |

Reference wavelength is 587.6 nm (d-line).
Effective radius of Surface 6 (stop 601) is 0.580 mm.

TABLE 12

Aspheric Coefficients

| Surface # | 2 | 3 | 4 | 5 | 7 |
|---|---|---|---|---|---|
| k = | 0.0000E+00 | 0.0000E+00 | 0.0000E+00 | 0.0000E+00 | 0.0000E+00 |
| A4 = | −3.4133E−02 | −3.3010E−01 | −3.1891E−01 | −9.9027E−02 | −6.7412E−01 |
| A6 = | 3.2639E−01 | 8.5851E−01 | 1.9333E+00 | 8.4525E−01 | 1.5178E+00 |
| A8 = | −2.1061E+00 | −5.8694E+00 | −6.6931E+00 | 4.6414E+00 | −2.1943E+01 |
| A10 = | 5.6042E+00 | 2.7926E+01 | 2.8595E+01 | −2.8016E+01 | 1.8290E+02 |
| A12 = | −7.5878E+00 | −6.0764E+01 | −6.2409E+01 | 7.4522E+01 | −8.4647E+02 |
| A14 = | 1.9698E+00 | 4.5632E+01 | 4.9167E+01 | −7.7582E+01 | 2.2029E+03 |
| A16 = | | | | | −2.9680E+03 |
| A18 = | | | | | 1.5633E+03 |

| Surface # | 8 | 9 | 10 | 11 | 12 |
|---|---|---|---|---|---|
| k = | 0.0000E+00 | 0.0000E+00 | −1.0000E+00 | 0.0000E+00 | −1.0000E+00 |
| A4 = | −3.8310E−01 | 1.2470E−01 | 3.8884E−01 | 5.5751E−03 | −3.9306E−01 |
| A6 = | −8.6750E−01 | 4.3299E−02 | −3.2087E−01 | −4.3924E−01 | 2.8292E−01 |
| A8 = | 7.1132E+00 | −1.0571E+00 | 1.2908E−01 | 6.8833E−01 | −1.8664E−01 |
| A10 = | −3.1762E+01 | 2.5395E+00 | 2.5515E−01 | −4.8606E−01 | 1.0328E−01 |
| A12 = | 9.3131E+01 | −3.3381E+00 | −4.9571E−01 | 1.9633E−01 | −4.3965E−02 |
| A14 = | −1.7054E+02 | 2.5907E+00 | 3.7752E−01 | −4.8203E−02 | 1.3151E−02 |
| A16 = | 1.9080E+02 | −1.1600E+00 | −1.5067E−01 | 7.1010E−03 | −2.5454E−03 |
| A18 = | −1.1843E+02 | 2.7677E−01 | 3.1201E−02 | −5.7302E−04 | 2.8287E−04 |
| A20 = | 3.0367E+01 | −2.7309E−02 | −2.6468E−03 | 1.9155E−05 | −1.3569E−05 |

In the 6th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 6th embodiment, so an explanation in this regard will not be provided again.

Moreover, these parameters can be calculated from Table 11 and Table 12 as the following values and satisfy the following conditions:

| 6th Embodiment | | | |
|---|---|---|---|
| f [mm] | 3.04 | TD/CT1 | 6.36 |
| Fno | 2.25 | TD/f | 0.84 |
| HFOV [deg.] | 43.0 | TL/f | 1.15 |
| (V1 + V5)/(V2 + V3 + V4) | 1.47 | TL/ImgH | 1.20 |
| V2 + V3 + V4 | 76.3 | (R9 + R10)/(R9 − R10) | 0.45 |
| V2/N2 | 11.65 | R10/f | 0.49 |
| V4/V2 | 1.92 | f/CT1 | 7.58 |
| V4/(V2 + V3) | 0.96 | f/f1 | 1.15 |
| ΣCT/ΣAT | 1.45 | f/f2 | −0.32 |
| CT1/ET1 | 2.13 | f/f3 | −0.11 |
| CT1/T45 | 1.13 | f/f4 | 1.27 |
| CT4/CT5 | 1.35 | f/f5 | −1.55 |
| CTmax/CTmin | 2.33 | f/ImgH | 1.04 |
| ET1/ET2 | 0.86 | f/Y52 | 1.44 |
| T23/CT5 | 0.71 | f1/CT1 | 6.58 |
| T34/CT2 | 2.23 | f1/f5 | −1.35 |
| T34/CT4 | 0.96 | EPD/ET1 | 7.23 |
| T34/CT5 | 1.30 | Y52/Y11 | 3.10 |
| T34/T12 | 6.09 | Yc52/Y52 | 0.44 |
| T34/T45 | 1.13 | | |

7th Embodiment

Figure 13:
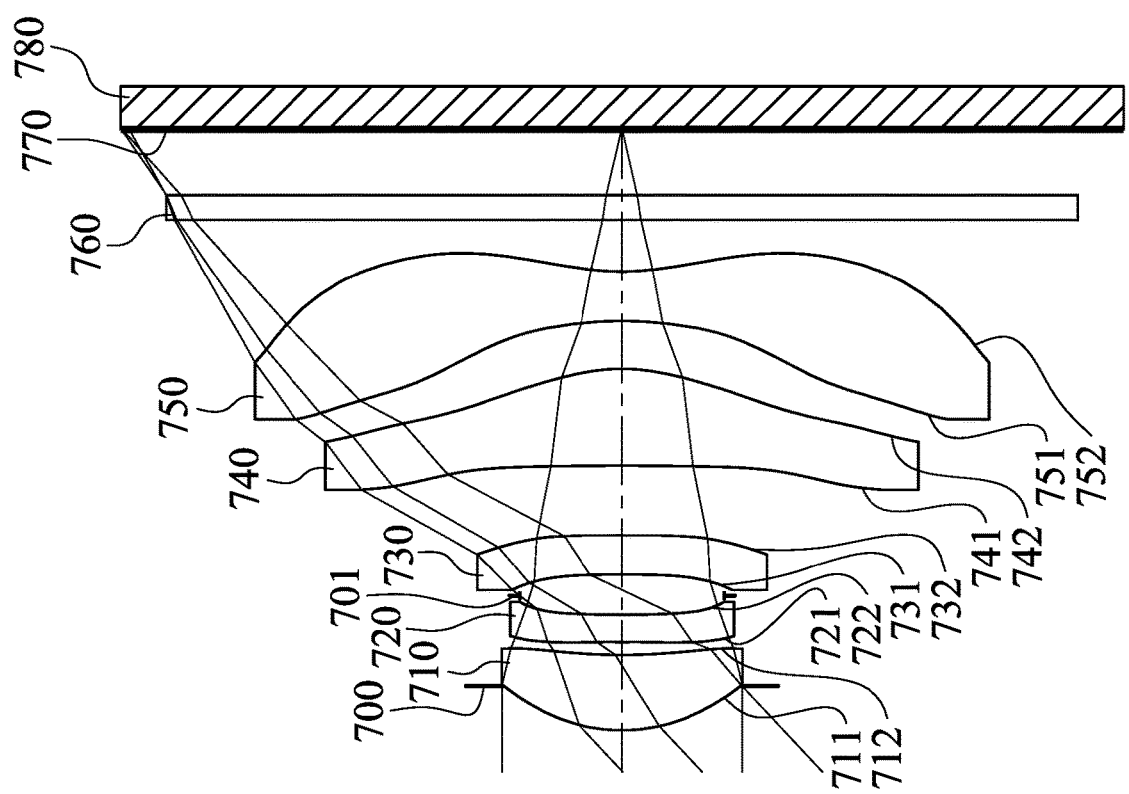
FIG. 13 is a schematic view of an imaging apparatus according to the 7th embodiment of the present disclosure.
Figure 14:
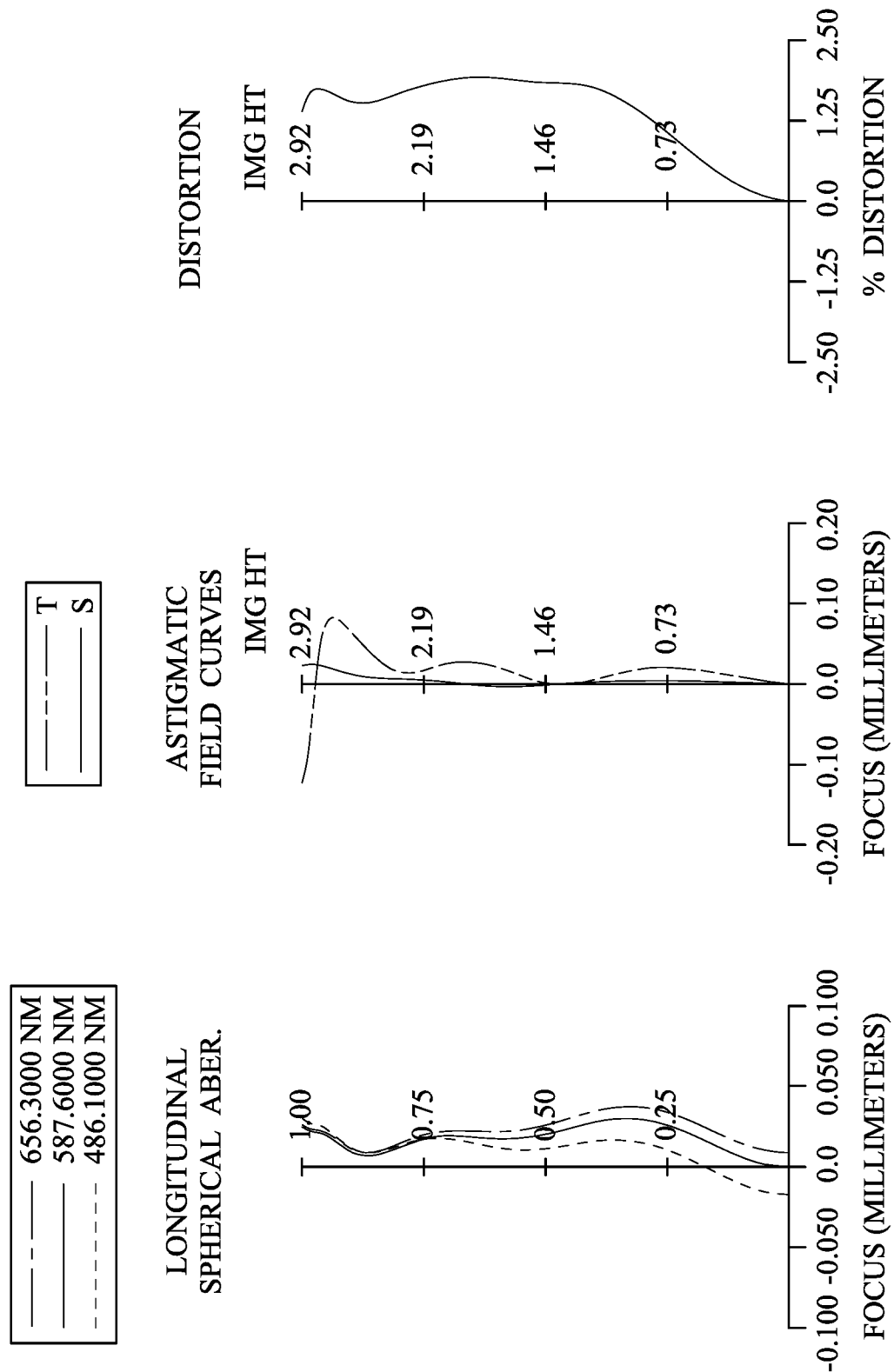
FIG. 14 shows spherical aberration curves, astigmatic field curves and a distortion curve of the imaging apparatus according to the 7th embodiment.

FIG. 13 is a schematic view of an imaging apparatus according to the 7th embodiment of the present disclosure. FIG. 14 shows spherical aberration curves, astigmatic field curves and a distortion curve of the imaging apparatus according to the 7th embodiment. In FIG. 13, the imaging apparatus includes an image capturing optical lens assembly (its reference numeral is omitted) and an image sensor 780. The image capturing optical lens assembly includes, in order from an object side to an image side along an optical path, an aperture stop 700, a first lens element 710, a second lens element 720, a stop 701, a third lens element 730, a fourth lens element 740, a fifth lens element 750, a filter 760 and an image surface 770, wherein the image sensor 780 is disposed on the image surface 770 of the image capturing optical lens assembly. The image capturing optical lens assembly includes five lens elements (710, 720, 730, 740, 750) without additional one or more lens elements inserted between the first lens element 710 and the fifth lens element 750.

The first lens element 710 with positive refractive power has an object-side surface 711 being convex in a paraxial region thereof and an image-side surface 712 being concave in a paraxial region thereof. The first lens element 710 is made of a plastic material, and has the object-side surface 711 and the image-side surface 712 being both aspheric. Furthermore, the object-side surface 711 of the first lens element 710 includes one inflection point in an off-axis region thereof, and the image-side surface 712 of the first lens element 710 includes one inflection point in an off-axis region thereof.

The second lens element 720 with negative refractive power has an object-side surface 721 being concave in a paraxial region thereof and an image-side surface 722 being concave in a paraxial region thereof. The second lens element 720 is made of a plastic material, and has the object-side surface 721 and the image-side surface 722 being both aspheric. Furthermore, the object-side surface 721 of the second lens element 720 includes one inflection point in an off-axis region thereof.

The third lens element 730 with negative refractive power has an object-side surface 731 being concave in a paraxial region thereof and an image-side surface 732 being convex in a paraxial region thereof. The third lens element 730 is made of a plastic material, and has the object-side surface 731 and the image-side surface 732 being both aspheric.

The fourth lens element 740 with positive refractive power has an object-side surface 741 being concave in a paraxial region thereof and an image-side surface 742 being convex in a paraxial region thereof. The fourth lens element 740 is made of a plastic material, and has the object-side surface 741 and the image-side surface 742 being both aspheric. Furthermore, the object-side surface 741 of the fourth lens element 740 includes two inflection points in an off-axis region thereof, and the image-side surface 742 of the fourth lens element 740 includes four inflection points in an off-axis region thereof.

The fifth lens element 750 with negative refractive power has an object-side surface 751 being concave in a paraxial region thereof and an image-side surface 752 being concave in a paraxial region thereof. The fifth lens element 750 is made of a plastic material, and has the object-side surface 751 and the image-side surface 752 being both aspheric. Furthermore, the object-side surface 751 of the fifth lens element 750 includes three inflection points in an off-axis region thereof, and the image-side surface 752 of the fifth lens element 750 includes two inflection points and one critical point in an off-axis region thereof.

The filter 760 is made of a glass material, which is located between the fifth lens element 750 and the image surface 770 in order, and will not affect the focal length of the image capturing optical lens assembly.

The detailed optical data of the 7th embodiment are shown in Table 13 and the aspheric surface data are shown in Table 14 below.

TABLE 13

7th Embodiment
f = 3.07 mm, Fno = 2.19, HFOV = 43.1 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.257 | | | | |
| 2 | Lens 1 | 1.019 | ASP | 0.438 | Plastic | 1.544 | 56.0 | 2.60 |
| 3 | | 3.089 | ASP | 0.075 | | | | |
| 4 | Lens 2 | −186.332 | ASP | 0.160 | Plastic | 1.679 | 18.4 | −10.76 |
| 5 | | 7.609 | ASP | 0.111 | | | | |
| 6 | Stop | Plano | | 0.125 | | | | |
| 7 | Lens 3 | −13.533 | ASP | 0.230 | Plastic | 1.679 | 18.4 | −21.86 |
| 8 | | −153.846 | ASP | 0.408 | | | | |
| 9 | Lens 4 | −17.120 | ASP | 0.563 | Plastic | 1.562 | 44.6 | 2.12 |
| 10 | | −1.127 | ASP | 0.280 | | | | |
| 11 | Lens 5 | −2.292 | ASP | 0.291 | Plastic | 1.544 | 56.0 | −1.64 |
| 12 | | 1.532 | ASP | 0.300 | | | | |
| 13 | Filter | Plano | | 0.145 | Glass | 1.517 | 64.2 | — |
| 14 | | Plano | | 0.384 | | | | |
| 15 | Image | Plano | | — | | | | |

Reference wavelength is 587.6 nm (d-line).
Effective radius of Surface 6 (stop 701) is 0.596 mm

TABLE 14

Aspheric Coefficients

| Surface # | 2 | 3 | 4 | 5 | 7 |
|---|---|---|---|---|---|
| k = | 0.0000E+00 | 0.0000E+00 | 0.0000E+00 | 0.0000E+00 | 0.0000E+00 |
| A4 = | −2.6099E−02 | −1.1607E−01 | −7.8364E−02 | 3.7896E−02 | −5.3381E−01 |
| A6 = | 3.3168E−01 | −7.0722E−01 | 7.5027E−01 | 1.4480E+00 | 1.9493E+00 |
| A8 = | −2.1492E+00 | 5.6563E+00 | 2.2897E−01 | −7.0119E+00 | −2.1121E+01 |
| A10 = | 7.4544E+00 | −2.5300E+01 | −2.8196E+00 | 5.3732E+01 | 1.2132E+02 |
| A12 = | −1.6735E+01 | 7.4967E+01 | 1.8892E+01 | −2.2202E+02 | −3.1940E+02 |
| A14 = | 2.1547E+01 | −1.3131E+02 | −5.6428E+01 | 4.7319E+02 | 8.2713E−02 |
| A16 = | −1.4224E+01 | 9.1669E+01 | 5.2181E+01 | −4.0030E+02 | 2.0385E+03 |
| A18 = | | | | | −4.3583E+03 |
| A20 = | | | | | 2.8799E+03 |

| Surface # | 8 | 9 | 10 | 11 | 12 |
|---|---|---|---|---|---|
| k = | 0.0000E+00 | 0.0000E+00 | −1.0000E+00 | 0.0000E+00 | −1.0000E+00 |
| A4 = | −3.1215E−01 | 6.9316E−02 | 4.2754E−01 | 1.2133E−01 | −3.9542E−01 |
| A6 = | 7.1772E−02 | −1.9258E−01 | −6.0775E−01 | −6.7170E−01 | 3.0135E−01 |
| A8 = | −7.8918E−01 | 2.3053E−01 | 6.8106E−01 | 9.9960E−01 | −2.1085E−01 |
| A10 = | 6.1230E+00 | −2.8722E−01 | −4.5022E−01 | −7.2711E−01 | 1.2318E−01 |
| A12 = | −2.0870E+01 | 2.6324E−01 | 1.7119E−01 | 3.1522E−01 | −5.3791E−02 |
| A14 = | 4.0356E+01 | −1.3898E−01 | −3.7427E−02 | −8.6643E−02 | 1.5951E−02 |
| A16 = | −4.1352E+01 | 4.0644E−02 | 4.6290E−03 | 1.4951E−02 | −2.9709E−03 |
| A18 = | 1.8931E+01 | −6.1727E−03 | −3.2284E−04 | −1.4824E−03 | 3.1013E−04 |
| A20 = | −2.3302E+00 | 3.8113E−04 | 1.2590E−05 | 6.4333E−05 | −1.3733E−05 |

In the 7th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 7th embodiment, so an explanation in this regard will not be provided again.

Moreover, these parameters can be calculated from Table 13 and Table 14 as the following values and satisfy the following conditions:

| 7th Embodiment | | | |
|---|---|---|---|
| f [mm] | 3.07 | TD/CT1 | 6.12 |
| Fno | 2.19 | TD/f | 0.87 |
| HFOV [deg.] | 43.1 | TL/f | 1.14 |
| (V1 + V5)/(V2 + V3 + V4) | 1.37 | TL/ImgH | 1.20 |
| V2 + V3 + V4 | 81.5 | (R9 + R10)/(R9 − R10) | 0.20 |
| V2/N2 | 10.98 | R10/f | 0.50 |
| V4/V2 | 2.42 | f/CT1 | 7.00 |
| V4/(V2 + V3) | 1.21 | f/f1 | 1.18 |
| ΣCT/ΣAT | 1.68 | f/f2 | −0.29 |
| CT1/ET1 | 2.11 | f/f3 | −0.14 |
| CT1/T45 | 1.56 | f/f4 | 1.45 |
| CT4/CT5 | 1.93 | f/f5 | −1.87 |
| CTmax/CTmin | 3.52 | f/ImgH | 1.05 |
| ET1/ET2 | 1.04 | f/Y52 | 1.43 |
| T23/CT5 | 0.81 | f1/CT1 | 5.94 |
| T34/CT2 | 2.55 | f1/f5 | −1.58 |
| T34/CT4 | 0.72 | EPD/ET1 | 6.74 |
| T34/CT5 | 1.40 | Y52/Y11 | 3.05 |
| T34/T12 | 5.44 | Yc52/Y52 | 0.43 |
| T34/T45 | 1.46 | | |

8th Embodiment

Figure 15:
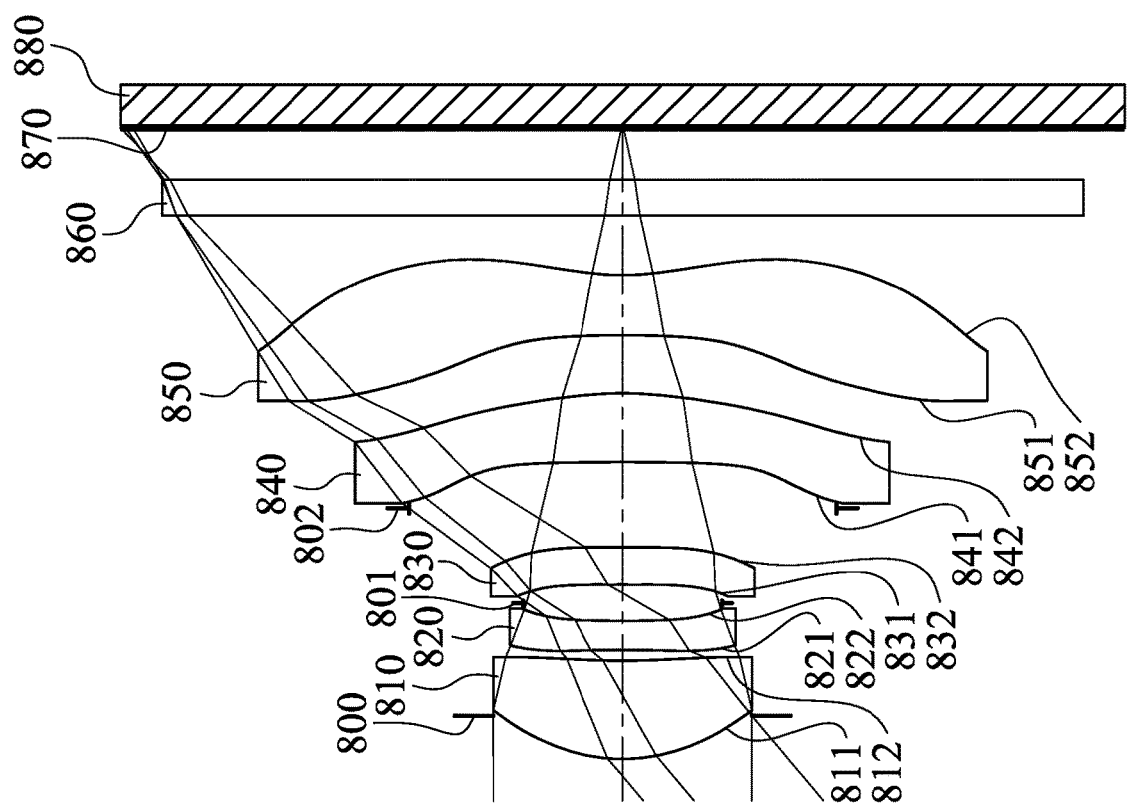
FIG. 15 is a schematic view of an imaging apparatus according to the 8th embodiment of the present disclosure.
Figure 16:
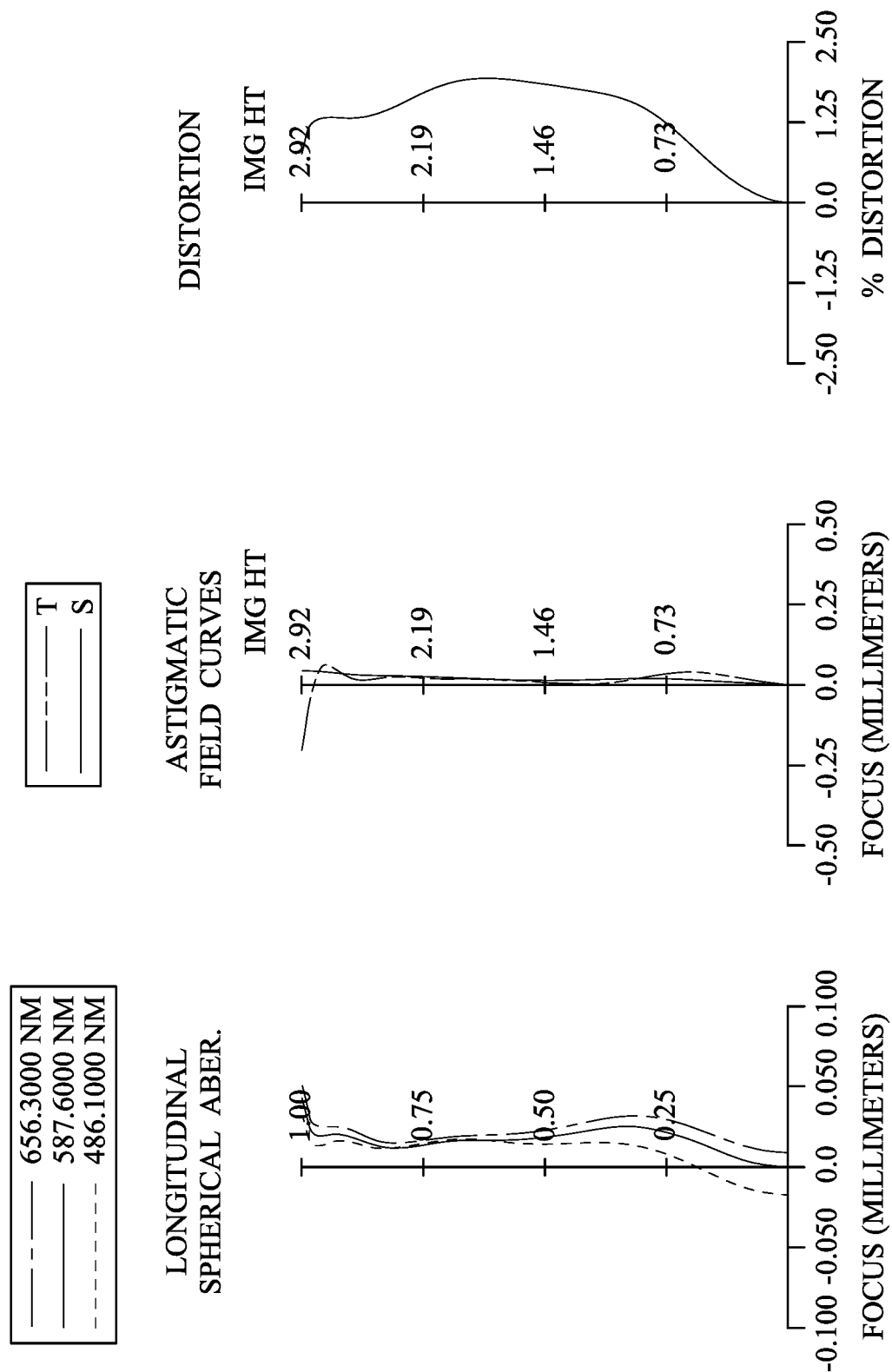
FIG. 16 shows spherical aberration curves, astigmatic field curves and a distortion curve of the imaging apparatus according to the 8th embodiment.

FIG. 15 is a schematic view of an imaging apparatus according to the 8th embodiment of the present disclosure. FIG. 16 shows spherical aberration curves, astigmatic field curves and a distortion curve of the imaging apparatus according to the 8th embodiment. In FIG. 15, the imaging apparatus includes an image capturing optical lens assembly (its reference numeral is omitted) and an image sensor 880.

The image capturing optical lens assembly includes, in order from an object side to an image side along an optical path, an aperture stop 800, a first lens element 810, a second lens element 820, a stop 801, a third lens element 830, a stop 802, a fourth lens element 840, a fifth lens element 850, a filter 860 and an image surface 870, wherein the image sensor 880 is disposed on the image surface 870 of the image capturing optical lens assembly. The image capturing optical lens assembly includes five lens elements (810, 820, 830, 840, 850) without additional one or more lens elements inserted between the first lens element 810 and the fifth lens element 850.

The first lens element 810 with positive refractive power has an object-side surface 811 being convex in a paraxial region thereof and an image-side surface 812 being concave in a paraxial region thereof. The first lens element 810 is made of a plastic material, and has the object-side surface 811 and the image-side surface 812 being both aspheric. Furthermore, the object-side surface 811 of the first lens element 810 includes one inflection point in an off-axis region thereof, and the image-side surface 812 of the first lens element 810 includes three inflection points in an off-axis region thereof.

The second lens element 820 with negative refractive power has an object-side surface 821 being concave in a paraxial region thereof and an image-side surface 822 being concave in a paraxial region thereof. The second lens element 820 is made of a plastic material, and has the object-side surface 821 and the image-side surface 822 being both aspheric. Furthermore, the object-side surface 821 of the second lens element 820 includes one inflection point in an off-axis region thereof.

The third lens element 830 with positive refractive power has an object-side surface 831 being convex in a paraxial region thereof and an image-side surface 832 being convex in a paraxial region thereof. The third lens element 830 is made of a plastic material, and has the object-side surface 831 and the image-side surface 832 being both aspheric. Furthermore, the object-side surface 831 of the third lens element 830 includes one inflection point in an off-axis region thereof.

The fourth lens element 840 with positive refractive power has an object-side surface 841 being convex in a paraxial region thereof and an image-side surface 842 being concave in a paraxial region thereof. The fourth lens element 840 is made of a plastic material, and has the object-side surface 841 and the image-side surface 842 being both aspheric. Furthermore, the object-side surface 841 of the fourth lens element 840 includes one inflection point in an off-axis region thereof, and the image-side surface 842 of the fourth lens element 840 includes two inflection points in an off-axis region thereof.

The fifth lens element 850 with negative refractive power has an object-side surface 851 being concave in a paraxial region thereof and an image-side surface 852 being concave in a paraxial region thereof. The fifth lens element 850 is made of a plastic material, and has the object-side surface 851 and the image-side surface 852 being both aspheric. Furthermore, the object-side surface 851 of the fifth lens element 850 includes one inflection point and one critical point in an off-axis region thereof, and the image-side surface 852 of the fifth lens element 850 includes two inflection points and one critical point in an off-axis region thereof.

The filter 860 is made of a glass material, which is located between the fifth lens element 850 and the image surface 870 in order, and will not affect the focal length of the image capturing optical lens assembly.

The detailed optical data of the 8th embodiment are shown in Table 15 and the aspheric surface data are shown in Table 16 below.

TABLE 15

8th Embodiment
f = 3.38 mm, Fno = 2.25, HFOV = 40.1 deg.

| Surface # | | Curvature Radius | | Thickness | Material | Index | Abbe # | Focal Length |
|---|---|---|---|---|---|---|---|---|
| 0 | Object | Plano | | 400.000 | | | | |
| 1 | Ape. Stop | Plano | | −0.253 | | | | |
| 2 | Lens 1 | 1.090 | ASP | 0.576 | Plastic | 1.545 | 56.1 | 2.55 |
| 3 | | 4.124 | ASP | 0.062 | | | | |
| 4 | Lens 2 | −22.901 | ASP | 0.171 | Plastic | 1.686 | 18.4 | −6.26 |
| 5 | | 5.304 | ASP | 0.106 | | | | |
| 6 | Stop | Plano | | 0.109 | | | | |
| 7 | Lens 3 | 25.963 | ASP | 0.222 | Plastic | 1.686 | 18.4 | 34.00 |
| 8 | | −228.833 | ASP | 0.228 | | | | |
| 9 | Stop | Plano | | 0.273 | | | | |
| 10 | Lens 4 | −16.392 | ASP | 0.403 | Plastic | 1.566 | 37.4 | 4.39 |
| 11 | | −2.177 | ASP | 0.341 | | | | |
| 12 | Lens 5 | −9.030 | ASP | 0.356 | Plastic | 1.544 | 56.0 | −2.51 |
| 13 | | 1.634 | ASP | 0.350 | | | | |
| 14 | Filter | Plano | | 0.210 | Glass | 1.517 | 64.2 | — |
| 15 | | Plano | | 0.304 | | | | |
| 16 | Image | Plano | | — | | | | |

Reference wavelength is 587.6 nm (d-line).
Effective radius of Surface 6 (stop 801) is 0.585 mm
Effective radius of Surface 9 (stop 802) is 1.255 mm

TABLE 16

Aspheric Coefficients

| Surface # | 2 | 3 | 4 | 5 | 7 |
|---|---|---|---|---|---|
| k = | 0.0000E+00 | 0.0000E+00 | 0.0000E+00 | 0.0000E+00 | 0.0000E+00 |
| A4 = | −9.4464E−03 | −2.9435E−01 | −2.2411E−01 | −5.2170E−02 | −6.2583E−01 |
| A6 = | −5.2099E−02 | 1.5954E−01 | 1.5954E+00 | 1.6532E+00 | 1.8984E+00 |
| A8 = | 9.0945E−02 | 1.8095E+00 | −1.5143E+00 | −1.9377E+00 | −1.8923E+01 |
| A10 = | −4.8303E−01 | −3.5319E+00 | 1.4218E+00 | −5.6414E−01 | 1.1281E+02 |
| A12 = | 7.3317E−01 | −2.2455E+00 | −5.8163E+00 | 7.5392E+00 | −3.8444E+02 |
| A14 = | −7.9792E−01 | 5.4376E+00 | 6.8951E+00 | −7.5220E+00 | 7.0062E+02 |
| A16 = | | | | | −5.6388E+02 |
| A18 = | | | | | 7.2194E+01 |

| Surface # | 8 | 10 | 11 | 12 | 13 |
|---|---|---|---|---|---|
| k = | 0.0000E+00 | 0.0000E+00 | −1.0000E+00 | 0.0000E+00 | −1.0000E+00 |
| A4 = | −3.3798E−01 | 8.8722E−02 | 3.2137E−01 | −1.2425E−01 | −3.6904E−01 |
| A6 = | −1.2977E+00 | −3.6693E−01 | −6.6022E−01 | −3.5059E−01 | 2.2440E−01 |
| A8 = | 1.4004E+01 | −2.2994E−01 | 7.5236E−01 | 7.3474E−01 | −9.8451E−02 |
| A10 = | −8.7136E+01 | 1.9858E+00 | −4.7587E−01 | −5.9052E−01 | 3.1041E−02 |
| A12 = | 3.4040E+02 | −3.9652E+00 | 1.6473E−01 | 2.6360E−01 | −7.8172E−03 |
| A14 = | −8.3120E+02 | 4.1134E+00 | −3.1703E−02 | −7.0993E−02 | 1.7967E−03 |
| A16 = | 1.2280E+03 | −2.3258E+00 | 6.2728E−03 | 1.1504E−02 | −3.6166E−04 |
| A18 = | −9.9897E+02 | 6.7641E−01 | −1.9383E−03 | −1.0345E−03 | 4.8011E−05 |
| A20 = | 3.4199E+02 | −7.9243E−02 | 2.7585E−04 | 3.9656E−05 | −2.7719E−06 |

In the 8th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 8th embodiment, so an explanation in this regard will not be provided again.

Moreover, these parameters can be calculated from Table 15 and Table 16 as the following values and satisfy the following conditions:

| 8th Embodiment | | | |
|---|---|---|---|
| f [mm] | 3.38 | TD/CT1 | 4.94 |
| Fno | 2.25 | TD/f | 0.84 |
| HFOV [deg.] | 40.1 | TL/f | 1.10 |
| (V1 + V5)/(V2 + V3 + V4) | 1.51 | TL/ImgH | 1.27 |
| V2 + V3 + V4 | 74.2 | (R9 + R10)/(R9 − R10) | 0.69 |
| V2/N2 | 10.90 | R10/f | 0.48 |
| V4/V2 | 2.04 | f/CT1 | 5.86 |
| V4/(V2 + V3) | 1.02 | f/f1 | 1.32 |
| ΣCT/ΣAT | 1.54 | f/f2 | −0.54 |
| CT1/ET1 | 1.85 | f/f3 | 0.10 |
| CT1/T45 | 1.69 | f/f4 | 0.77 |
| CT4/CT5 | 1.13 | f/f5 | −1.34 |
| CTmax/CTmin | 3.37 | f/ImgH | 1.16 |
| ET1/ET2 | 1.44 | f/Y52 | 1.58 |
| T23/CT5 | 0.60 | f1/CT1 | 4.43 |
| T34/CT2 | 2.93 | f1/f5 | −1.01 |
| T34/CT4 | 1.24 | EPD/ET1 | 4.89 |
| T34/CT5 | 1.41 | Y52/Y11 | 2.82 |
| T34/T12 | 8.08 | Yc52/Y52 | 0.41 |
| T34/T45 | 1.47 | | |

9th Embodiment

Figure 18:
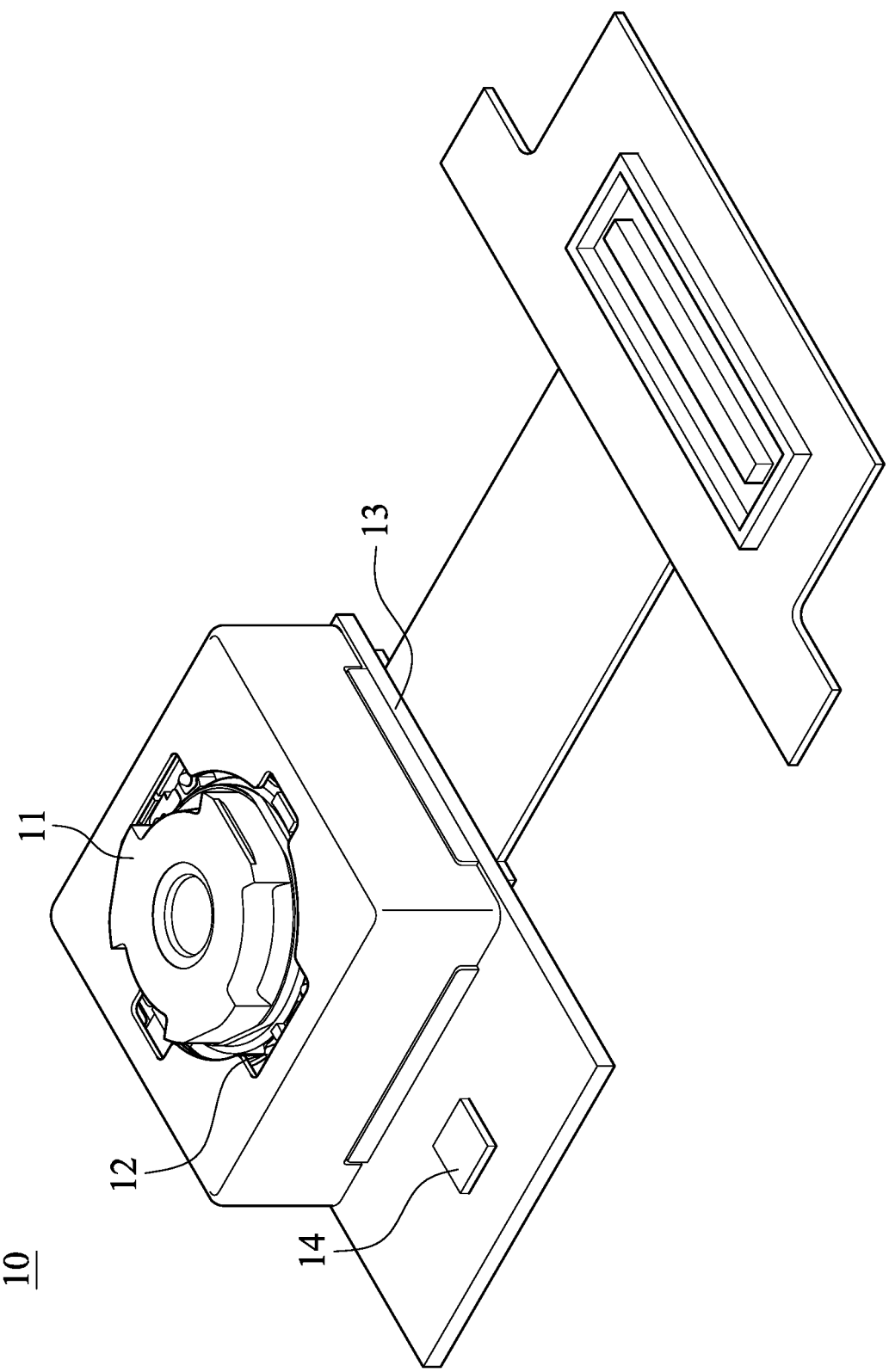
FIG. 18 is a schematic view of an imaging apparatus according to the 9th embodiment of the present disclosure.

FIG. 18 is a schematic view of an imaging apparatus 10 according to the 9th embodiment of the present disclosure. In FIG. 18, the imaging apparatus 10 of the 9th embodiment is a camera module, the imaging apparatus 10 includes an imaging lens assembly 11, a driving apparatus 12 and an image sensor 13, wherein the imaging lens assembly 11 includes the image capturing optical lens assembly of the present disclosure and a lens barrel (not shown in drawings) for carrying the image capturing optical lens assembly. The imaging apparatus 10 can focus light from an imaged object via the imaging lens assembly 11, perform image focusing by the driving apparatus 12, and generate an image on the image sensor 13, and the imaging information can be transmitted.

The driving apparatus 12 can be an auto-focus module, which can be driven by driving systems, such as voice coil motors (VCM), micro electro-mechanical systems (MEMS), piezoelectric systems, and shape memory alloys etc. The image capturing optical lens assembly can obtain a favorable imaging position by the driving apparatus 12 so as to capture clear images when the imaged object is disposed at different object distances.

The imaging apparatus 10 can include the image sensor 13 located on the image surface of the image capturing optical lens assembly, such as CMOS and CCD, with superior photosensitivity and low noise. Thus, it is favorable for providing realistic images with high definition image quality thereof.

Moreover, the imaging apparatus 10 can further include an image stabilization module 14, which can be a kinetic energy sensor, such as an accelerometer, a gyro sensor, and a Hall Effect sensor. In the 9th embodiment, the image stabilization module 14 is a gyro sensor, but is not limited thereto. Therefore, the variation of different axial directions of the image capturing optical lens assembly can adjusted so as to compensate the image blur generated by motion at the moment of exposure, and it is further favorable for enhancing the image quality while photographing in motion and low light situation. Furthermore, advanced image compensation functions, such as optical image stabilizations (OIS) and electronic image stabilizations (EIS) etc., can be provided.

10th Embodiment

Figure 19A:
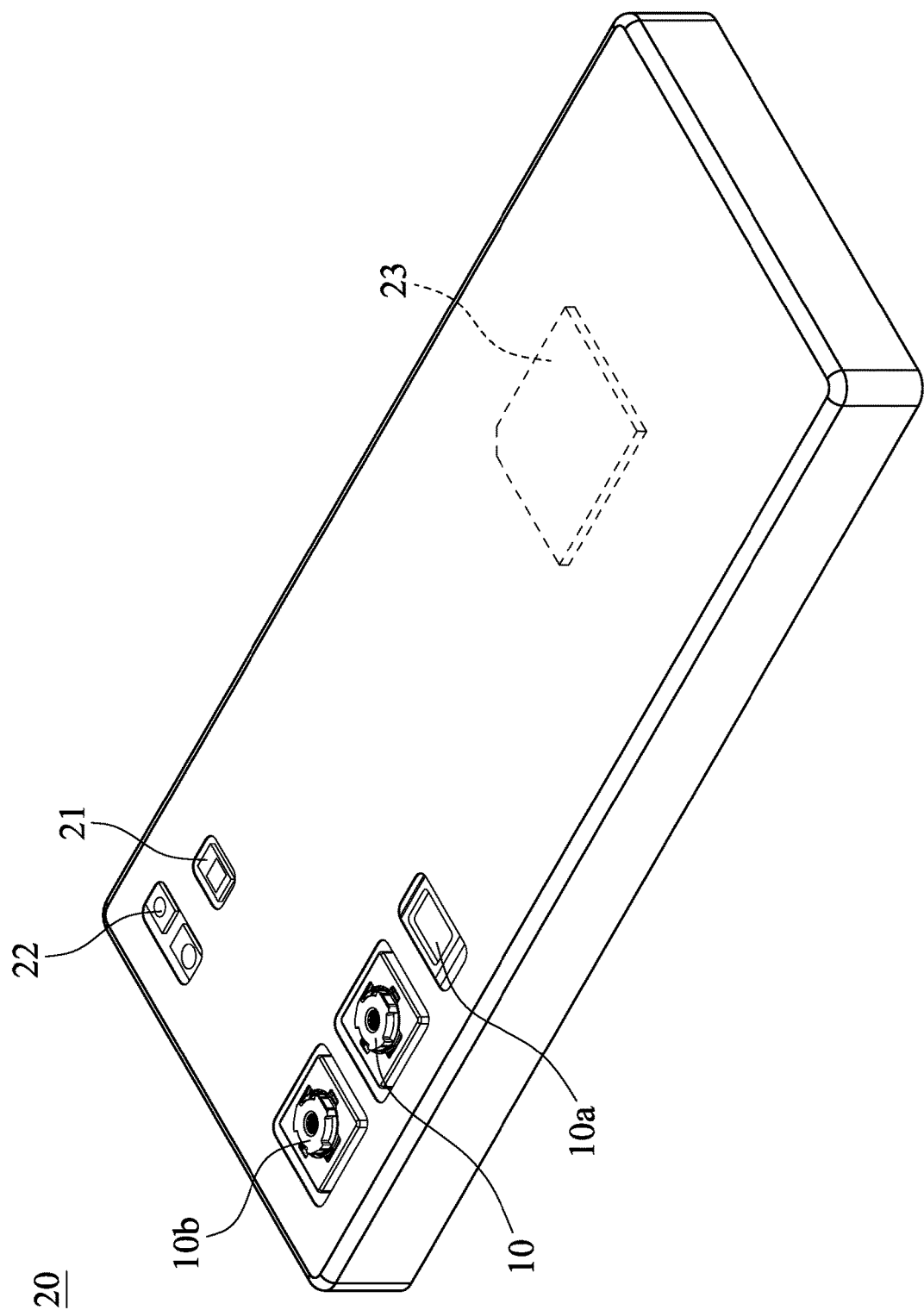
FIG. 19A is a schematic view of one side of an electronic device according to the 10th embodiment of the present disclosure.
Figure 19B:
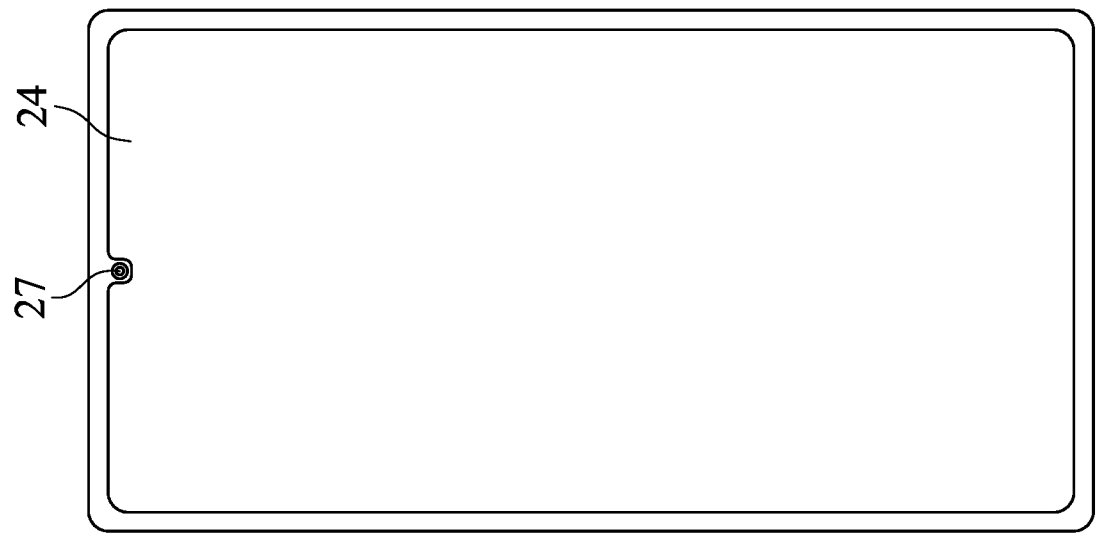
FIG. 19B is a schematic view of another side of the electronic device of FIG. 19A.
Figure 19C:
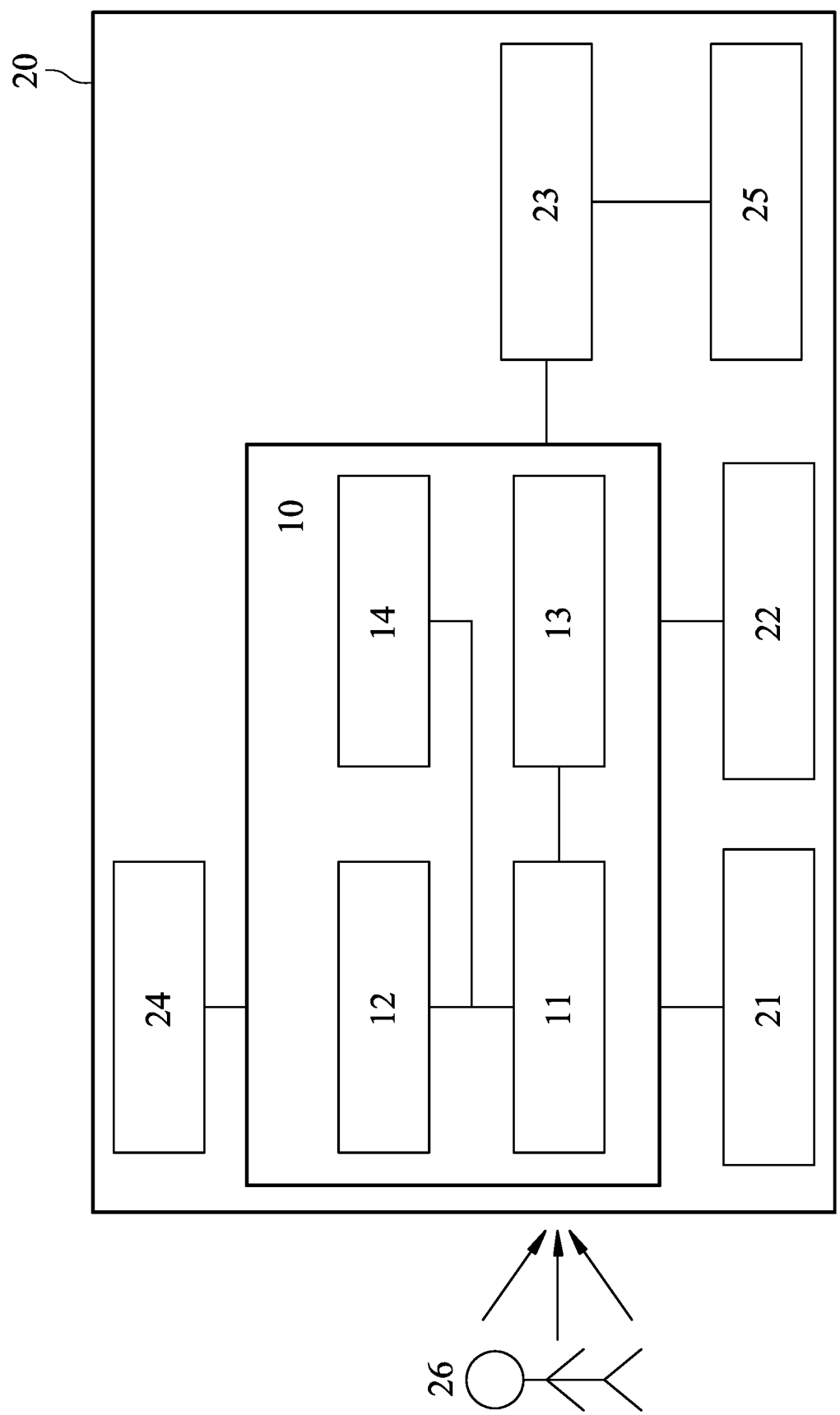
FIG. 19C is a system schematic view of the electronic device of FIG. 19A.

FIG. 19A is a schematic view of one side of an electronic device 20 according to the 10th embodiment of the present disclosure. FIG. 19B is a schematic view of another side of the electronic device 20 of FIG. 19A. FIG. 19C is a system schematic view of the electronic device 20 of FIG. 19A. In FIGS. 19A, 19B and 19C, the electronic device 20 according to the 10th embodiment is a smartphone, wherein the electronic device 20 includes imaging apparatuses 10, 10a, 10b, 27, a flash module 21, a focusing assisting module 22, an image signal processor (ISP) 23, a user interface 24 and an image software processor 25, wherein the imaging apparatus 27 is a front camera and includes the image capturing optical lens assembly of the present disclosure. When the user captures images of an imaged object 26 via the user interface 24, the electronic device 20 focuses and generates an image via at least one of the imaging apparatuses 10, 10a, 10b, 27 while compensating for low illumination via the flash module 21 when necessary. Then, the electronic device 20 quickly focuses on the imaged object 26 according to its object distance information provided by the focusing assisting module 22, and optimizes the image via the image signal processor 23 and the image software processor 25. Thus, the image quality can be further enhanced. The focusing assisting module 22 can adopt conventional infrared or laser for obtaining quick focusing, and the user interface 24 can utilize a touch screen or a physical button for capturing and processing the image with various functions of the image processing software.

Each of the imaging apparatuses 10a, 10b, 27 according to the 10th embodiment can have a configuration which is the same or similar to that of the imaging apparatus 10 according to the 9th embodiment, and will not describe again herein. In detail, the imaging apparatuses 10a, 10, 10b according to the 10th embodiment can be a telephoto imaging apparatus, wide angle imaging apparatus and a general imaging apparatus (which is between telephoto characteristic and wide angle characteristic), respectively, or can be others imaging apparatuses, which will not be limited thereto.

11th Embodiment

Figure 20:
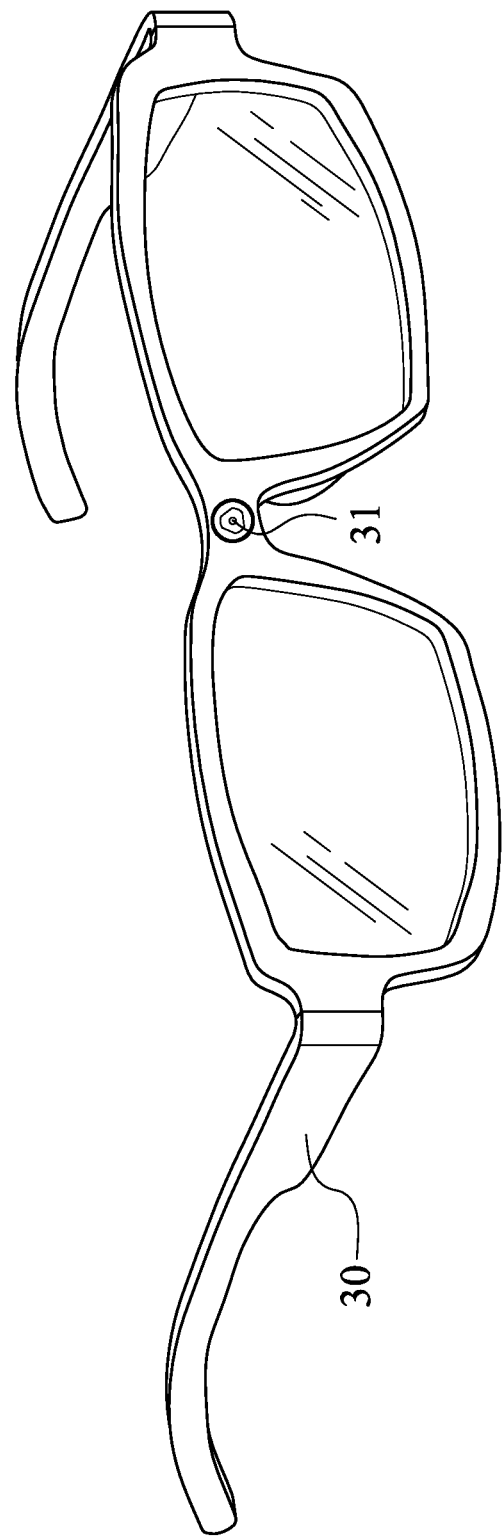
FIG. 20 is a schematic view of an electronic device according to the 11th embodiment of the present disclosure.

FIG. 20 is a schematic view of an electronic device 30 according to the 11th embodiment of the present disclosure. The electronic device 30 of the 11th embodiment is a wearable device, wherein the electronic device 30 includes an imaging apparatus 31, wherein the imaging apparatus 31 can be the same as stated in the 9th embodiment, and will not describe again herein.

The foregoing description, for purpose of explanation, has been described with reference to specific embodiment. It is to be noted that Tables show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An image capturing optical lens assembly comprising five lens elements, the five lens elements being, in order from an object side to an image side along an optical path: a first lens element, a second lens element, a third lens element, a fourth lens element and a fifth lens element;
wherein each of the five lens elements has an object-side surface towards the object side and an image-side surface towards the image side;
wherein the first lens element with positive refractive power has the object-side surface being convex in a paraxial region thereof;
the second lens element with negative refractive power has the image-side surface being concave in a paraxial region thereof;
the fourth lens element with positive refractive power has the image-side surface being convex in a paraxial region thereof;
the fifth lens element with negative refractive power has the image-side surface being concave in a paraxial region thereof, at least one of the object-side surface and the image-side surface of the fifth lens element comprises at least one critical point in an off-axis region thereof;
wherein an Abbe number of the second lens element is V2, an Abbe number of the third lens element is V3, an Abbe number of the fourth lens element is V4, a focal length of the image capturing optical lens assembly is f, an axial distance between the object-side surface of the first lens element and an image surface is TL, a central thickness of the fourth lens element is CT4, a central thickness of the fifth lens element is CT5, a refractive index of the second lens element is N2, and the following conditions are satisfied:

$30.0 < V2+V3+V4 < 90.0;$ $1.10 \leq TL/f < 1.50;$ $0.70 < CT4/CT5;$ and $7.0 < V2/N2 < 12.5.$ 2. The image capturing optical lens assembly of claim 1, wherein the Abbe number of the second lens element is V2, the Abbe number of the third lens element is V3, the Abbe number of the fourth lens element is V4, the refractive index of the second lens element is N2, and the following conditions are satisfied:

$45.0 < V2+V3+V4 < 85.0;$ $8.0 < V2/N2 < 12.0;$ and $0.70 < V4/V2 < 2.55.$

3. The image capturing optical lens assembly of claim 1, wherein the focal length of the image capturing optical lens assembly is f, the axial distance between the object-side surface of the first lens element and the image surface is TL, the central thickness of the fourth lens element is CT4, the central thickness of the fifth lens element is CT5, and the following conditions are satisfied:

$1.10 \leq TL/f < 1.40;$ and $0.80 < CT4/CT5 < 2.0.$

4. The image capturing optical lens assembly of claim 1, wherein the focal length of the image capturing optical lens assembly is f, a central thickness of the first lens element is CT1, and the following condition is satisfied:

$2.5 < f/CT1 < 5.0.$

5. The image capturing optical lens assembly of claim 1, wherein a central thickness of the first lens element is CT1, a distance in parallel with an optical axis between a maximum effective radius position on the object-side surface of the first lens element and a maximum effective radius position on the image-side surface of the first lens element is ET1, and the following condition is satisfied:

$1.0 < CT1/ET1 < 1.6.$

6. The image capturing optical lens assembly of claim 1, wherein an axial distance between the third lens element and the fourth lens element is T34, the central thickness of the fourth lens element is CT4, and the following condition is satisfied:

$0.70 < T34/CT4 < 1.3.$

7. The image capturing optical lens assembly of claim 1, wherein an axial distance between the first lens element and the second lens element is T12, an axial distance between the third lens element and the fourth lens element is T34, and the following condition is satisfied:

$5.3 < T34/T12 < 16.$

8. The image capturing optical lens assembly of claim 1, wherein the focal length of the image capturing optical lens assembly is f, a maximum distance between an optical effective region of the image-side surface of the fifth lens element and an optical axis is Y52, an f-number of the image capturing optical lens assembly is Fno, and the following conditions are satisfied:

$1.0 < f/Y52 < 2.0;$ and $2.00 \leq Fno < 2.45.$

9. The image capturing optical lens assembly of claim 1, wherein an axial distance between the object-side surface of the first lens element and the image-side surface of the fifth lens element is TD, the focal length of the image capturing optical lens assembly is f, the axial distance between the object-side surface of the first lens element and the image surface is TL, a maximum image height of the image capturing optical lens assembly is ImgH, and the following conditions are satisfied:

$0.80 < TD/f < 1.1;$ and $0.80 < TL/ImgH < 1.8.$

10. The image capturing optical lens assembly of claim 1, wherein a curvature radius of the object-side surface of the fifth lens element is R9, a curvature radius of the image-side surface of the fifth lens element is R10, a focal length of the first lens element is f1, a focal length of the fifth lens element is f5, and the following conditions are satisfied:

$0.10 < (R9+R10)/(R9-R10) < 2.7;$ and $-2.0 < f1/f5 < -0.5;$ wherein a distance between a critical point of the image-side surface of the fifth lens element and an optical axis is Yc52, a maximum distance between an optical effective region of the image-side surface of the fifth lens element and the optical axis is Y52, and the image-side surface of the fifth lens element comprises at least one critical point in an off-axis region thereof satisfying the following condition:

$0.40 < Yc52/Y52 < 0.50$.

11. An imaging apparatus, comprising:
the image capturing optical lens assembly of claim 1; and
an image sensor disposed on the image surface of the image capturing optical lens assembly.

12. An electronic device, comprising:
the imaging apparatus of claim 11.

* * * * *